(12) United States Patent
Choi et al.

(10) Patent No.: US 9,772,940 B2
(45) Date of Patent: Sep. 26, 2017

(54) STORAGE DEVICE COMPRISING VOLATILE AND NONVOLATILE MEMORY DEVICES, AND RELATED METHODS OF OPERATION

(71) Applicant: SAMSUNG ELECTRONICS CO., LTD., Suwon-si, Gyeonggi-Do (KR)

(72) Inventors: Wan-Soo Choi, Suwon-si (KR); Eun-Ju Park, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 381 days.

(21) Appl. No.: 14/579,179

(22) Filed: Dec. 22, 2014

(65) Prior Publication Data

US 2015/0186054 A1 Jul. 2, 2015

(30) Foreign Application Priority Data

Dec. 26, 2013 (KR) ........................ 10-2013-0163613

(51) Int. Cl.
*G06F 12/02* (2006.01)

(52) U.S. Cl.
CPC ...... *G06F 12/0253* (2013.01); *G06F 12/0246* (2013.01); *G06F 2212/7202* (2013.01)

(58) Field of Classification Search
CPC ......... G06F 12/0253; G06F 2212/7205; G06F 3/0652; G06F 3/0647; G06F 12/0246; G06F 2212/7202
See application file for complete search history.

(56) References Cited

U.S. PATENT DOCUMENTS

| | | | |
|---|---|---|---|
| 6,775,185 B2 | 8/2004 | Fujisawa et al. | |
| 7,444,463 B2 | 10/2008 | Gorobets | |
| 7,589,999 B2 | 9/2009 | Jeong et al. | |
| 7,624,137 B2 | 11/2009 | Bacon et al. | |
| 7,873,777 B2 | 1/2011 | Kang | |
| 2007/0156998 A1* | 7/2007 | Gorobets | G06F 12/0246 711/170 |
| 2008/0098165 A1* | 4/2008 | Shinozaki | G11C 16/26 711/103 |
| 2010/0318839 A1* | 12/2010 | Avila | G06F 12/0802 714/5.11 |
| 2011/0296087 A1* | 12/2011 | Kim | G06F 12/0246 711/103 |
| 2012/0072654 A1* | 3/2012 | Olbrich | G06F 13/1657 711/103 |
| 2012/0079167 A1* | 3/2012 | Yao | G06F 12/0246 711/103 |
| 2012/0151124 A1 | 6/2012 | Baek et al. | |

(Continued)

FOREIGN PATENT DOCUMENTS

KR 101026634 B1 4/2011

*Primary Examiner* — Rocio Del Mar Perez-Velez
(74) *Attorney, Agent, or Firm* — Volentine & Whitt, PLLC

(57) ABSTRACT

A method of operating a storage device comprises copying first valid pages in a first block into a first latch unit based on a first volatile memory device, the first block being set on multiple nonvolatile memory devices, copying second valid pages in the first block into a second latch unit based on the first volatile memory device, and copying the first valid pages in the first latch unit and the second valid pages in the second latch unit into a second block, the second block being set on the nonvolatile memory devices and being different from the first block.

13 Claims, 53 Drawing Sheets

(56) References Cited

U.S. PATENT DOCUMENTS

| | | |
|---|---|---|
| 2012/0297121 A1 | 11/2012 | Gorobets et al. |
| 2013/0132644 A1 | 5/2013 | Choi et al. |
| 2013/0198438 A1* | 8/2013 | Masuo ................ G06F 12/0246 |
| | | 711/103 |
| 2013/0227203 A1* | 8/2013 | Marotta ................ G11C 16/16 |
| | | 711/103 |
| 2014/0258596 A1* | 9/2014 | Kojima ............... G06F 12/0246 |
| | | 711/103 |

* cited by examiner

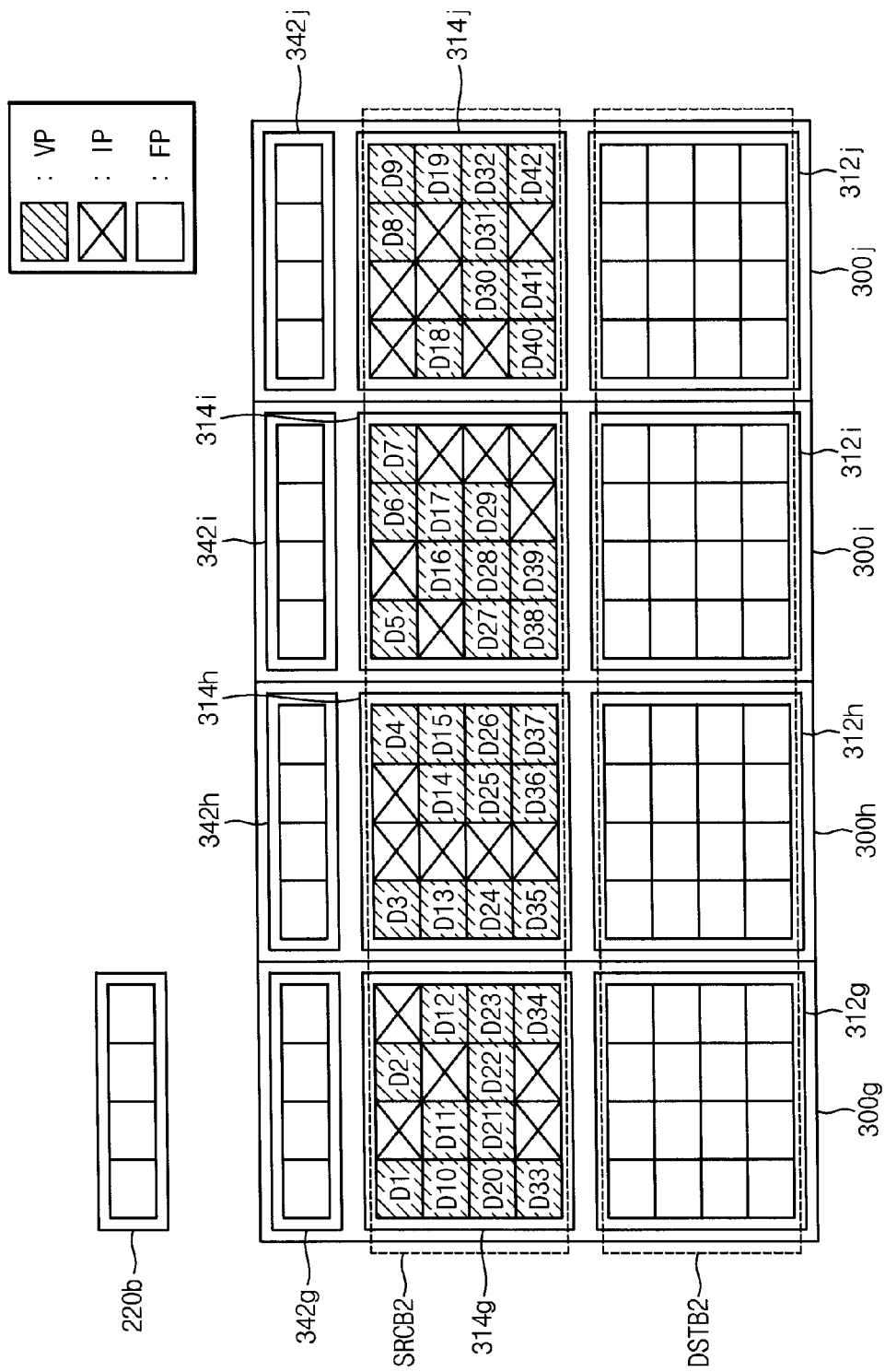

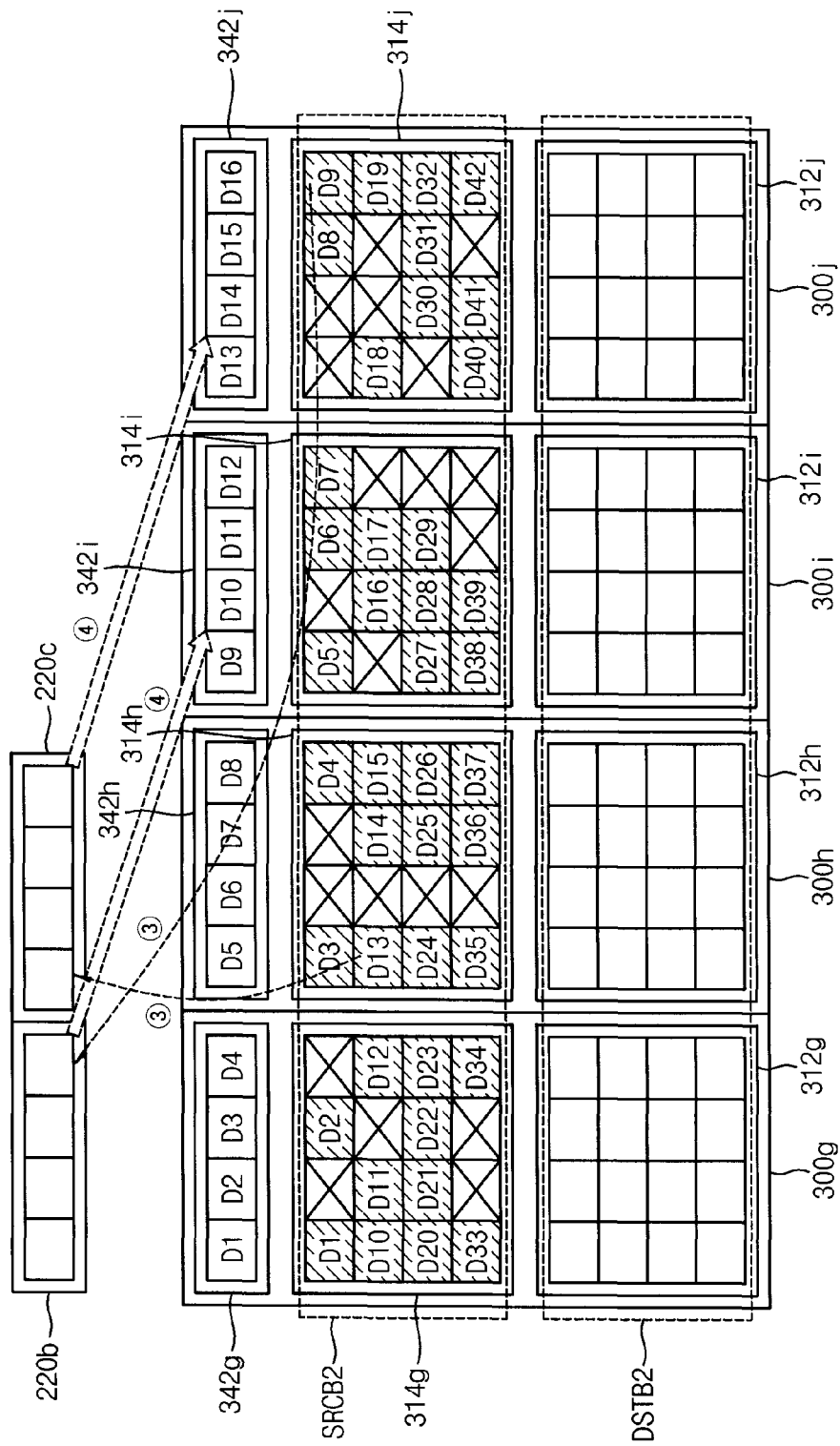

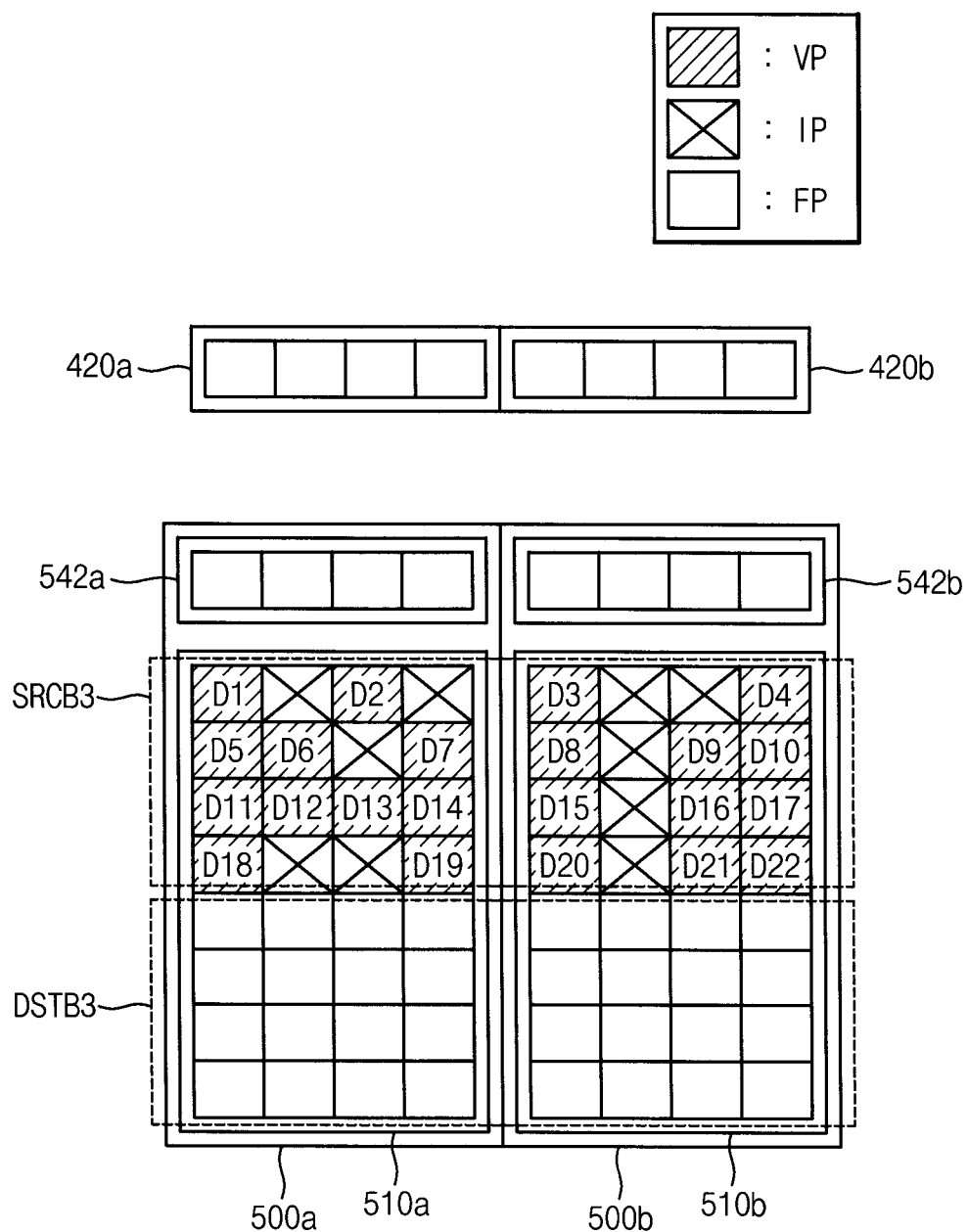

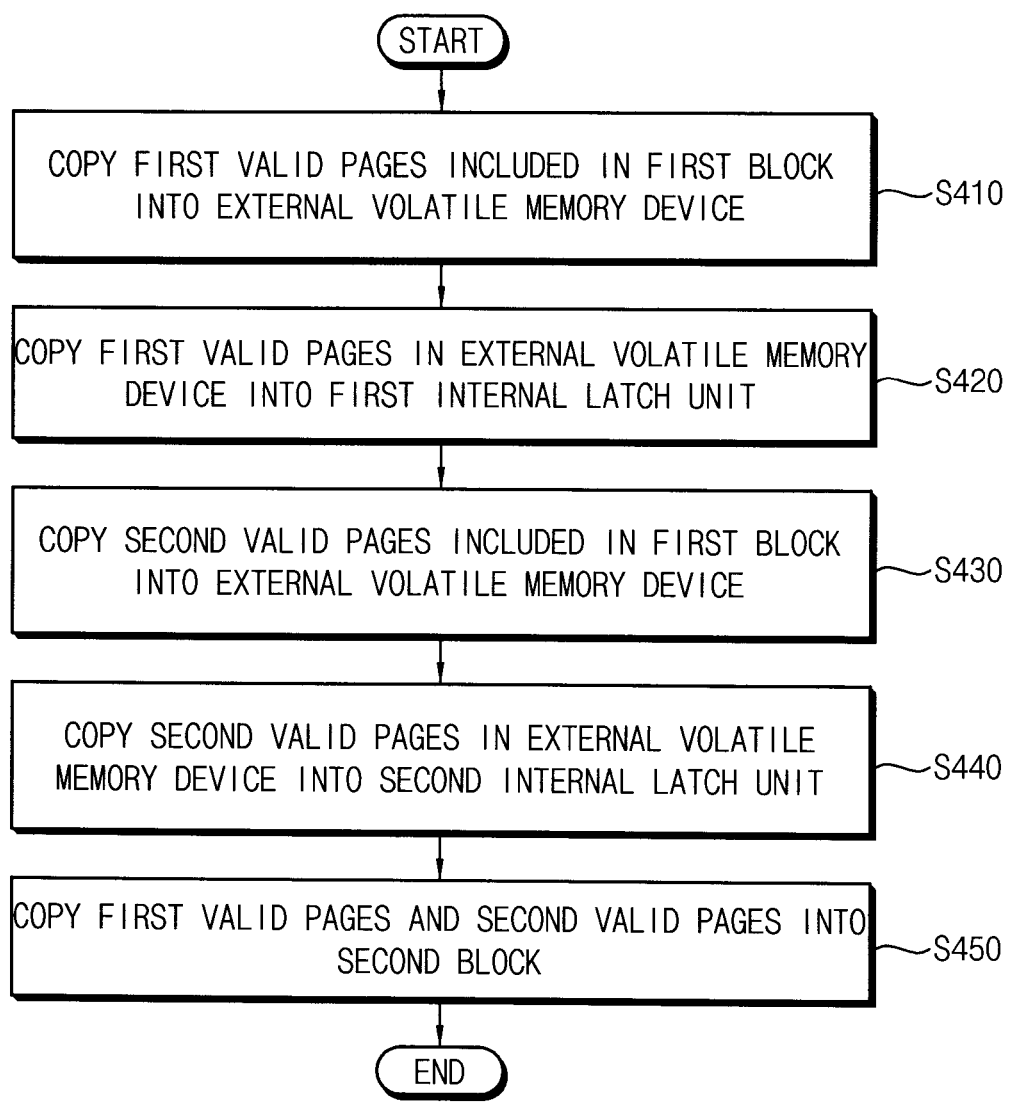

STORAGE DEVICE COMPRISING VOLATILE AND NONVOLATILE MEMORY DEVICES, AND RELATED METHODS OF OPERATION

CROSS-REFERENCE TO RELATED APPLICATION

This application claims priority under 35 USC §119 to Korean Patent Application No. 2013-0163613, filed on Dec. 26, 2013, the subject matter of which is hereby incorporated by reference.

BACKGROUND OF THE INVENTION

Embodiments of the inventive concept relate generally to storage devices, and more particularly to methods of operating storage devices comprising both volatile memory devices and nonvolatile memory devices.

Certain types of data storage devices comprise one or more semiconductor memory devices. Examples of such data storage devices include solid state drives (SSDs) and memory cards (MCs). These types of data storage devices may enjoy various design and performance advantages over conventional hard disk drives (HDD). Examples of potential advantages include the absence of moving mechanical parts, higher data access speeds, improved stability and durability, and low power consumption, to name but a few. These types of data storage device usually include both nonvolatile and volatile memories. A nonvolatile memory is typically used as a primary data storage medium, while a volatile memory is used as a data input and/or output (I/O) buffer memory (or "cache") between the nonvolatile memory and a controller or interface.

SUMMARY OF THE INVENTION

In one embodiment of the inventive concept, a method of operating a storage device comprises copying first valid pages in a first block into a first latch unit based on a first volatile memory device, the first block being set on multiple nonvolatile memory devices, copying second valid pages in the first block into a second latch unit based on the first volatile memory device, and copying the first valid pages in the first latch unit and the second valid pages in the second latch unit into a second block, the second block being set on the nonvolatile memory devices and being different from the first block.

In another embodiment of the inventive concept, a method of operating a storage device comprises separately copying first valid pages in a first block into a first volatile memory device and at least one first latch unit, the first block being set on multiple nonvolatile memory devices, separately copying second valid pages in the first block into a second volatile memory device and at least one second latch unit, and copying the first valid pages separated in the first volatile memory device and the at least one first latch unit and the second valid pages separated in the second volatile memory device and the at least one second latch unit into a second block, the second block being set on the nonvolatile memory devices and being different from the first block.

In another embodiment of the inventive concept, a storage device comprises at least one volatile memory device, including a first volatile memory device, multiple nonvolatile memory devices, and a controller. The controller is configured to copy first valid pages in a first block into a first latch unit based on a first volatile memory device, the first block being set on the multiple nonvolatile memory devices, to copy second valid pages in the first block into a second latch unit based on the first volatile memory device, and to copy the first valid pages in the first latch unit and the second valid pages in the second latch unit into a second block, the second block being set on multiple the nonvolatile memory devices and being different from the first block.

These and other embodiments of the inventive concept may potentially improve the performance of data storage devices by improving the efficiency of garbage collection operations.

BRIEF DESCRIPTION OF THE DRAWINGS

The drawings illustrate selected embodiments of the inventive concept. In the drawings, like reference numbers indicate like features.

FIG. 11A is a diagram for describing an example of the method of FIG. 10, according to an embodiment of the inventive concept.

FIG. 13C is another diagram for describing the example of the method of FIG. 12.

FIG. 19A is a diagram for describing an example of the method of FIG. 14, according to an embodiment of the inventive concept.

FIG. 22 is a flowchart illustrating a method of operating a nonvolatile memory device according to an embodiment of the inventive concept.

DETAILED DESCRIPTION

Embodiments of the inventive concept are described below with reference to the accompanying drawings. These embodiments are provided as teaching examples and should not be construed to limit the scope of the inventive concept.

In the description that follows, the terms first, second, etc. may be used to describe various features, but the described features should not be limited by these terms. Rather, these terms are used merely to distinguish one feature from another. For example, a first feature could be termed a second feature, and vice versa, without departing from the scope of the inventive concept. As used herein, the term "and/or" includes any and all combinations of one or more of the associated listed items.

Where a feature is referred to as being "connected" or "coupled" to another feature, it can be directly connected or coupled to the other feature or intervening features may be present. In contrast, where a feature is referred to as being "directly connected" or "directly coupled" to another feature, there are no intervening features present. Other terms used to describe the relationship between elements should be interpreted in a like fashion (e.g., "between" versus "directly between," "adjacent" versus "directly adjacent," etc.).

The terminology used herein is for the purpose of describing embodiments and is not intended to be limiting of the inventive concept. As used herein, the singular forms "a," "an" and "the" are intended to include the plural forms as well, unless the context clearly indicates otherwise. Terms such as "comprises," "comprising," "includes" and/or "including," where used herein, indicate the presence of stated features but do not preclude the presence or addition of one or more other features.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and will not be interpreted in an idealized or overly formal sense unless expressly so defined herein.

Figure 1:
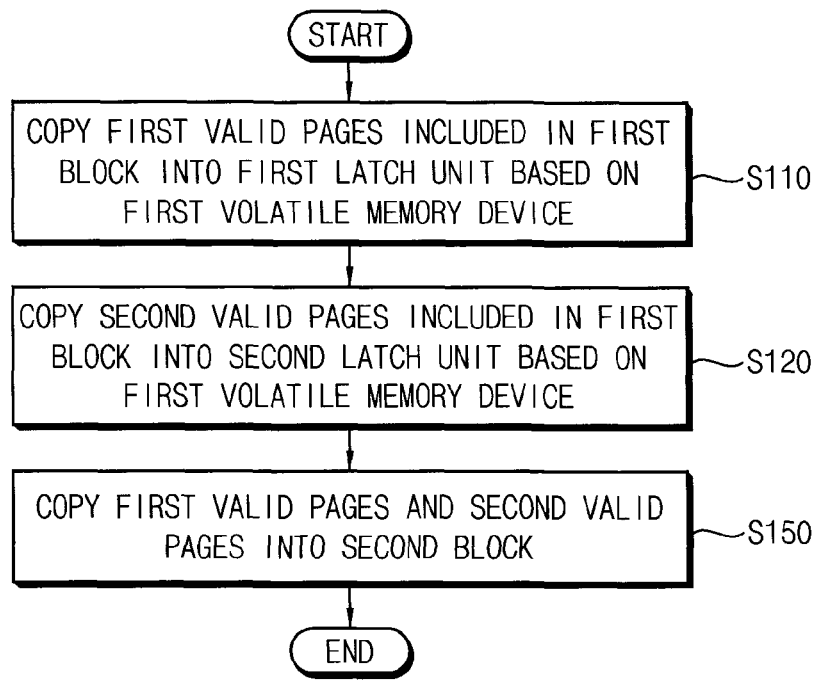
FIG. 1 is a flowchart illustrating a method of operating a storage device according to an embodiment of the inventive concept.

FIG. 1 is a flowchart illustrating a method of operating a storage device according to an embodiment of the inventive concept. The method of FIG. 1 may be applied for driving a storage device that comprises at least one volatile memory device and multiple nonvolatile memory devices. The storage device may perform a garbage collection operation based on the method of FIG. 1. As will be described below with reference to FIGS. 23 and 24, the storage device may be any of various types of storage device, such as a memory card, a solid state drive (SSD), etc.

Referring to FIG. 1, first valid pages in a first block are copied into a first latch unit based on a first volatile memory device (S110). Second valid pages in the first block are copied into a second latch unit based on the first volatile memory device (S120). The first valid pages in the first latch unit and the second valid pages in the second latch unit are copied into a second block (S150). The second block is different from the first block, and each of the first block and the second block is set on (e.g., is disposed in, or encompasses, at least a portion of) multiple nonvolatile memory devices. For example, the first block may be a source block for the garbage collection operation, and the second block may be a destination block for the garbage collection operation.

As will be described below with reference to FIG. 3, each of the nonvolatile memory devices may comprise at least one latch unit. In some embodiments, the first and second latch units may be in different nonvolatile memory devices. For example, the first latch unit may be in a first nonvolatile memory device among the nonvolatile memory devices, and the second latch unit may be in a second nonvolatile memory device among the nonvolatile memory devices.

In addition, as will be described below with reference to FIG. 3, each of the nonvolatile memory devices may comprise a memory cell array, and the memory cell array may comprise multi-level memory cells (MLCs) in which more than two bits are stored in each of memory cells and single-level memory cells (SLCs) in which only one bit is stored in each of memory cells. In this case, each of the nonvolatile memory devices may perform an on-chip buffered programming scheme, in which data are written to the MLCs via the SLCs. In some embodiments, the first block comprises MLCs, and the second block comprises SLCs.

As will be described below with reference to FIGS. 6A through 6H, step S120 may be performed after step S110 is finished, and step S150 may be performed after steps S110 and S120 are finished.

In the method of FIG. 1, the storage device may comprise at least one volatile memory device and multiple nonvolatile memory devices, and the garbage collection operation may be performed with relative efficiency based on the small number of volatile memory devices as the number of nonvolatile memory devices. For example, in some embodiments multiple valid pages in a source block are not copied into a destination block via multiple volatile memory devices. Instead, the valid pages in the source block are sequentially copied into multiple internal latch units via the at least one volatile memory device, and then the valid pages in the internal latch units are copied to the destination block. Accordingly, a capacity and a size of the volatile memory device may be reduced, and thus the storage device may have a relatively small size and a relatively improved performance.

Figure 2:
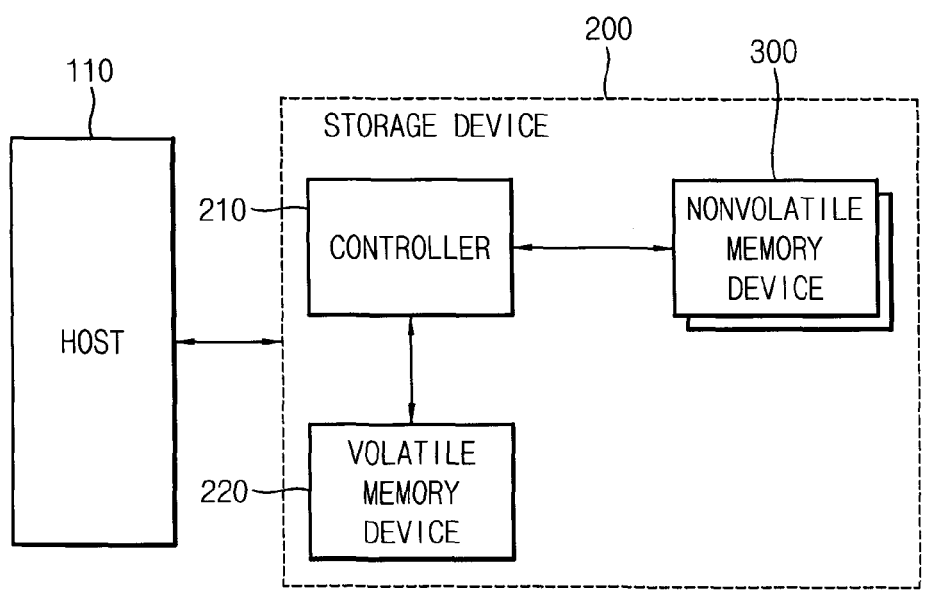
FIG. 2 is a block diagram illustrating a system comprising a storage device according to an embodiment of the inventive concept.

FIG. 2 is a block diagram illustrating a system comprising the storage device according to an embodiment of the inventive concept.

Referring to FIG. 2, a system 100a comprises a host 110 and a storage device 200.

Host 110 may perform various computing functions, such as executing specific software for performing specific calculations or tasks. Host 110 may execute an operating system (OS) and/or applications. Although not illustrated in FIG. 2, host 110 may comprise a processor, a main memory, and a bus.

Storage device 200 comprises a controller 210, at least one volatile memory device 220, and multiple nonvolatile memory devices 300.

Controller 210 receives a command from host 110 and controls an operation of storage device 200 based on the command. In addition, controller 210 may perform the garbage collection operation for storage device 200 without any command received from host 110. For example, where the number of invalid pages in nonvolatile memory devices 300 is greater than a reference number, or where a predetermined time is elapsed from which storage device 200 begins to operate, the garbage collection operation may be performed without any command.

The at least one volatile memory device 220 may serve as a write buffer that temporarily stores write data provided from host 110 and/or as a read cache that temporarily stores read data retrieved from nonvolatile memory devices 300. For example, the at least one volatile memory device 220 may be implemented using one or more a dynamic random access memory (DRAM), a static random access memory (SRAM), a mobile DRAM, etc. Although FIG. 2 illustrates an example where volatile memory device 220 is located external to controller 210, in some embodiments, volatile memory device 220 may be located internal to controller 210.

Nonvolatile memory devices 300 may be used to store write data provided from host 110, and may be subsequently used to provide requested read data. Nonvolatile memory devices 300 will retain stored data even in the absence of applied power to nonvolatile memory devices 300. For example, each of nonvolatile memory devices 300 may be implemented using one or more a flash memory, a phase random access memory (PRAM), a ferroelectric random access memory (FRAM), a resistive random access memory (RRAM), a magnetic random access memory (MRAM), etc.

Figure 3:
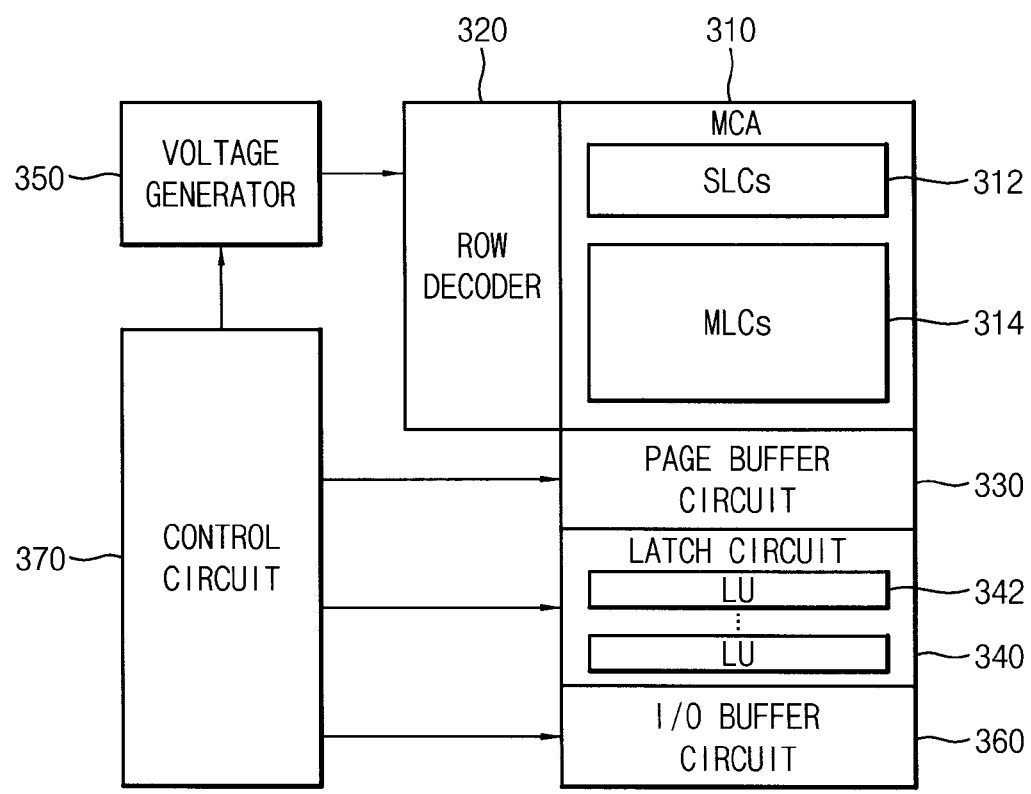
FIG. 3 is a block diagram illustrating a nonvolatile memory device in the storage device of FIG. 2, according to an embodiment of the inventive concept.

FIG. 3 is a block diagram illustrating a nonvolatile memory device in the storage device of FIG. 2.

Referring to FIG. 3, a nonvolatile memory device 300 comprises a memory cell array 310, a row decoder 320, a page buffer circuit 330, a latch circuit 340, a voltage generator 350, an input/output (I/O) buffer circuit 360 and a control circuit 370.

Memory cell array 310 comprises multiple memory cells that store data. Each of the memory cells is connected to a corresponding one of multiple wordlines and a corresponding one of multiple bitlines. As will be described below with reference to FIG. 4, the memory cells may be NAND flash memory cells and may be arranged in a two-dimensional (2-D) array structure. As will be described below with reference to FIG. 17, the memory cells may alternatively be the NAND flash memory cells and may be arranged in a three-dimensional (3-D) vertical array structure (e.g., a vertical memory device having a stacked structure).

Figure 4:
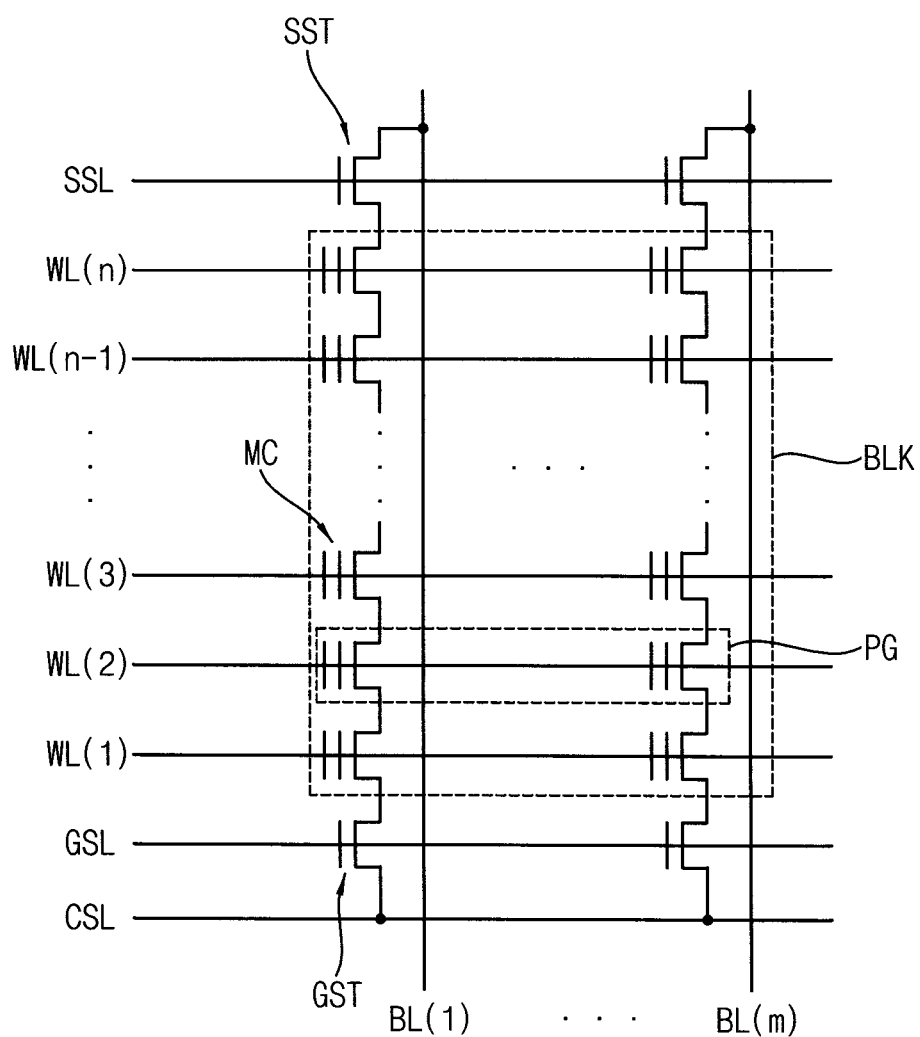
FIG. 4 is a diagram illustrating a memory cell array in the nonvolatile memory device of FIG. 3, according to an embodiment of the inventive concept.
Figure 17:
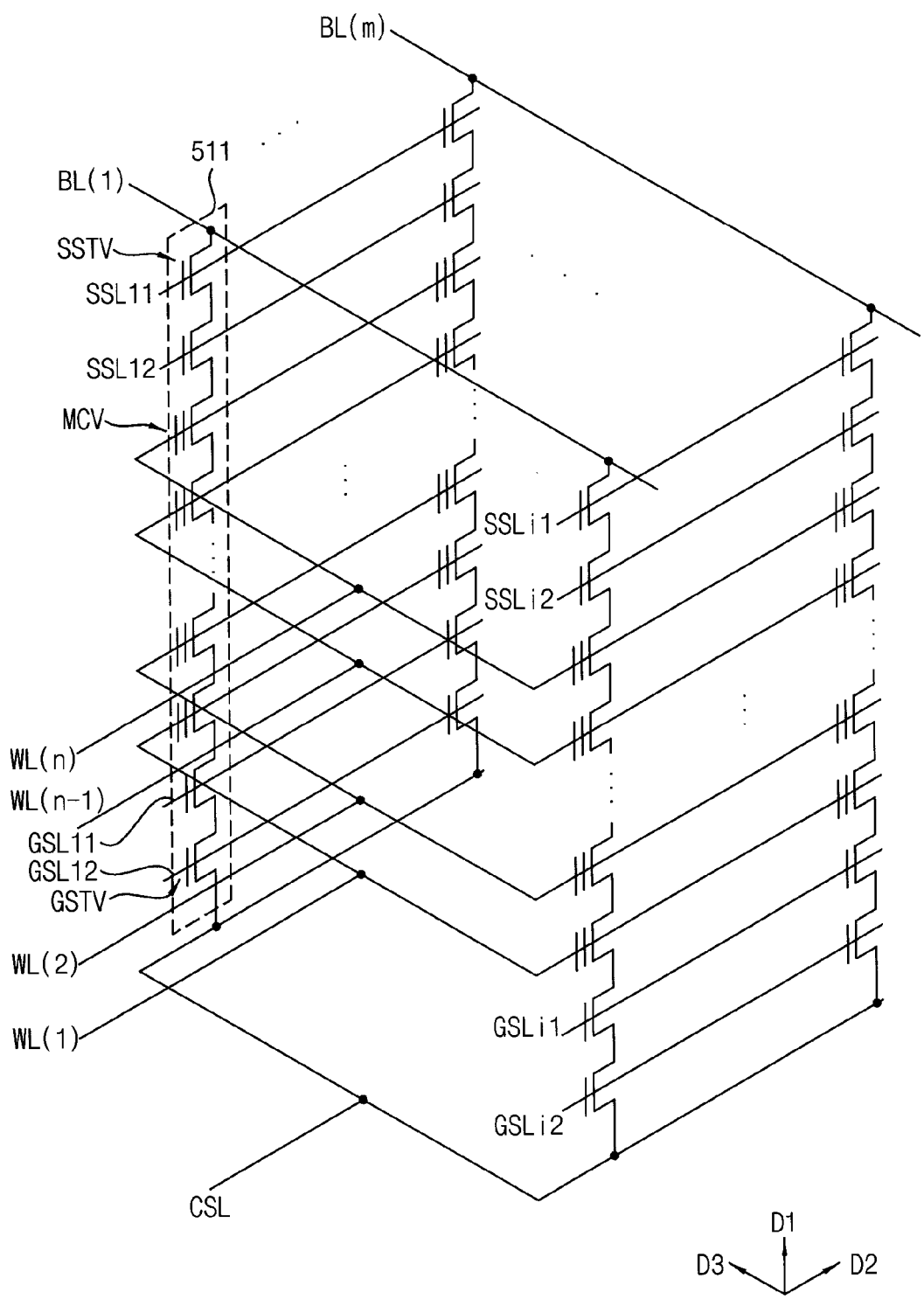
FIG. 17 is a diagram illustrating a memory cell array in the nonvolatile memory device of FIG. 16.

Although not illustrated in FIGS. 4 and 17, the memory cells may be NOR flash memory cells.

In some embodiments, memory cell array 310 comprises SLCs 312 and MLCs 314. In other words, each of the memory cells may be one of the SLC and the MLC. Write data may be programmed into memory cell array 310 in nonvolatile memory device 300 based on the on-chip buffered programming scheme.

Latch circuit 340 comprises multiple latch units 342. In some embodiments, during the garbage collection operation, data stored in valid pages is temporarily stored in at least a part of latch units 342. In other embodiments, during a program operation, each bit of multi-bit data to be programmed into MLCs 314 is temporarily stored in at least a part of latch units 342. In still other embodiments, during a read operation, at least a part of latch units 342 may be used for an error checking and correction (ECC) operation that is performed by an ECC circuit (not illustrated) or by a firmware. Although FIG. 3 illustrates an example where latch units 342 are located external to page buffer circuit 330, in some embodiments, latch units 342 may be located internal to page buffer circuit 330.

Page buffer circuit 330 is connected to the bitlines, and it stores write data to be programmed into memory cell array 310 or read data that are sensed from memory cell array 310. In other words, page buffer circuit 330 may operate as a write driver or a sensing amplifier according to an operation mode of nonvolatile memory device 300. For example, page buffer circuit 330 may operate as the write driver in a program mode, in which the program operation is performed, and may operate as the sensing amplifier in a read mode, in which the read operation is performed.

I/O buffer circuit 360 receives write data to be programmed in memory cell array 310 from an external memory controller (e.g., element 210 in FIG. 2), and it transmits read data output from memory cell array 310 to the external memory controller.

Row decoder 320 is connected to the wordlines, and it selects at least one of the wordlines in response to a row address. Voltage generator 350 may generate wordline voltages, such as a program voltage, a pass voltage, a verification voltage, an erase voltage, a read voltage, etc. according to a control of control circuit 370. Control circuit 370 controls row decoder 320, page buffer circuit 330, latch circuit 340, voltage generator 350, and I/O buffer circuit 360 to perform the program, erase and read operations for memory cell array 310.

FIG. 4 is a diagram illustrating a memory cell array in the nonvolatile memory device of FIG. 3, according to an embodiment of the inventive concept.

Referring to FIG. 4, a memory cell array 310 comprises string selection transistors SST, ground selection transistors GST and memory cells MC. String selection transistors SST may be connected to bitlines BL(1), . . . , BL(m), and ground selection transistors GST are connected to a common source line CSL. Memory cells MC arranged in the same row are disposed in series between one of bitlines BL(1), . . . , BL(m) and common source line CSL, and memory cells MC arranged in the same column are connected in common to one of wordlines WL(1), WL(2), WL(3), . . . , WL(n−1), WL(n). In other words, memory cells MC may be connected in series between string selection transistors SST and ground selection transistors GST, and the 16, 32 or 64 wordlines may be disposed between a string selection line SSL and a ground selection line GSL.

String selection transistors SST are connected to string selection line SSL such that string selection transistors SST is controlled according to a level of a voltage applied from string selection line SSL. Memory cells MC are controlled according to a level of a voltage applied to wordlines WL(1), . . . , WL(n).

A nonvolatile memory device comprising memory cell array 310 may be a NAND flash memory device. The NAND flash memory device may perform the program and read operations in units of page PG and the erase operation in units of block BLK. In some embodiments, each of page buffers may be connected to even and odd bitlines one by one. In this case, the even bitlines form an even page, the odd bitlines form an odd page, and the program operation for memory cells MC of the even and odd pages may be performed by turns and sequentially.

Figure 5A:
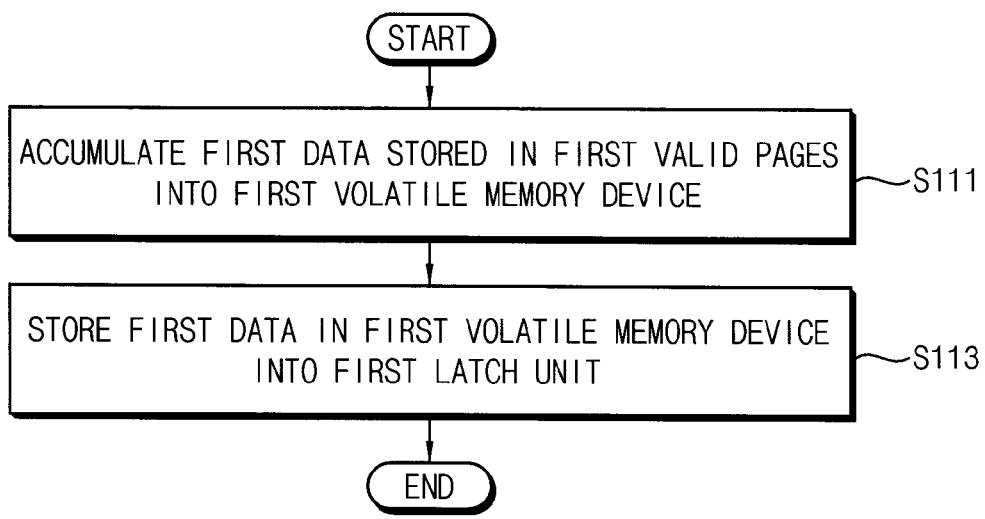
FIG. 5A is a flowchart illustrating an example of a first step in the method of FIG. 1, according to an embodiment of the inventive concept.
Figure 5B:
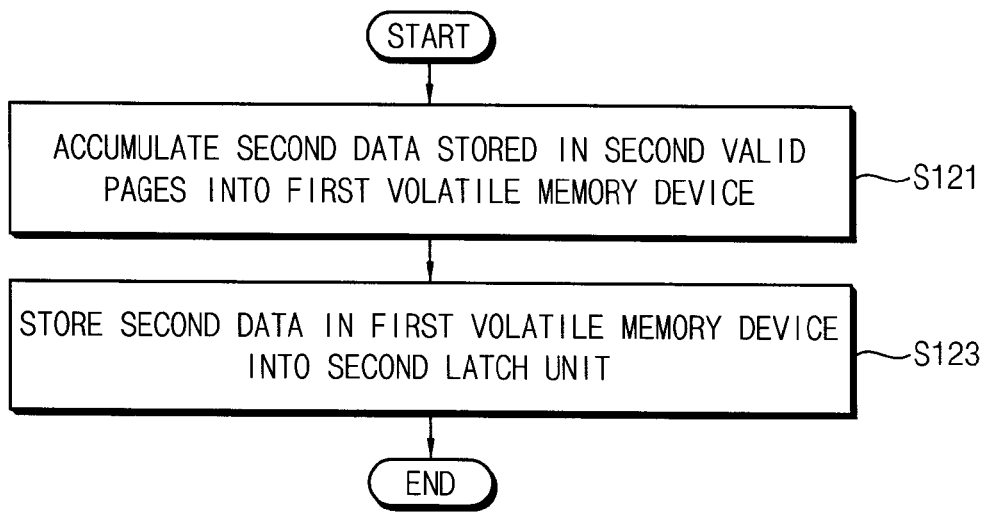
FIG. 5B is a flowchart illustrating an example of a first step in the method of FIG. 1, according to an embodiment of the inventive concept.
Figure 5C:
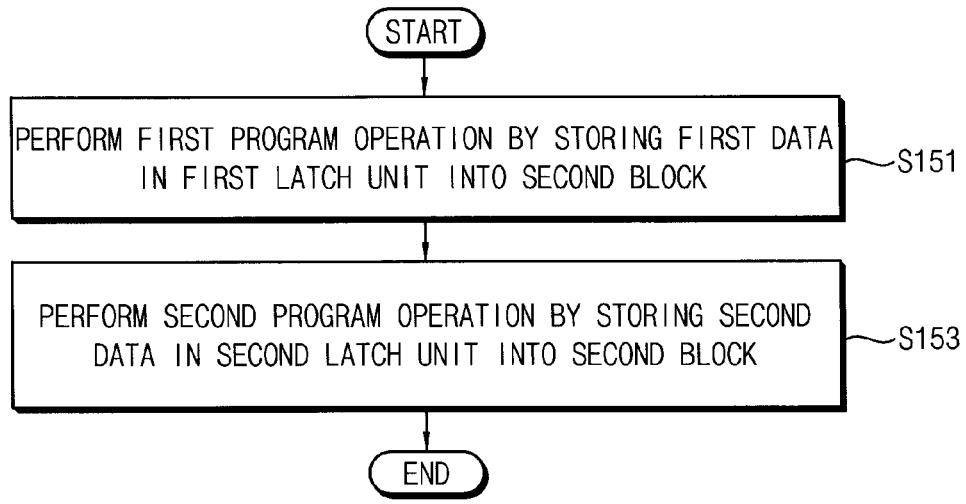
FIG. 5C is a flowchart illustrating an example of a first step in the method of FIG. 1, according to an embodiment of the inventive concept.

FIGS. 5A, 5B and 5C are flowcharts illustrating examples of steps in the method of FIG. 1. FIG. 5A illustrates an example of step S110 in FIG. 1. FIG. 5B illustrates an example of step S120 in FIG. 1. FIG. 5C illustrates an example of step S150 in FIG. 1.

Referring to FIGS. 1 and 5A, in step S110, first data stored in the first valid pages is accumulated in the first volatile memory device (S111), and the first data in the first volatile memory device is stored in the first latch unit (S113).

Referring to FIGS. 1 and 5B, in step S120, second data stored in the second valid pages is accumulated in the first volatile memory device (S121). The second data in the first volatile memory device is stored in the second latch unit (S123).

Referring to FIGS. 1 and 5C, in step S150, a first program operation is performed to store the first data in the first latch unit into the second block (S151). A second program operation is performed to store the second data in the second latch unit into the second block (S153). The second program operation is initiated before the first program operation is finished.

FIGS. 6A, 6B, 6C, 6D, 6E, 6F, 6G and 6H are diagrams for describing an example of the method of FIG. 1.

Figure 6A:
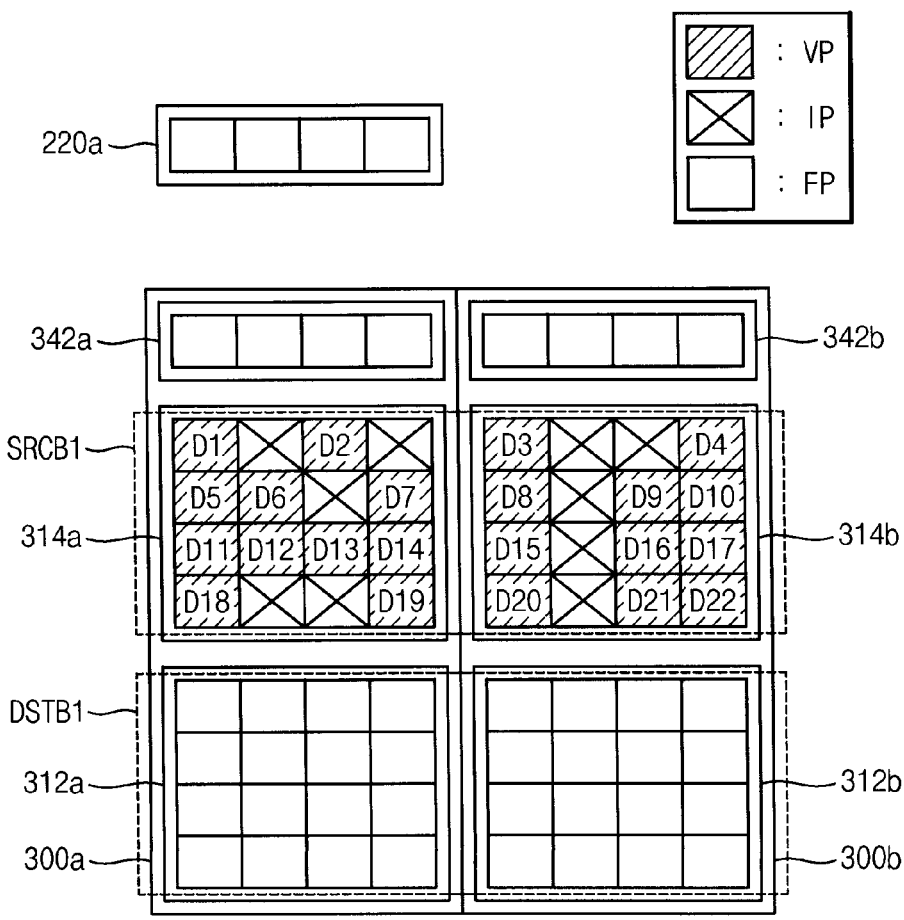
FIG. 6A is a diagram for describing an example of the method of FIG. 1, according to an embodiment of the inventive concept.

Referring to FIG. 6A, a storage device comprises a first volatile memory device 220a, a first nonvolatile memory device 300a, and a second nonvolatile memory device 300b. First nonvolatile memory device 300a comprises first SLCs 312a, first MLCs 314a, and a first latch unit 342a. Second nonvolatile memory device 300b comprises second SLCs 312b, second MLCs 314b and a second latch unit 342b. A first block SRCB1 (e.g., a source block) for the garbage collection operation is set on first and second MLCs 314a and 314b. A second block DSTB1 (e.g., a destination block) for the garbage collection operation is set on first and second SLCs 312a and 312b. For convenience of illustration, other elements (e.g., a row decoder, a page buffer circuit, an I/O buffer circuit, etc.) in nonvolatile memory devices 300a and 300b may be omitted in FIG. 6A.

First block SRCB1 comprises valid pages VP and invalid pages IP, and second block DSTB1 comprises free pages FP. Data D1, D2, D3, D4, D5, D6, D7, D8, D9, D10, D11, D12, D13, D14, D15, D16, D17, D18, D19, D20, D21 and D22 is stored in valid pages VP.

Where the garbage collection operation is performed based on the above described method of operating the storage device, only valid pages VP in first block SRCB1 are copied into second block DSTB1.

Figure 6B:
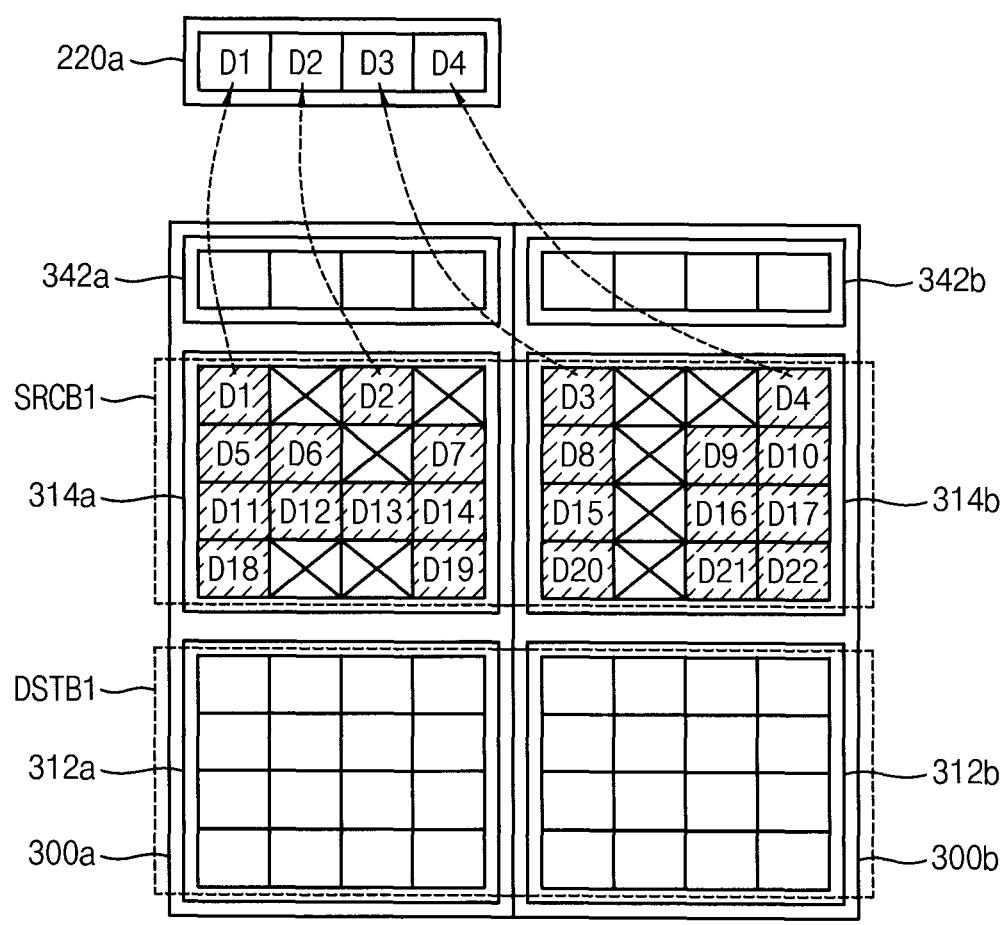
FIG. 6B is another diagram for describing the example of the method of FIG. 1.

Referring to FIG. 6B, first data D1, D2, D3 and D4 is accumulated in first volatile memory device 220a. First data D1, D2, D3 and D4 is stored in first valid pages among valid pages VP in first block SRCB1 before the garbage collection operation is performed.

Figure 6C:
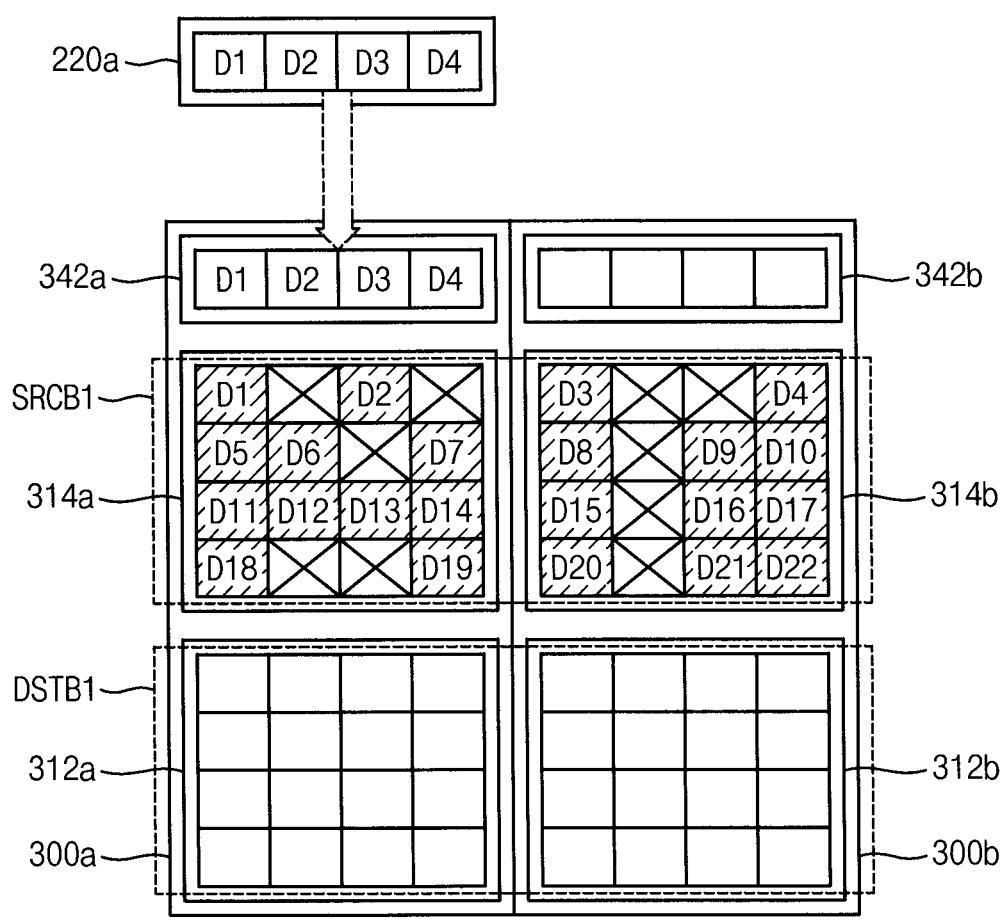
FIG. 6C is another diagram for describing the example of the method of FIG. 1.

Referring to FIG. 6C, first data D1, D2, D3 and D4 in first volatile memory device 220a may be stored in first latch unit 342a. Although not illustrated in FIG. 6C, after first data D1, D2, D3 and D4 is stored in first latch unit 342a, first data D1, D2, D3 and D4 in first volatile memory device 220a may be erased.

Figure 6D:
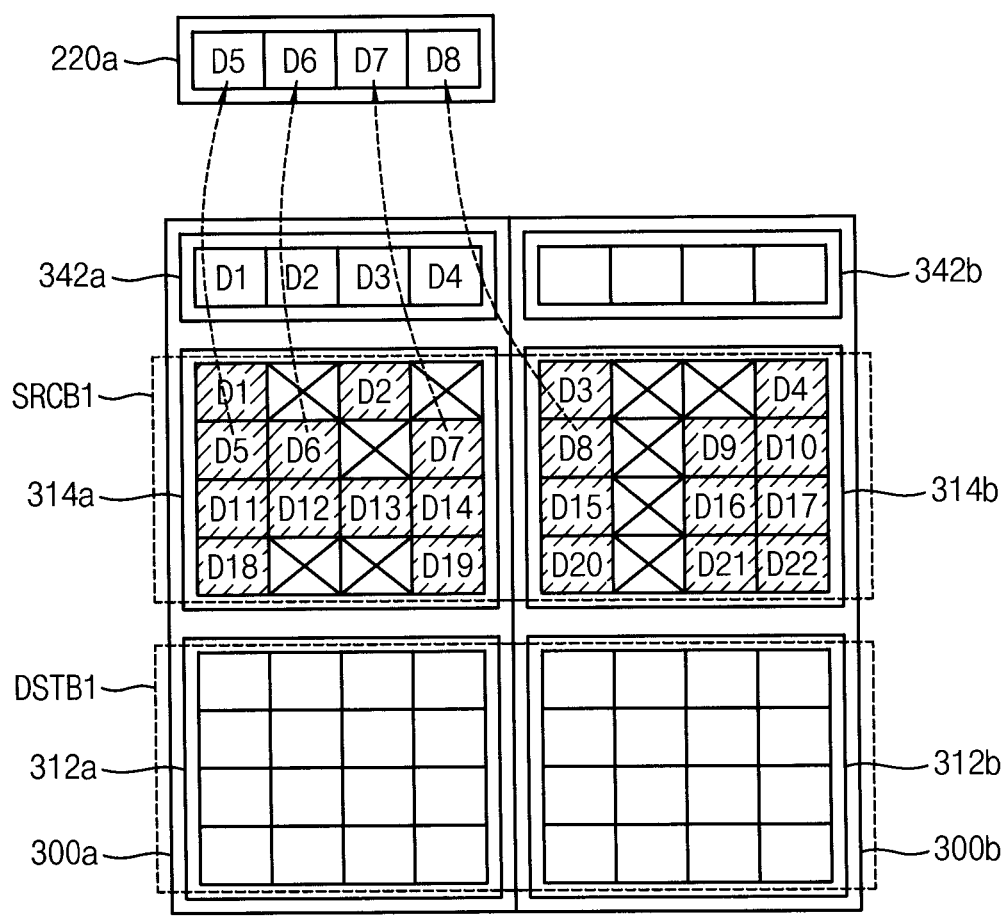
FIG. 6D is another diagram for describing the example of the method of FIG. 1.

Referring to FIG. 6D, second data D5, D6, D7 and D8 is accumulated in first volatile memory device 220a. Second data D5, D6, D7 and D8 is stored in second valid pages among valid pages VP in first block SRCB1 before garbage collection operation is performed.

Figure 6E:
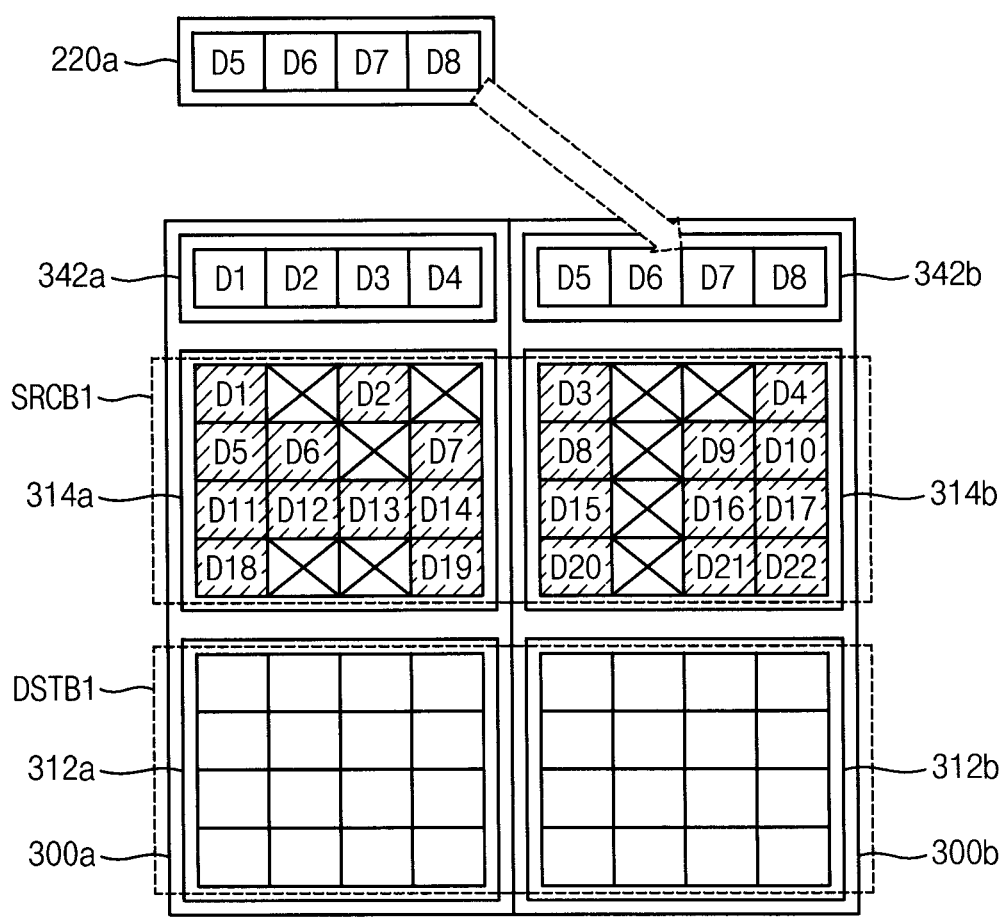
FIG. 6E is another diagram for describing the example of the method of FIG. 1.

Referring to FIG. 6E, second data D5, D6, D7 and D8 in first volatile memory device 220a may be stored in second latch unit 342b. Although not illustrated in FIG. 6E, after second data D5, D6, D7 and D8 is stored in second latch unit 342b, second data D5, D6, D7 and D8 in first volatile memory device 220a may be erased.

Figure 6F:
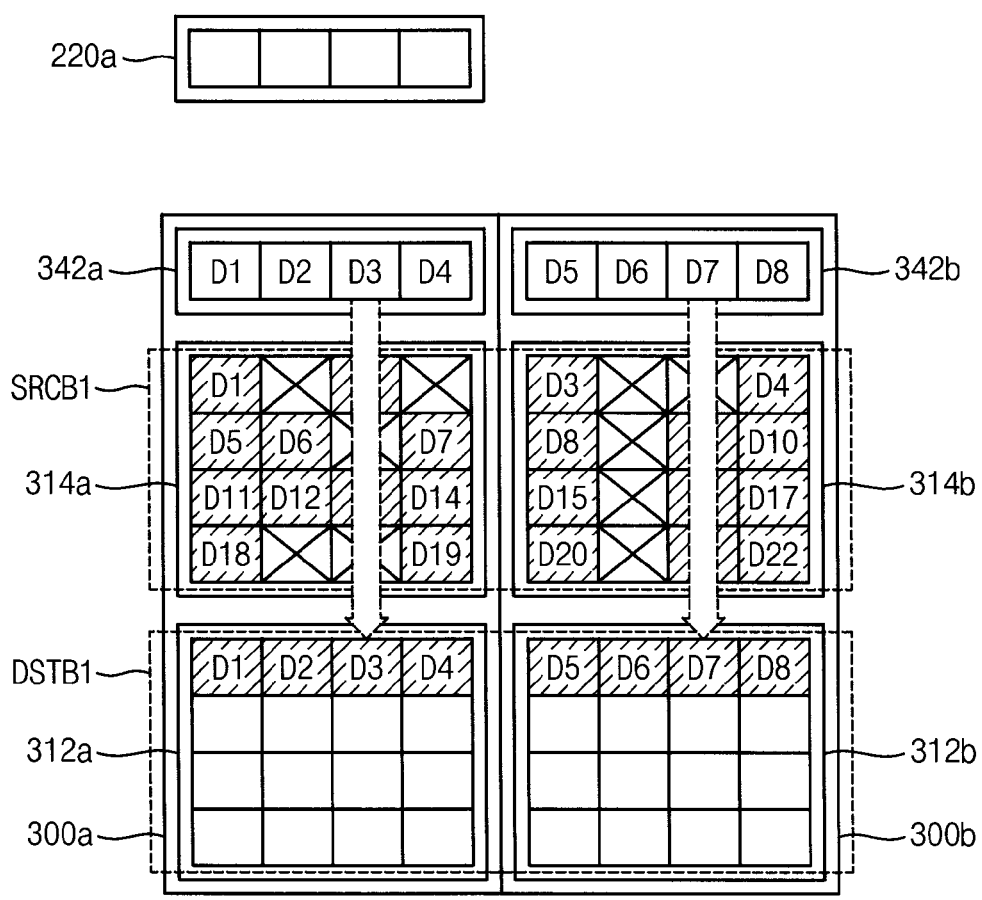
FIG. 6F is another diagram for describing the example of the method of FIG. 1.
Figure 6G:
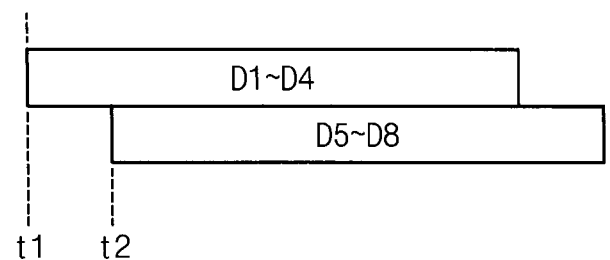
FIG. 6G is another diagram for describing the example of the method of FIG. 1.
Figure 6H:
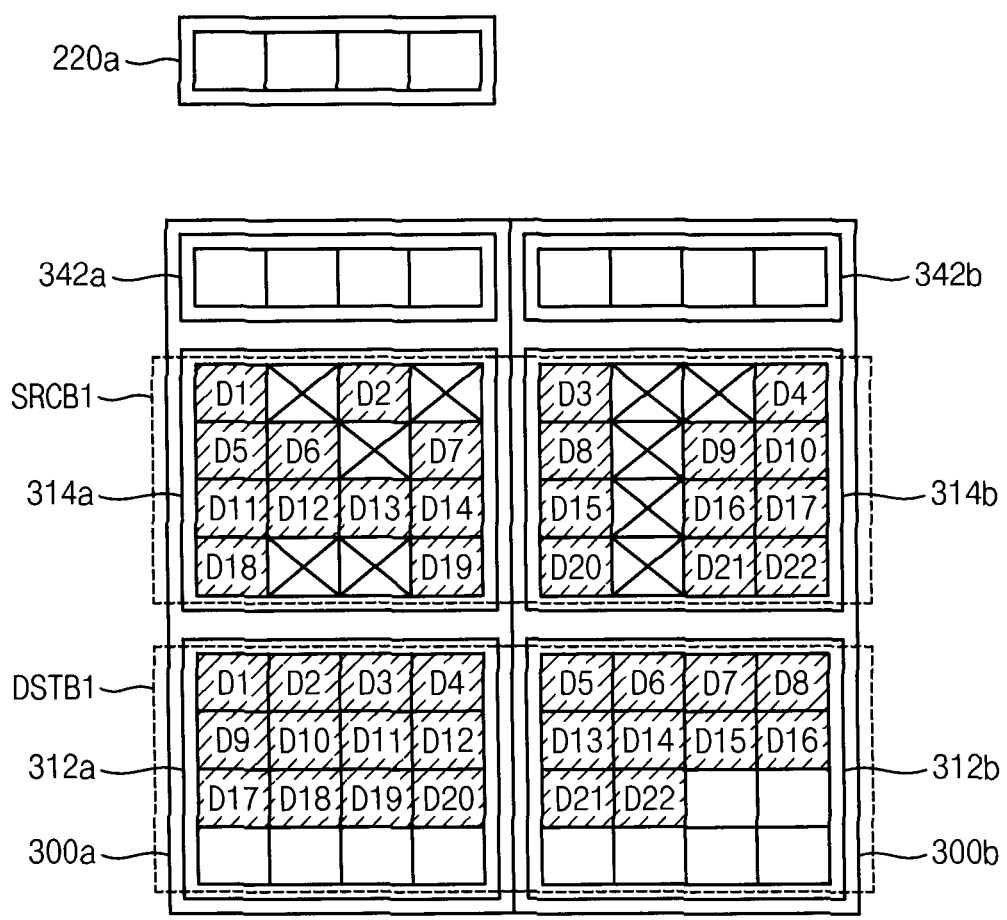
FIG. 6H is another diagram for describing the example of the method of FIG. 1.

Referring to FIGS. 6F and 6G, first data D1, D2, D3 and D4 in first latch unit 342a and second data D5, D6, D7 and D8 in second latch unit 342b are stored in second block DSTB1. As illustrated in FIG. 6G, a first program operation, in which first data D1, D2, D3 and D4 in first latch unit 342a are stored in second block DSTB1, is initiated at time t1. A second program operation, in which second data D5, D6, D7 and D8 in second latch unit 342b are stored in second block DSTB1, is initiated before the first program operation is finished (e.g., at time t2). Such operations, where the second program operation is initiated before the first program operation is finished, may be referred to as an interleaving scheme.

Operations similar to the examples described above with reference to FIGS. 6B through 6G will be performed for the other valid pages among valid pages VP in first block SRCB1. Finally, as illustrated in FIG. 6F, all valid pages VP in first block SRCB1 are copied into second block DSTB1, and the data D1~D22 stored in valid pages VP in first block SRCB1 may be sequentially stored in the free pages FP in second block DSTB1.

For convenience of illustration, FIGS. 6B and 6D illustrate examples where first data D1, D2, D3 and D4 and second data D5, D6, D7 and D8 are directly transmitted from first block SRCB1 to first volatile memory device 220a, FIGS. 6C and 6E illustrate examples where first data D1, D2, D3 and D4 and second data D5, D6, D7 and D8 are directly transmitted from first volatile memory device 220a to the first and second latch units 342a and 342b, and FIG. 6F illustrates an example where first data D1, D2, D3 and D4 and second data D5, D6, D7 and D8 are directly transmitted from the first and second latch units 342a and 342b to second block DSTB1. However, such data transmissions may be performed through a page buffer circuit (e.g., element 330 in FIG. 3) and/or an I/O buffer circuit (e.g., element 360 in FIG. 6) in the nonvolatile memory device.

FIGS. 7A, 7B, 7C, 7D, 7E and 7F are diagrams for describing another example of the method of FIG. 1.

Figure 7A:
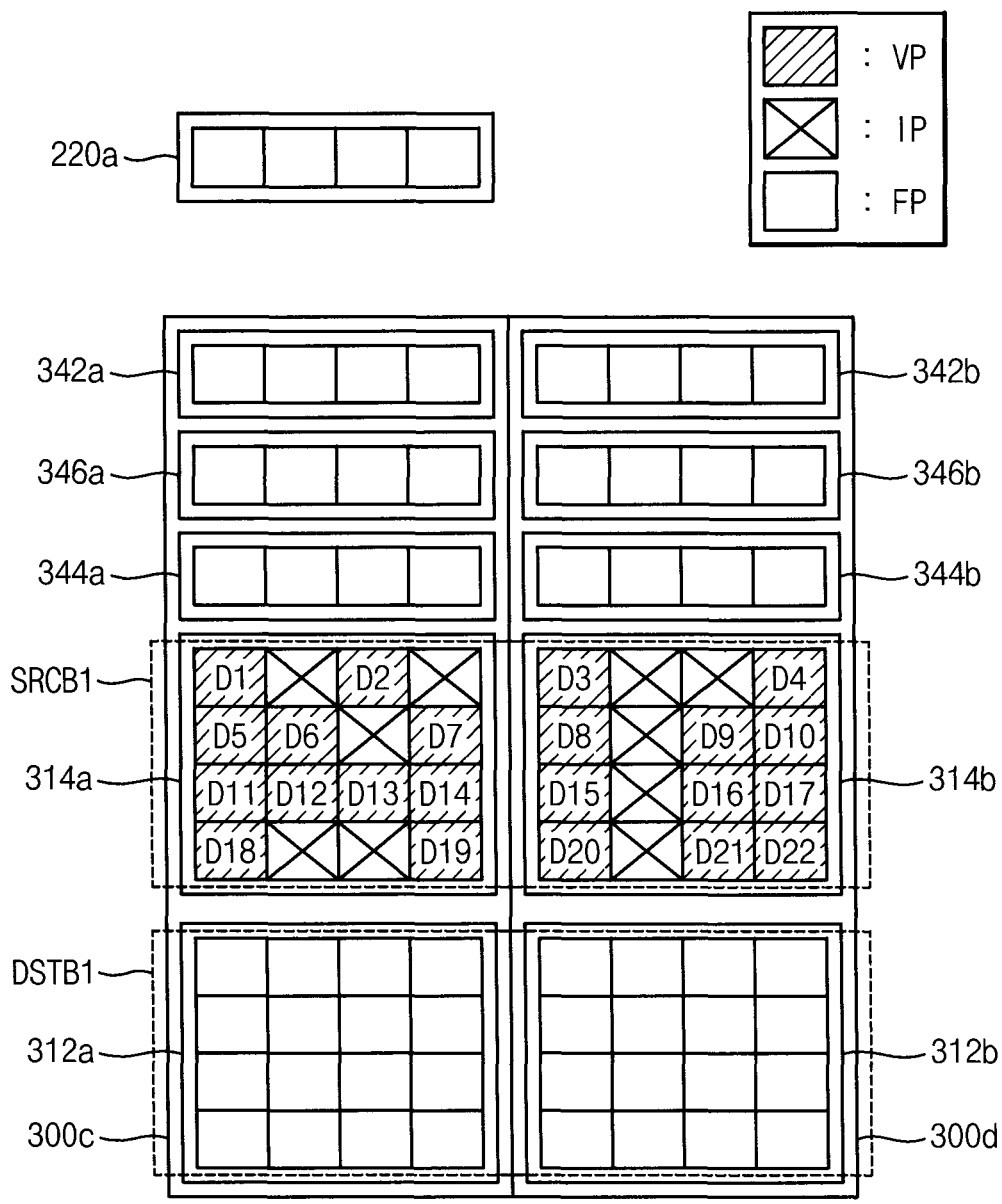
FIG. 7A is a diagram for describing an additional example of the method of FIG. 1, according to an embodiment of the inventive concept.

Referring to FIG. 7A, a storage device comprises a first volatile memory device 220a, a first nonvolatile memory device 300c, and a second nonvolatile memory device 300d. First volatile memory device 220a in FIG. 7A may be substantially the same as first volatile memory device 220a in FIG. 6A. First nonvolatile memory device 300c in FIG. 7A may be substantially the same as first nonvolatile memory device 300a in FIG. 6A, except that first nonvolatile memory device 300c in FIG. 7A further comprises latch units 344a and 346a. Second nonvolatile memory device 300d in FIG. 7A may be substantially the same as second nonvolatile memory device 300b in FIG. 6A, except that the second nonvolatile memory device 300d in FIG. 7A further includes latch units 344b and 346b.

Figure 7B:
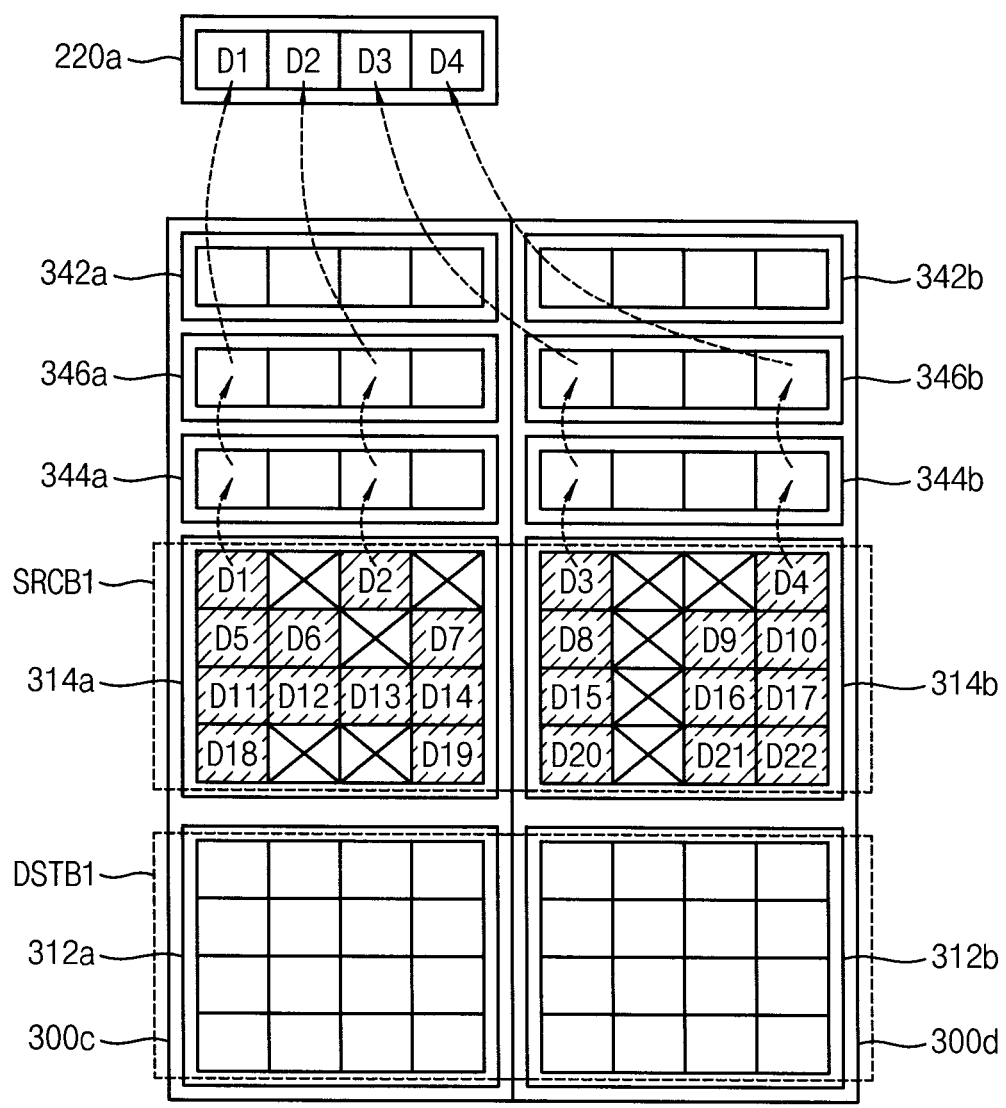
FIG. 7B is another diagram for describing the additional example of the method of FIG. 1.

Referring to FIG. 7B, first data D1, D2, D3 and D4 is accumulated in first volatile memory device 220a. First data D1, D2, D3 and D4 may be stored in first valid pages among valid pages VP in first block SRCB1 before the garbage collection operation is performed. As illustrated in FIG. 7B, first data D1, D2, D3 and D4 is accumulated in first volatile memory device 220a via at least one latch unit different from first latch unit 342a, e.g., via latch units 344a, 346a, 344b and 346b. As described above with reference to FIG. 3, latch units 344a, 346a, 344b and 346b may be used for the ECC operation, and thus errors in first data D1, D2, D3 and D4 may be corrected if first data D1, D2, D3 and D4 are accumulated in first volatile memory device 220a via latch units 344a, 346a, 344b and 346b.

Figure 7C:
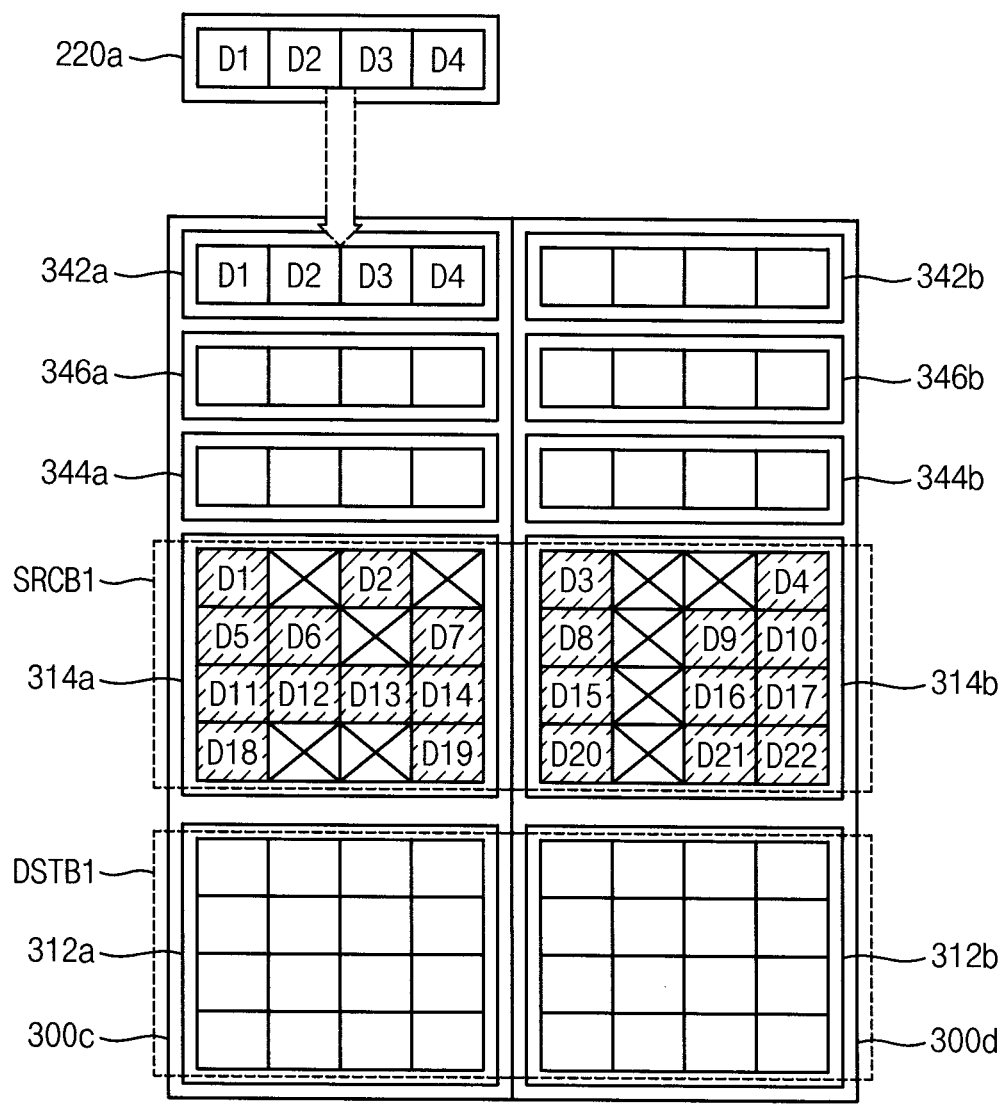
FIG. 7C is another diagram for describing the additional example of the method of FIG. 1.

Referring to FIG. 7C, first data D1, D2, D3 and D4 in first volatile memory device 220a may be stored in first latch unit 342a.

Figure 7D:
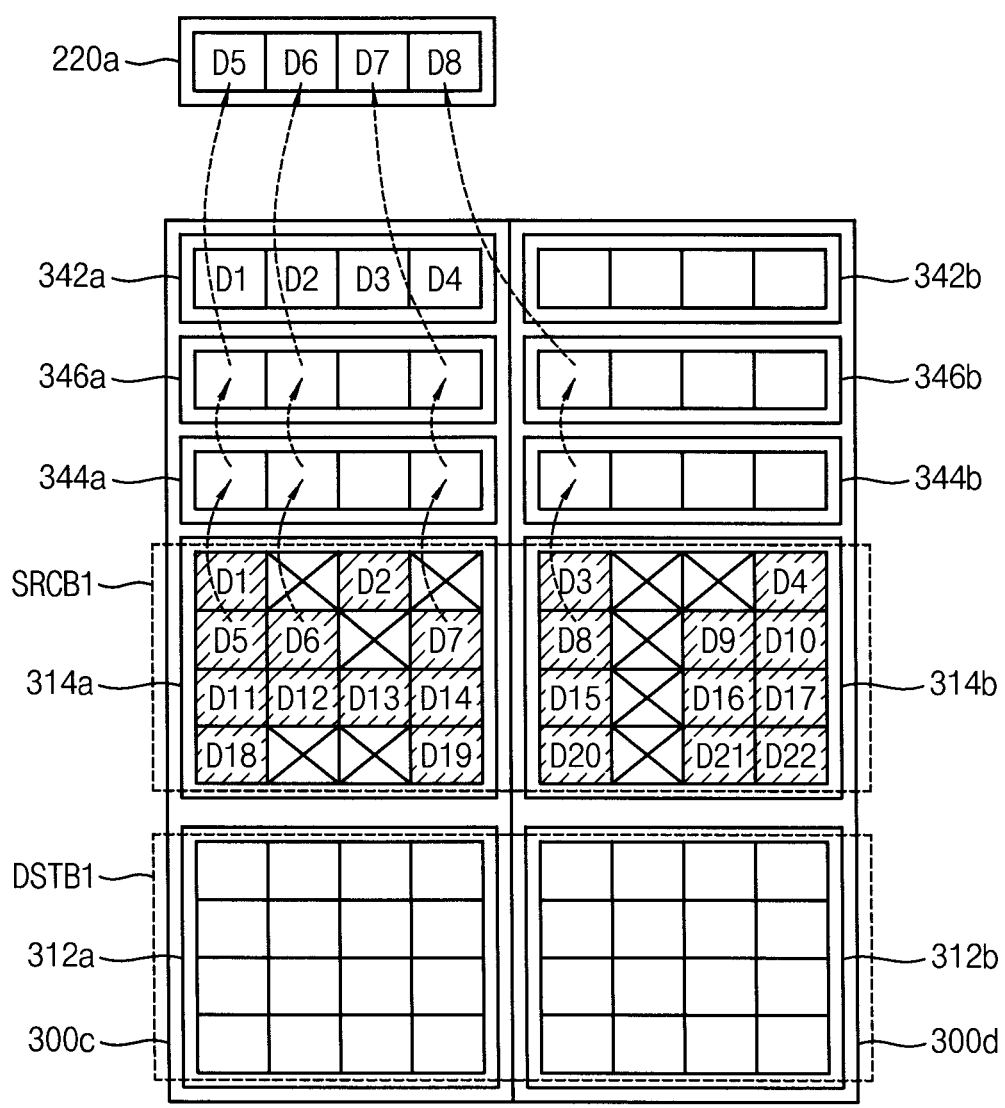
FIG. 7D is another diagram for describing the additional example of the method of FIG. 1.

Referring to FIG. 7D, second data D5, D6, D7 and D8 is accumulated in first volatile memory device 220a. Second data D5, D6, D7 and D8 is stored in second valid pages among valid pages VP in first block SRCB1 before the garbage collection operation is performed. As illustrated in FIG. 7D, second data D5, D6, D7 and D8 is accumulated in first volatile memory device 220a via at least one latch unit different from second latch unit 342b, e.g., via latch units 344a, 346a, 344b and 346b, and thus errors in second data D5, D6, D7 and D8 may be corrected.

Figure 7E:
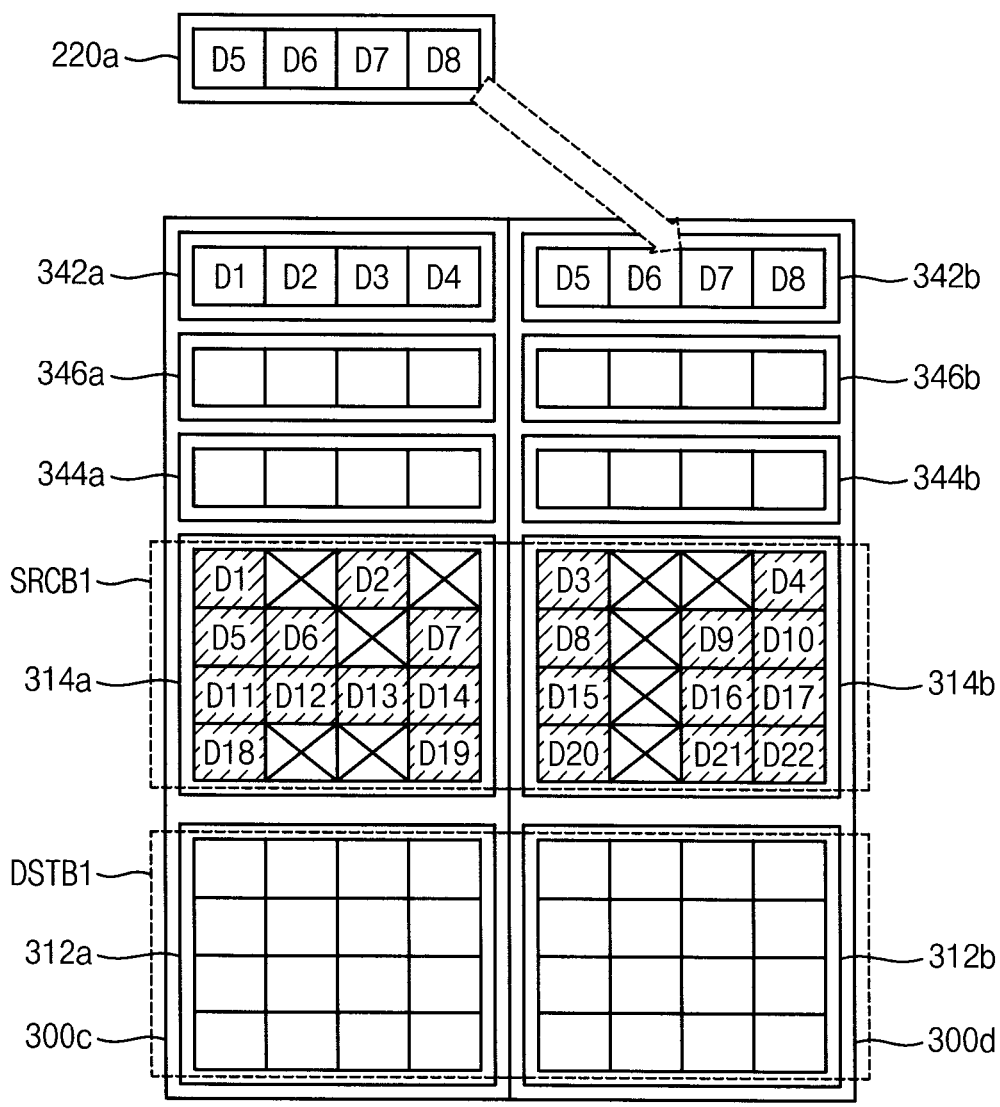
FIG. 7E is another diagram for describing the additional example of the method of FIG. 1.

Referring to FIG. 7E, second data D5, D6, D7 and D8 in first volatile memory device 220a may be stored in second latch unit 342b.

Figure 7F:
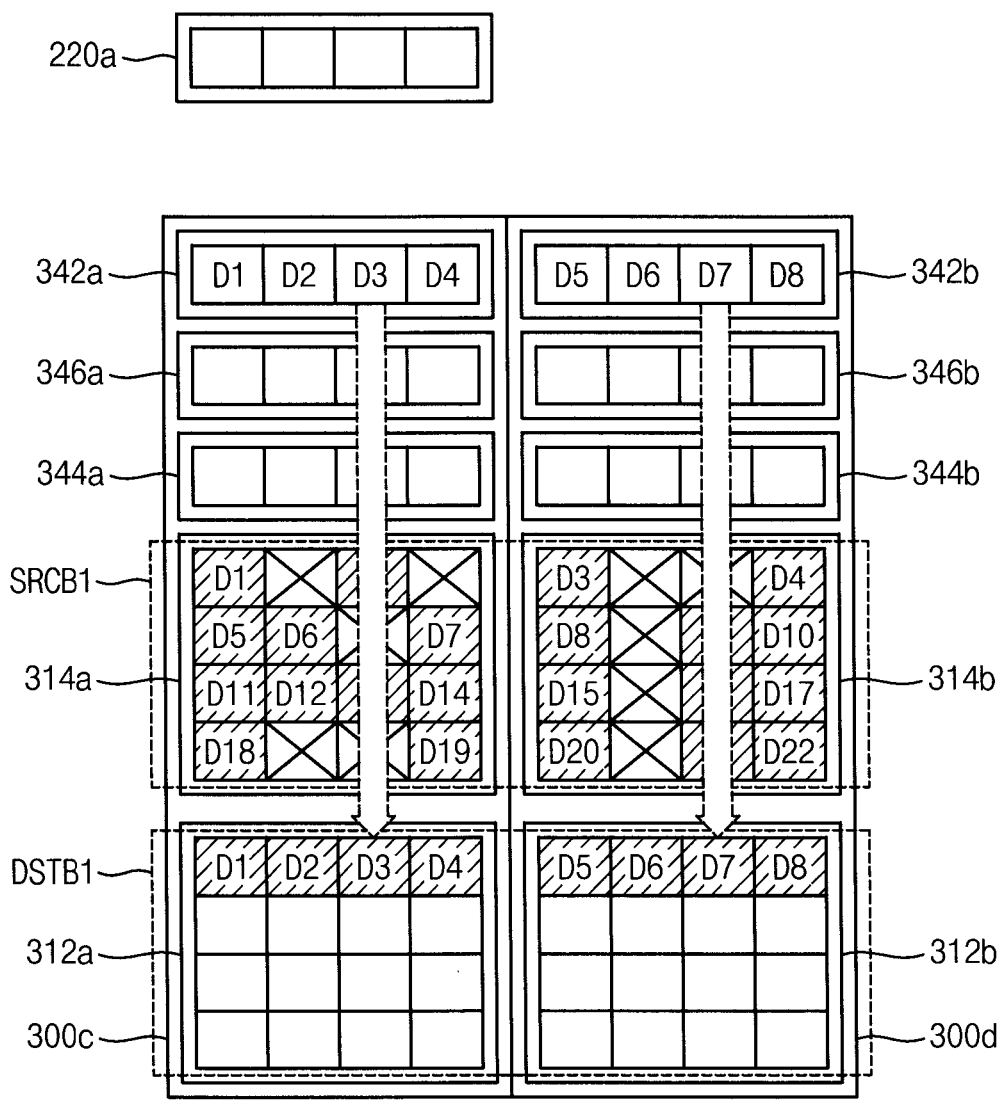
FIG. 7F is another diagram for describing the additional example of the method of FIG. 1.

Referring to FIG. 7F, first data D1, D2, D3 and D4 in first latch unit 342a and second data D5, D6, D7 and D8 in second latch unit 342b may be stored in second block DSTB1. As described above with reference to FIG. 6G, a first program operation for first data D1, D2, D3 and D4 and a second program operation for second data D5, D6, D7 and D8 may be performed based on the interleaving scheme. Finally, similar to the example illustrated in FIG. 6H, all valid pages VP in first block SRCB1 are copied into second block DSTB1.

Figure 8:
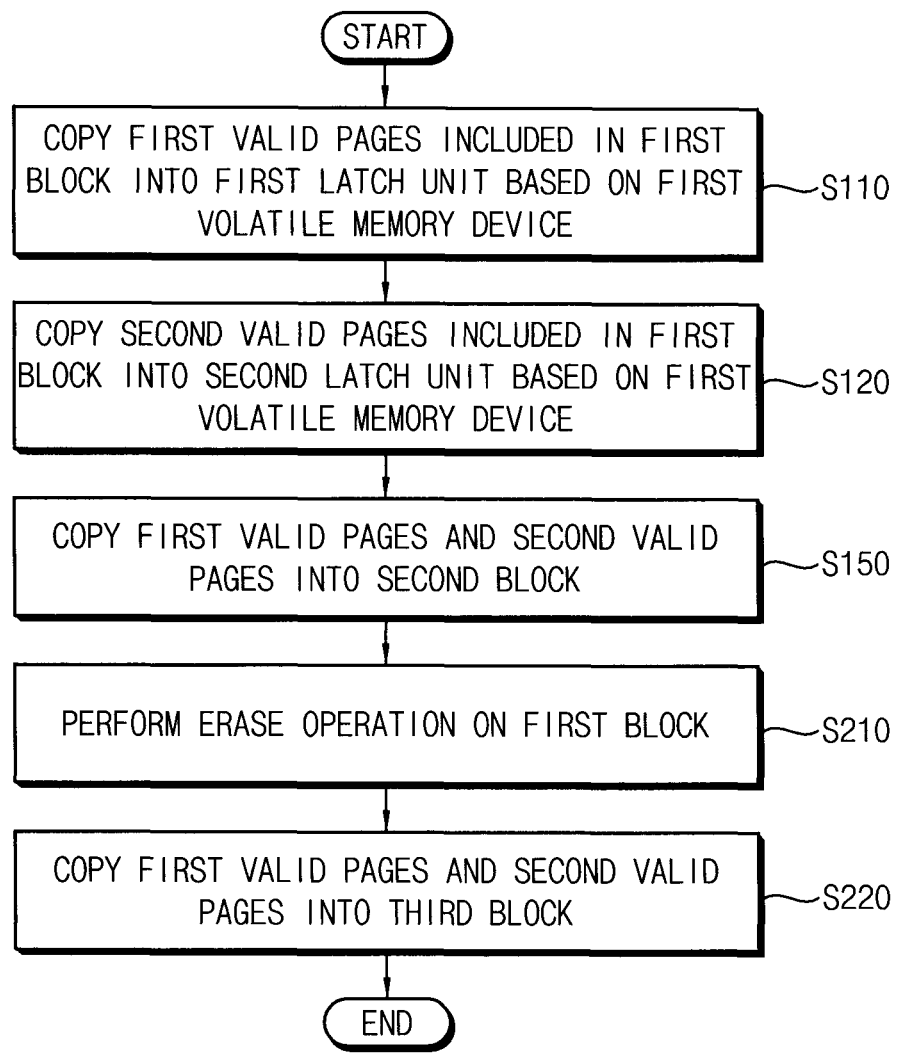
FIG. 8 is a flowchart illustrating a method of operating a storage device according to an embodiment of the inventive concept.

FIG. 8 is a flowchart illustrating a method of operating a storage device according to an embodiment of the inventive concept.

Referring to FIG. 8, in the illustrated method, first valid pages in a first block are copied into a first latch unit based on a first volatile memory device (S110). Second valid pages in the first block are copied into a second latch unit based on the first volatile memory device (S120). The first valid pages in the first latch unit and the second valid pages in the second latch unit are copied into a second block (S150). The second block is different from the first block, and each of the first block and the second block is set on multiple nonvolatile memory devices. Steps S110, S120 and S150 in FIG. 8 may be substantially the same as steps S110, S120 and S150 in FIG. 1, respectively. Examples of steps S110, S120 and S150 in FIG. 8 may be substantially the same as the examples illustrated in FIGS. 5A, 5B and 5C, respectively.

After the first and second valid pages are copied to the second block, an erase operation is performed on the first block (S210). The first valid pages in the second block and the second valid pages in the second block are copied into a third block (S220). The third block may be different from the first and second blocks, and may be set on the nonvolatile memory devices. For example, the third block may be a target block for the garbage collection operation. In some embodiments, the first block comprises the MLCs, the second block comprises the SLCs, and the third block may comprise the MLCs.

FIGS. 9A, 9B, 9C and 9D are diagrams for describing an example of the method of FIG. 8.

Figure 9A:
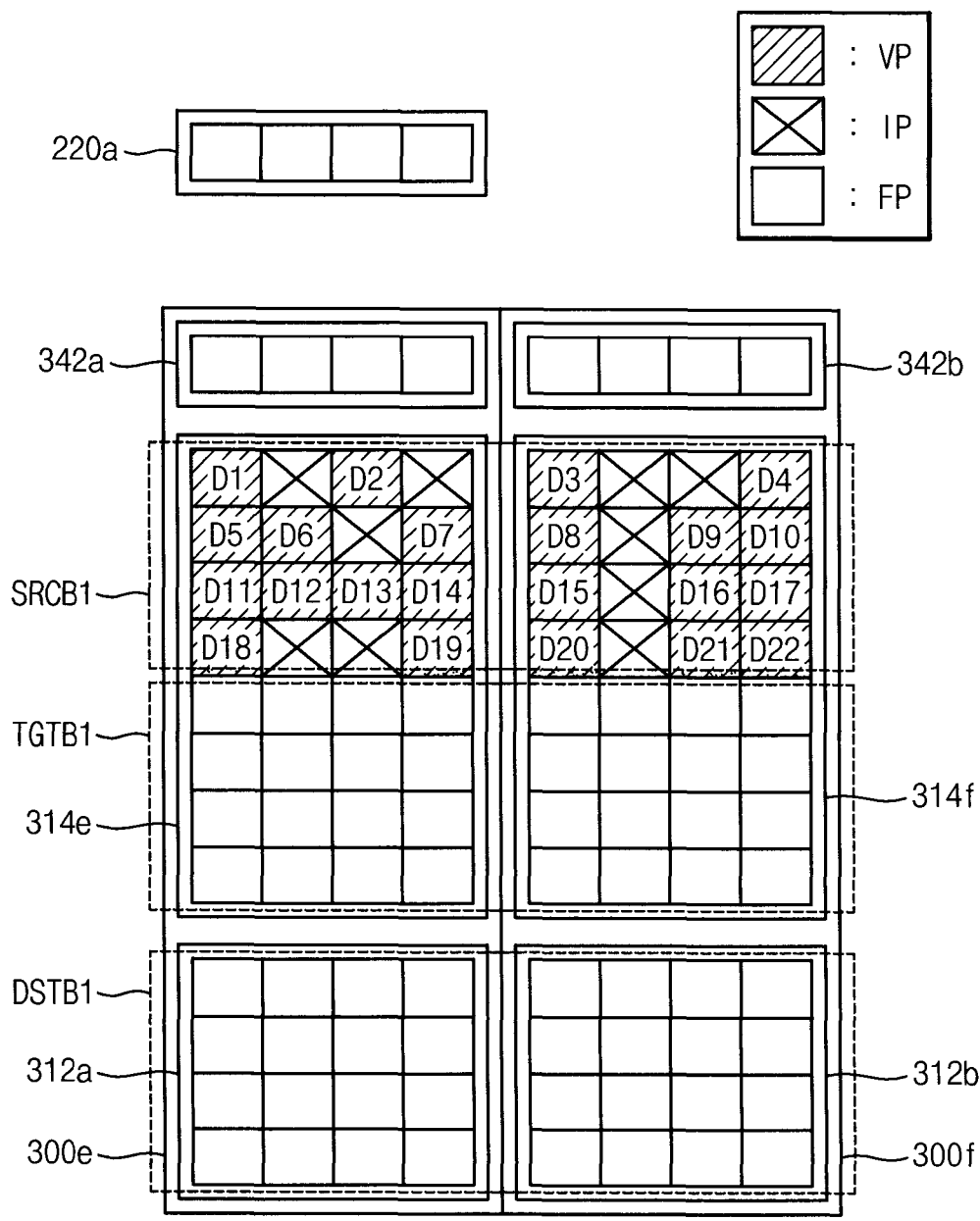
FIG. 9A is a diagram for describing an example of the method of FIG. 8, according to an embodiment of the inventive concept.

Referring to FIG. 9A, a storage device comprises a first volatile memory device 220a, a first nonvolatile memory device 300e, and a second nonvolatile memory device 300f. First nonvolatile memory device 300e comprises first SLCs 312a, first MLCs 314e, and a first latch unit 342a. Second nonvolatile memory device 300f comprises second SLCs 312b, second MLCs 314f and a second latch unit 342b. A first block SRCB1 (e.g., a source block) for the garbage collection operation may be set on a part of the first and second MLCs 314e and 314f. A second block DSTB1 (e.g., a destination block) for the garbage collection operation may be set on the first and second SLCs 312a and 312b. A third block TGTB1 (e.g., a target block) for the garbage collection operation may be set on another part of the first and second MLCs 314e and 314f.

Figure 9B:
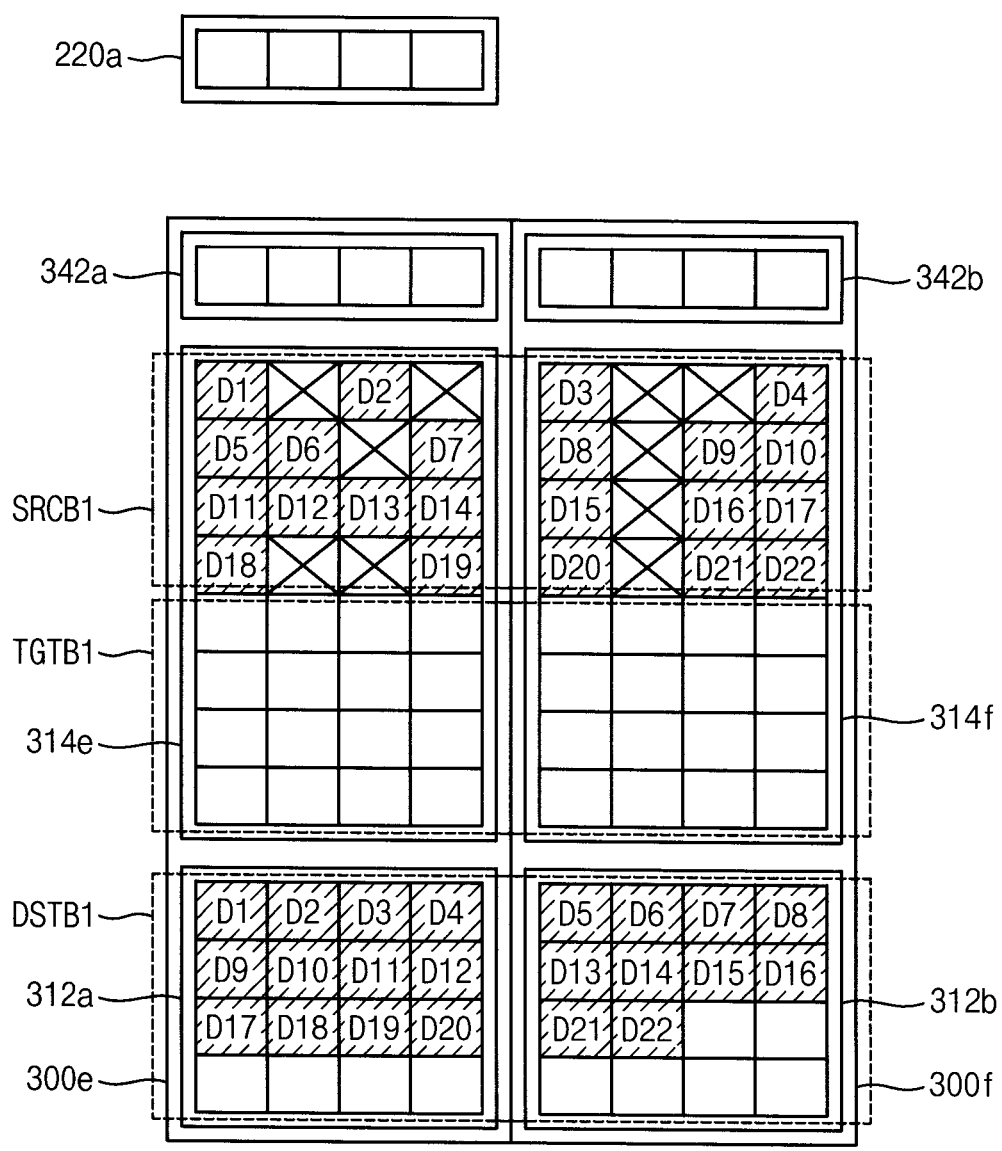
FIG. 9B is another diagram for describing the example of the method of FIG. 8.

Referring to FIG. 9B, after operations similar to the examples described above with reference to FIGS. 6B through 6G are performed, all valid pages VP in first block SRCB1 are copied into second block DSTB1, and data D1~D22 stored in valid pages VP in first block SRCB1 may be sequentially stored in free pages FP in second block DSTB1.

Although not illustrated in FIGS. 9A and 9B, each of first and second nonvolatile memory devices 300e and 300f may further comprise at least one latch unit different from first and second latch units 342a and 342b. In this case, all valid pages VP in first block SRCB1 are copied into second block DSTB1 based on operations similar to the examples described above with reference to FIGS. 7A through 7F.

Figure 9C:
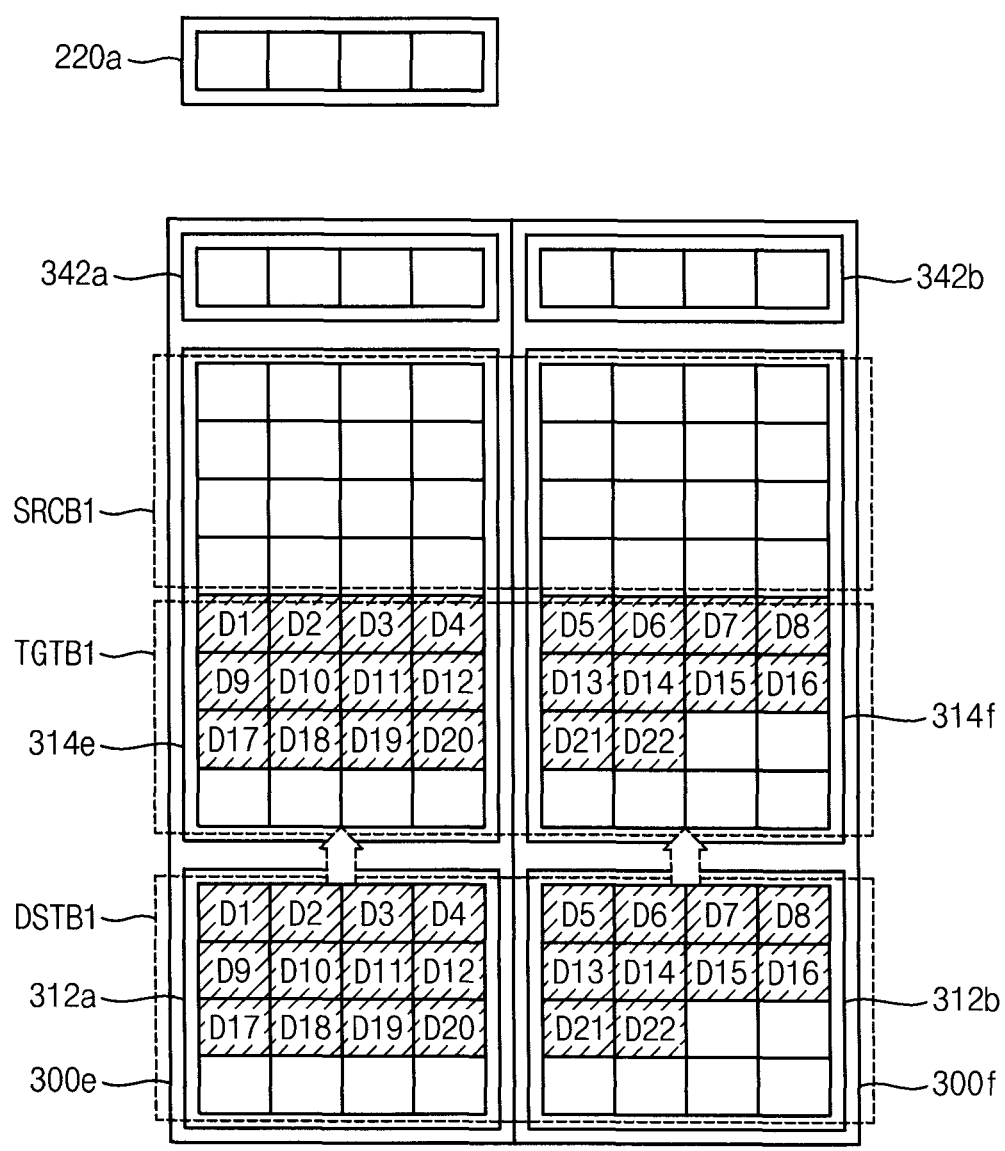
FIG. 9C is another diagram for describing the example of the method of FIG. 8.

Referring to FIG. 9C, the erase operation is performed on first block SRCB1, and then valid pages VP and invalid pages IP in first block SRCB1 are changed to free pages FP. After the erase operation, all valid pages VP in second block DSTB1 are copied into third block TGTB1, and data D1~D22 stored in valid pages VP in second block DSTB1 is sequentially stored in free pages FP in the third block TGTB1.

Figure 9D:
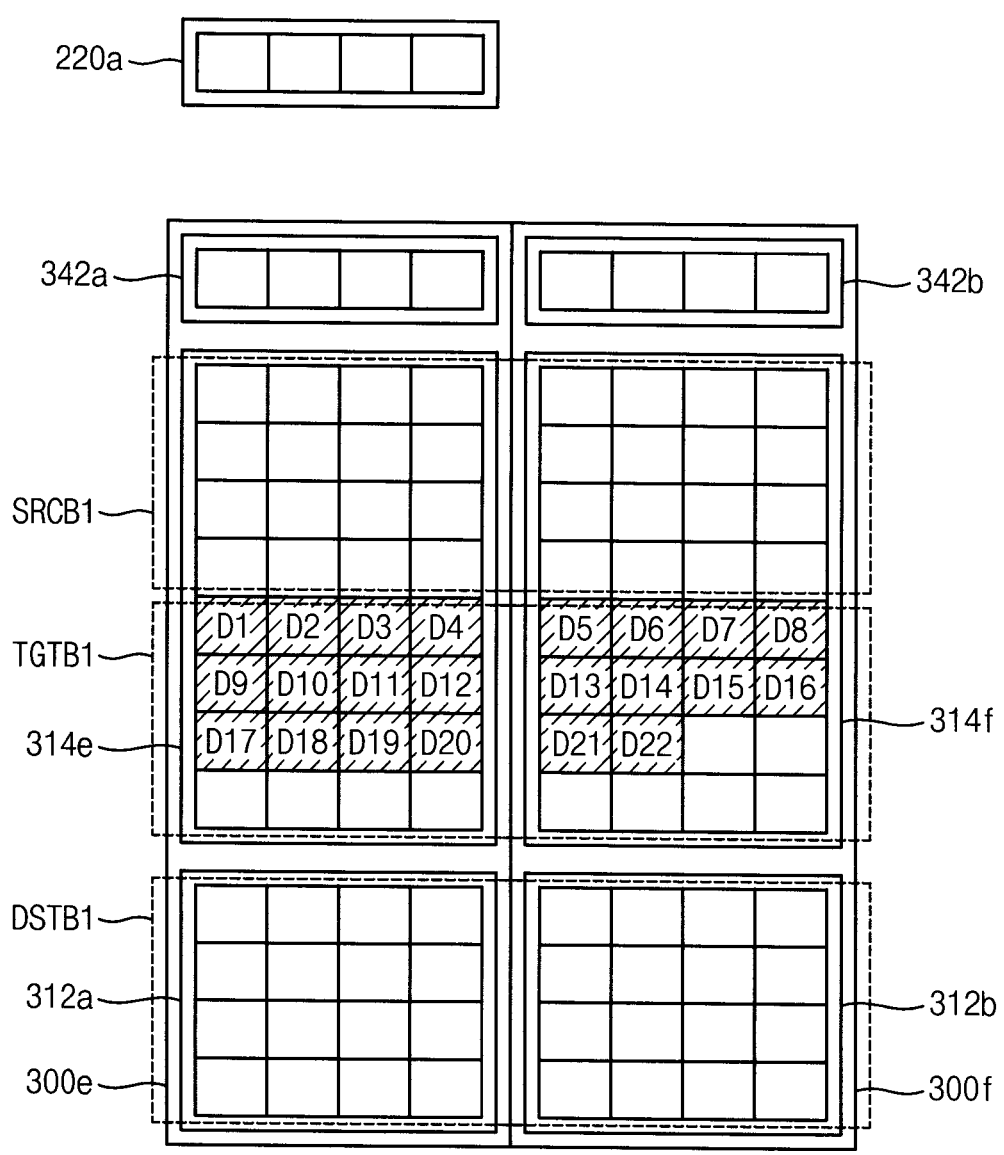
FIG. 9D is another diagram for describing the example of the method of FIG. 8.

Referring to FIG. 9D, the erase operation is performed on second block DSTB1, and then valid pages VP and the invalid pages IP in second block DSTB1 are changed to free pages FP.

As described above with reference to FIGS. 9A through 9D, data D1~D22 in first block SRCB1 is stored in third block TGTB1 via second block DSTB1 based on the on-chip buffered programming scheme, the erase operation may be performed on first block SRCB1 and second block DSTB1, and then the garbage collection operation may be completed.

Figure 10:
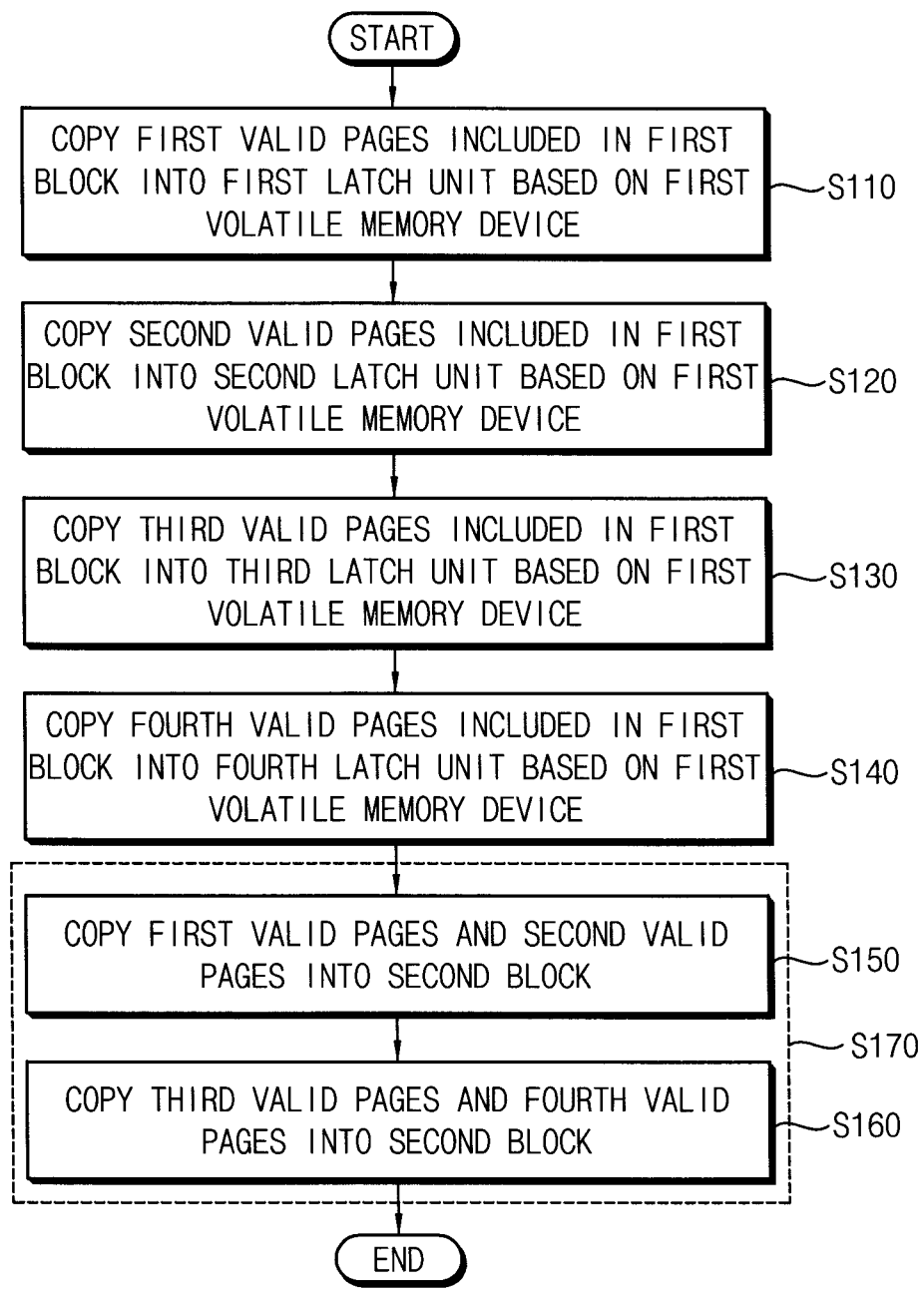
FIG. 10 is a flowchart illustrating a method of operating a storage device according to an embodiment of the inventive concept.

FIG. 10 is a flowchart illustrating a method of operating a storage device according to an embodiment of the inventive concept.

Referring to FIG. 10, in the method of operating the storage device according to an embodiment of the inventive concept, first valid pages in a first block are copied into a first latch unit based on a first volatile memory device (S110). Second valid pages in the first block are copied into a second latch unit based on the first volatile memory device (S120). Third valid pages in the first block are copied into a third latch unit based on the first volatile memory device (S130). Fourth valid pages in the first block are copied into a fourth latch unit based on the first volatile memory device (S140). The first block is set on multiple nonvolatile memory devices. Steps S110 and S120 in FIG. 10 may be substantially the same as steps S110 and S120 in FIG. 1, respectively. Steps S130 and S140 in FIG. 10 may be similar to steps S110 and S120 in FIG. 10, respectively.

First, second, third, and fourth valid pages are copied into a second block (S170). For example, the first valid pages in the first latch unit and the second valid pages in the second latch unit are copied to the second block (S150). The third valid pages in the third latch unit and the fourth valid pages in the fourth latch unit are copied to the second block (S160). Step S150 in FIG. 10 may be substantially the same as step S150 in FIG. 1. Step S160 in FIG. 10 may be similar to step S150 in FIG. 10.

In some embodiments, the first, second, third and fourth latch units may be in different nonvolatile memory devices. For example, the first latch unit may be in a first nonvolatile memory device, the second latch unit may be in a second nonvolatile memory device, the third latch unit may be in a third nonvolatile memory device, and the fourth latch unit may be in a fourth nonvolatile memory device.

In some embodiments, each of the nonvolatile memory devices may perform the on-chip buffered programming scheme. The first block may include MLCs, and the second block may include SLCs.

As will be described below with reference to FIGS. 11A through 11D, step S120 may be performed after step S110 is finished, step S130 may be performed after step S120 is finished, step S140 may be performed after step S130 is finished, and step S170 may be performed after steps S110, S120, S130 and S140 are finished.

FIGS. 11A, 11B, 11C and 11D are diagrams for describing an example of the method of FIG. 10.

Referring to FIG. 11A, a storage device comprises a first volatile memory device 220b, a first nonvolatile memory device 300g, a second nonvolatile memory device 300h, a third nonvolatile memory device 300i and a fourth nonvolatile memory device 300j. Each of first, second, third and fourth nonvolatile memory devices 300g, 300h, 300i and 300j comprises a corresponding one of first, second, third and fourth SLCs 312g, 312h, 312i and 312j, a corresponding one of first, second, third and fourth MLCs 314g, 314h, 314i and 314j, and a corresponding one of first, second, third and fourth latch units 342g, 342h, 342i and 342j. A first block SRCB2 (e.g., a source block) for the garbage collection operation may be set on the first, second, third and fourth MLCs 314g, 314h, 314i and 314j. A second block DSTB2 (e.g., a destination block) for the garbage collection operation may be set on the first, second, third and fourth SLCs 312g, 312h, 312i and 312j.

First block SRCB2 comprises valid pages VP and invalid pages IP, and second block DSTB2 comprises free pages FP. Data D1, D2, D3, D4, D5, D6, D7, D8, D9, D10, D11, D12, D13, D14, D15, D16, D17, D18, D19, D20, D21, D22, D23, D24, D25, D26, D27, D28, D29, D30, D31, D32, D33, D34, D35, D36, D37, D38, D39, D40, D41 and D42 may be stored in valid pages VP.

Figure 11B:
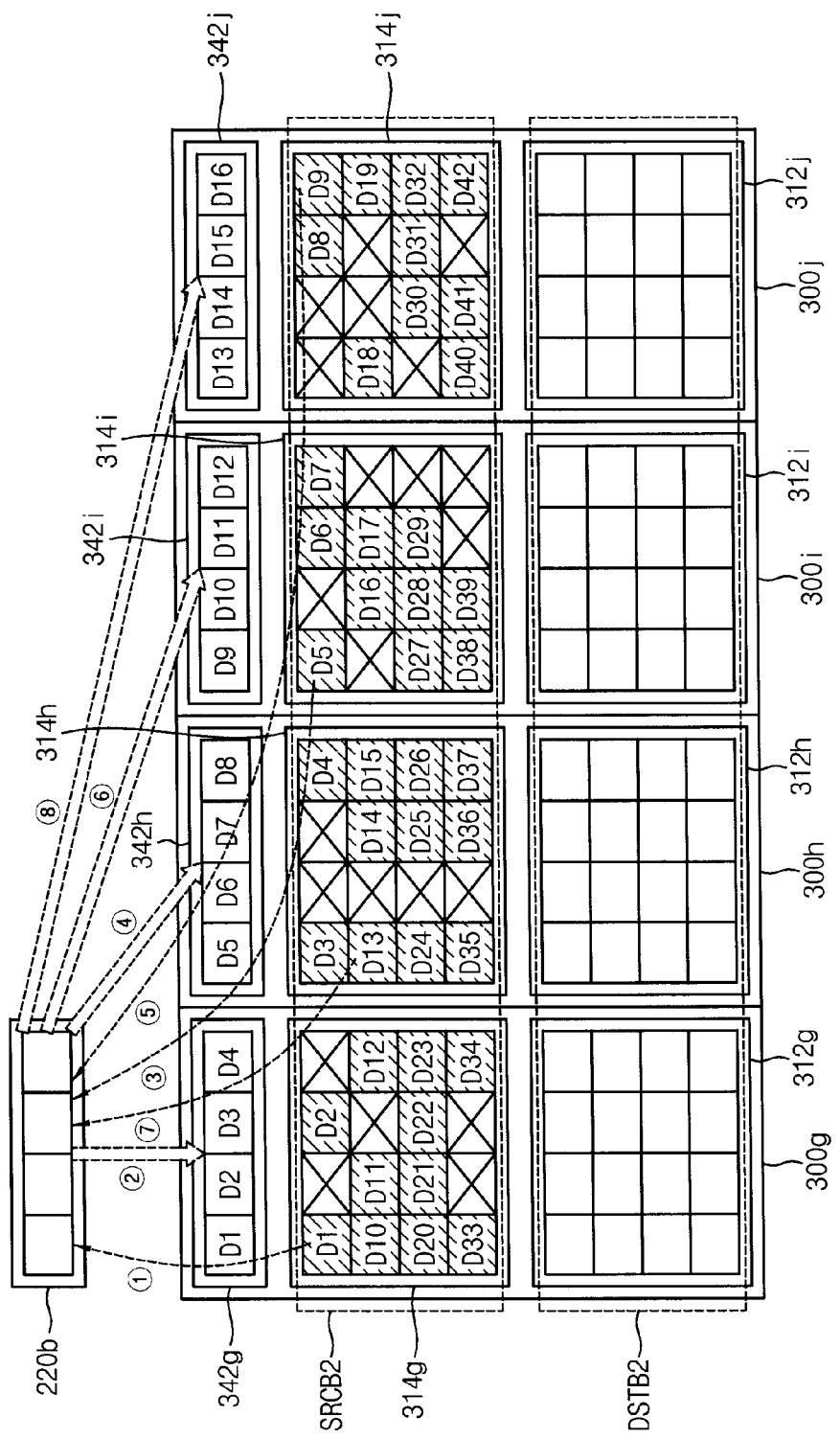
FIG. 11B is another diagram for describing the example of the method of FIG. 10.

Referring to FIG. 11B, first, second, third and fourth data D1, D2, D3, D4, D5, D6, D7, D8, D9, D10, D11, D12, D13, D14, D15 and D16 are sequentially stored in first, second, third and fourth latch units 342g, 342h, 342i and 342j via first volatile memory device 220b. Before the garbage collection operation is performed, first data D1, D2, D3 and D4 may be stored in first valid pages, second data D5, D6, D7 and D8 may be stored in second valid pages, the third data D9, D10, D11 and D12 may be stored in third valid pages, and the fourth data D13, D14, D15 and D16 may be stored in fourth valid pages.

For example, as illustrated by (1) in FIG. 11B, first data D1, D2, D3 and D4 is accumulated in the first volatile memory device 220b. As illustrated by (2) in FIG. 11B, first data D1, D2, D3 and D4 in the first volatile memory device 220b may be stored in first latch unit 342g. As illustrated by (3) in FIG. 11B, second data D5, D6, D7 and D8 is accumulated in the first volatile memory device 220b. As illustrated by (4) in FIG. 11B, second data D5, D6, D7 and D8 in the first volatile memory device 220b may be stored in second latch unit 342h. As illustrated by (5) in FIG. 11B, the third data D9, D10, D11 and D12 is accumulated in the first volatile memory device 220b. As illustrated by (6) in FIG. 11B, the third data D9, D10, D11 and D12 in the first volatile memory device 220b may be stored in third latch unit 342i. As illustrated by (7) in FIG. 11B, the fourth data D13, D14, D15 and D16 is accumulated in the first volatile memory device 220b. As illustrated by (8) in FIG. 11B, the fourth data D13, D14, D15 and D16 in the first volatile memory device 220b may be stored in fourth latch unit 342j.

Figure 11C:
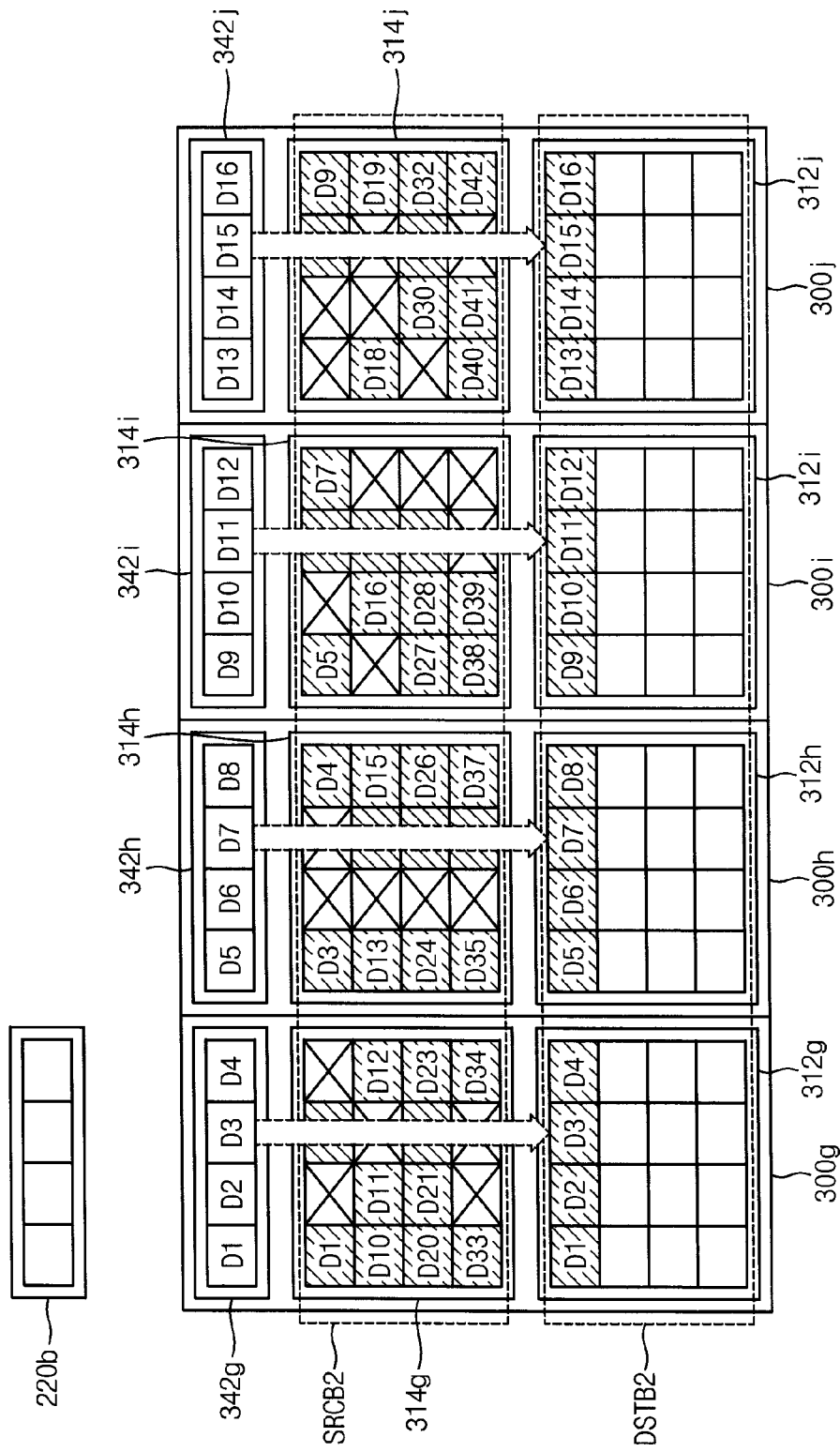
FIG. 11C is another diagram for describing the example of the method of FIG. 10.
Figure 11D:
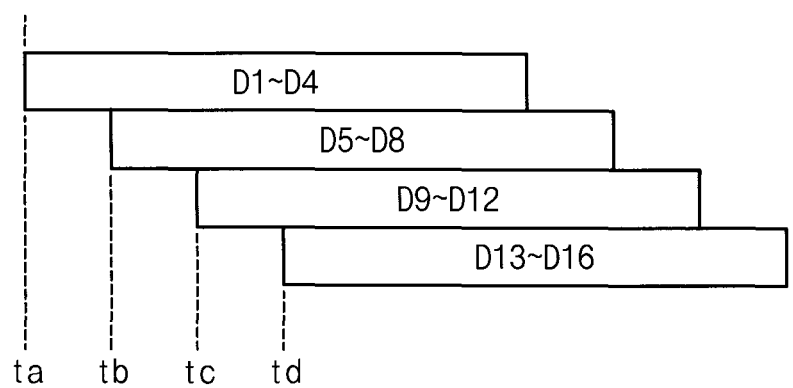
FIG. 11D is another diagram for describing the example of the method of FIG. 10.

Referring to FIGS. 11C and 11D, first data D1, D2, D3 and D4 in first latch unit 342g, second data D5, D6, D7 and D8 in second latch unit 342h, the third data D9, D10, D11 and D12 in third latch unit 342i and the fourth data D13, D14, D15 and D16 in fourth latch unit 342j may be stored in second block DSTB2. As illustrated in FIG. 11D, a first program operation for first data D1, D2, D3 and D4 is initiated at time ta. A second program operation for second data D5, D6, D7 and D8 is initiated before the first program operation is finished (e.g., at time tb). A third program operation for the third data D9, D10, D11 and D12 is initiated before the second program operation is finished (e.g., at time tc). A fourth program operation for the fourth data D13, D14, D15 and D16 is initiated before the third program operation is finished (e.g., at time td).

Operations similar to the examples described above with reference to FIGS. 11B through 11D will be performed for the other valid pages among valid pages VP in first block SRCB2. Finally, all valid pages VP in first block SRCB2 are copied into second block DSTB2.

Figure 12:
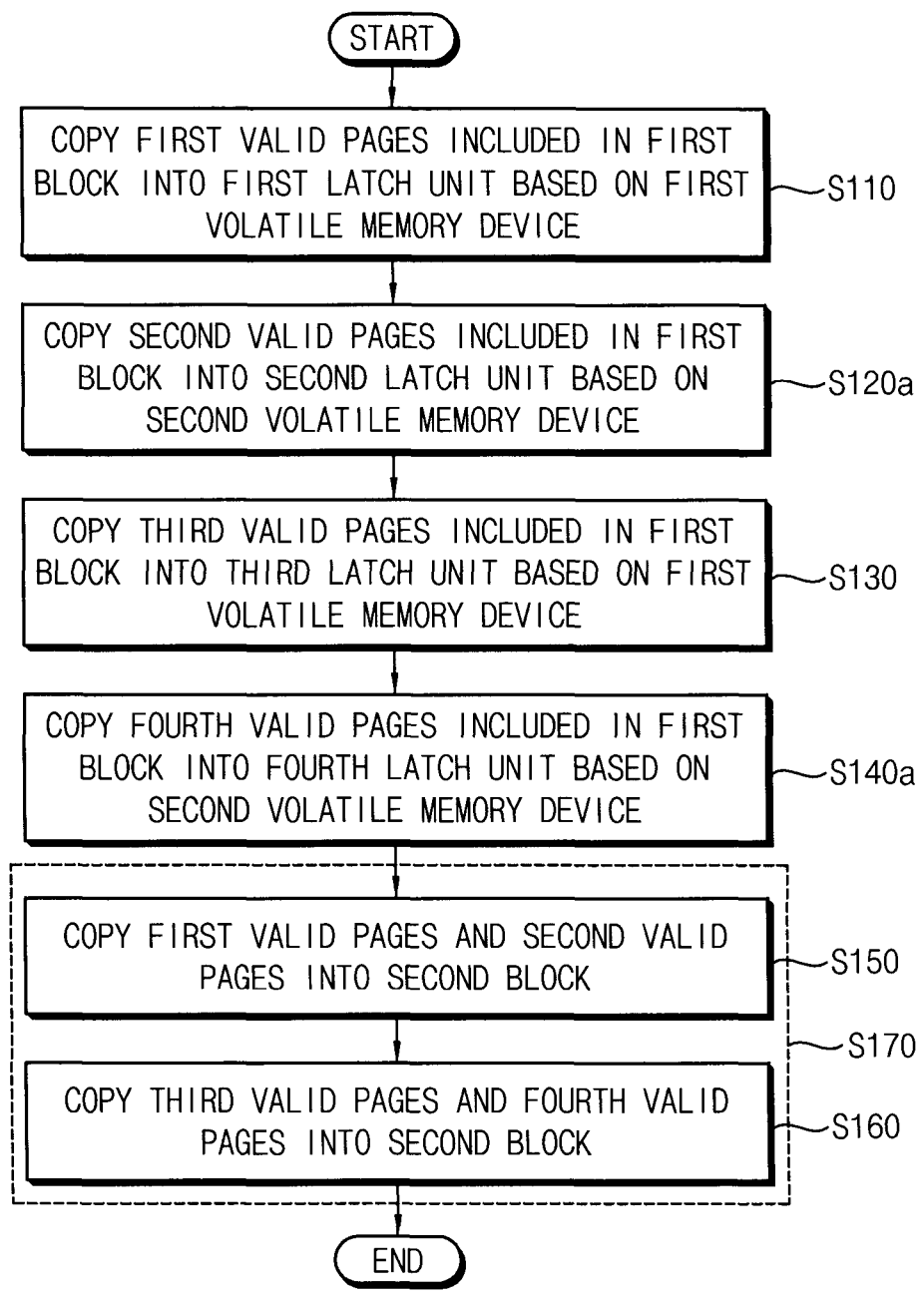
FIG. 12 is a flowchart illustrating a method of operating a storage device according to an embodiment of the inventive concept.

FIG. 12 is a flowchart illustrating a method of operating a storage device according to an embodiment of the inventive concept.

Referring to FIG. 12, in the illustrated method, first valid pages in a first block are copied into a first latch unit based on a first volatile memory device (S110). Second valid pages in the first block are copied into a second latch unit based on a second volatile memory device (S120a). Third valid pages in the first block are copied into a third latch unit based on the first volatile memory device (S130). Fourth valid pages in the first block are copied into a fourth latch unit based on the second volatile memory device (S140a). The first block is set on multiple nonvolatile memory devices. Steps S110 and S130 in FIG. 12 may be substantially the same as steps S110 and S130 in FIG. 10, respectively. Steps S120a and S140a in FIG. 12 may be substantially the same as steps S120 and S140 in FIG. 10, respectively, except that steps S120a and S140a in FIG. 12 are performed based on the second volatile memory device.

The first, second, third and fourth valid pages are copied into a second block (S170). For example, the first valid pages in the first latch unit and the second valid pages in the second latch unit are copied to the second block (S150). The third valid pages in the third latch unit and the fourth valid pages in the fourth latch unit are copied to the second block (S160). Steps S150, S160 and S170 in FIG. 12 may be substantially the same as steps S150, S160 and S170 in FIG. 10, respectively.

As will be described below with reference to FIGS. 13A through 13D, steps S110 and S120a may be substantially simultaneously or concurrently performed, steps S130 and S140a may be substantially simultaneously or concurrently performed after steps S110 and S120a are finished, and step S170 may be performed after steps S110, S120a, S130 and S140a are finished.

FIGS. 13A, 13B, 13C and 13D are diagrams for describing an example of the method of FIG. 12.

Figure 13A:
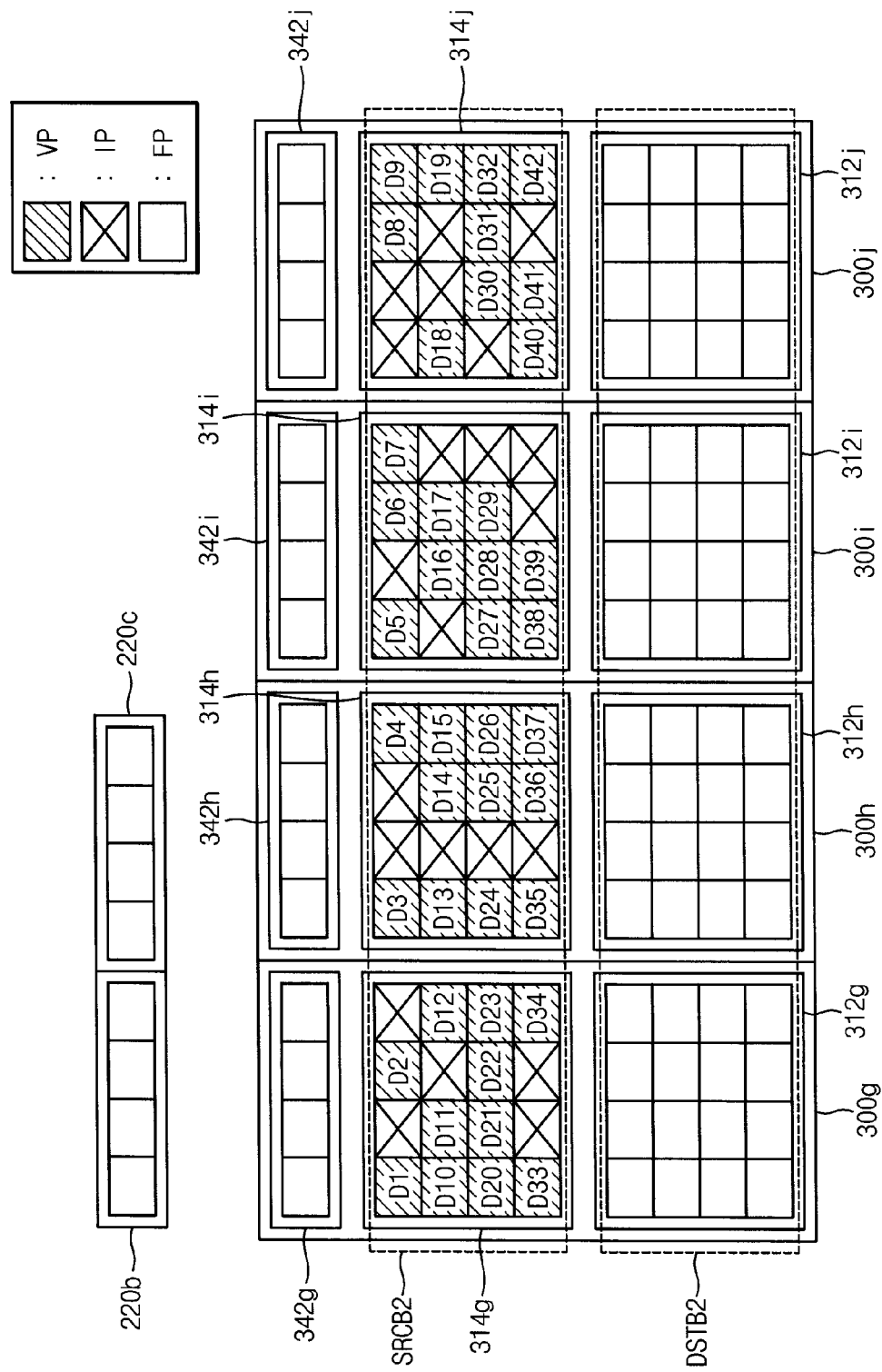
FIG. 13A is a diagram for describing an example of the method of FIG. 12, according to an embodiment of the inventive concept.

Referring to FIG. 13A, a storage device comprises a first volatile memory device 220b, a second volatile memory device 220c, a first nonvolatile memory device 300g, a second nonvolatile memory device 300h, a third nonvolatile memory device 300i and a fourth nonvolatile memory device 300j. The storage device of FIG. 13A may be substantially the same as the storage device of FIG. 11A, except that the storage device of FIG. 13A further includes the second volatile memory device 220c.

Figure 13B:
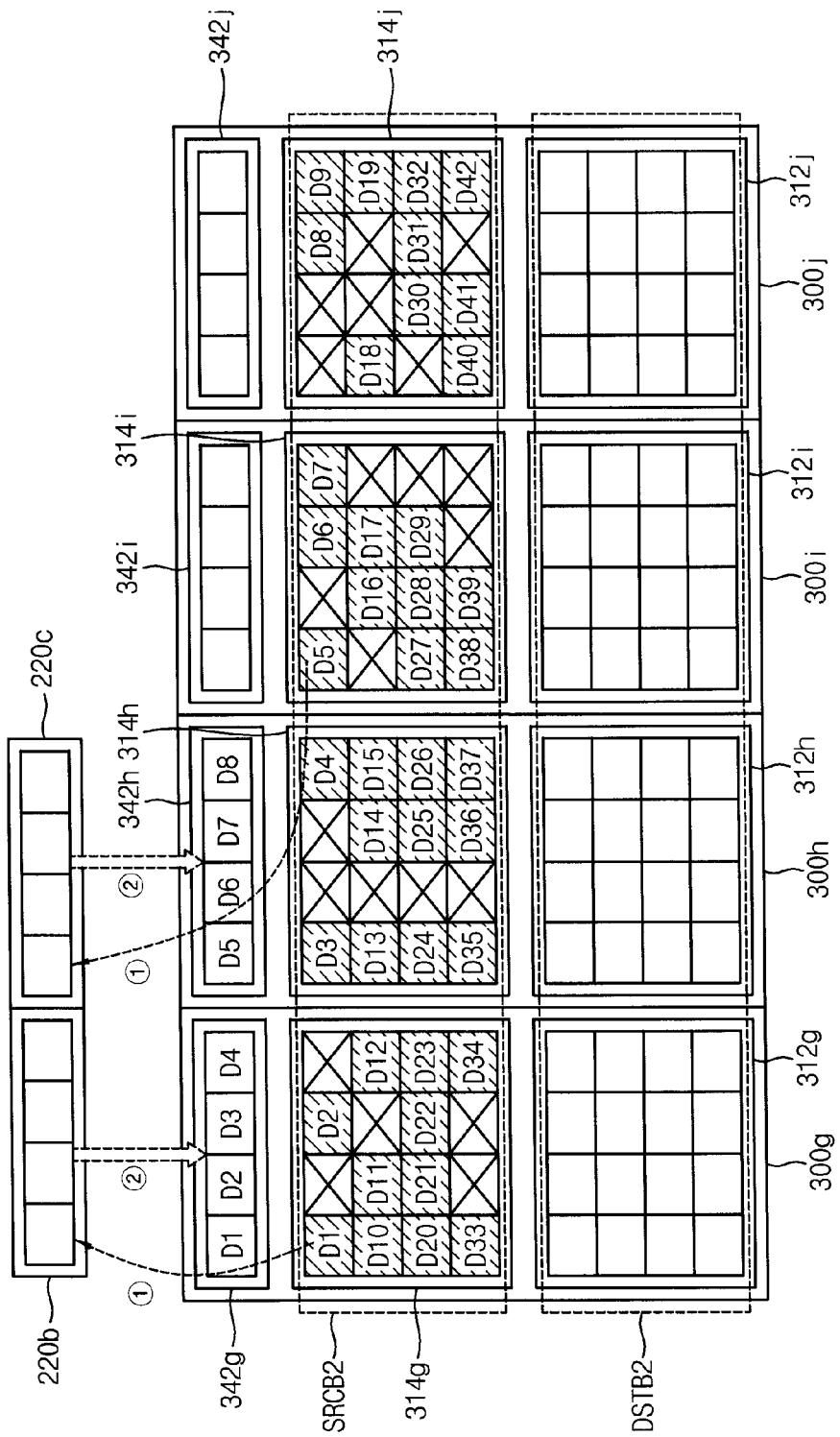
FIG. 13B is another diagram for describing the example of the method of FIG. 12.

Referring to FIG. 13B, first and second data DE D2, D3, D4, D5, D6, D7 and D8 may be stored in the first and second latch units 342g and 342h via the first and second volatile memory devices 220b and 220c. Before the garbage collection operation is performed, first data D1, D2, D3 and D4 may be stored in first valid pages, second data D5, D6, D7 and D8 may be stored in second valid pages.

For example, as illustrated by (1) in FIG. 13B, first data D1, D2, D3 and D4 is accumulated in the first volatile memory device 220b, and second data D5, D6, D7 and D8 may be simultaneously or concurrently accumulated in the second volatile memory device 220c. As illustrated by (2) in FIG. 13B, first data D1, D2, D3 and D4 in the first volatile memory device 220b may be stored in first latch unit 342g, and second data D5, D6, D7 and D8 in the second volatile memory device 220c may be simultaneously or concurrently stored in second latch unit 342h.

Referring to FIG. 13C, third and fourth data D9, D10, D11, D12, D13, D14, D15 and D16 may be stored in the third and fourth latch units 342i and 342j via the first and second volatile memory devices 220b and 220c. Before the garbage collection operation is performed, the third data D9, D10, D11 and D12 may be stored in third valid pages, and the fourth data D13, D14, D15 and D16 may be stored in fourth valid pages.

For example, as illustrated by (3) in FIG. 13C, the third data D9, D10, D11 and D12 is accumulated in the first volatile memory device 220b, and the fourth data D13, D14, D15 and D16 may be simultaneously or concurrently accumulated in the second volatile memory device 220c. As illustrated by (4) in FIG. 13C, the third data D9, D10, D11 and D12 in the first volatile memory device 220b may be stored in third latch unit 342i, and the fourth data D13, D14, D15 and D16 in the second volatile memory device 220c may be simultaneously or concurrently stored in fourth latch unit 342j.

Figure 13D:
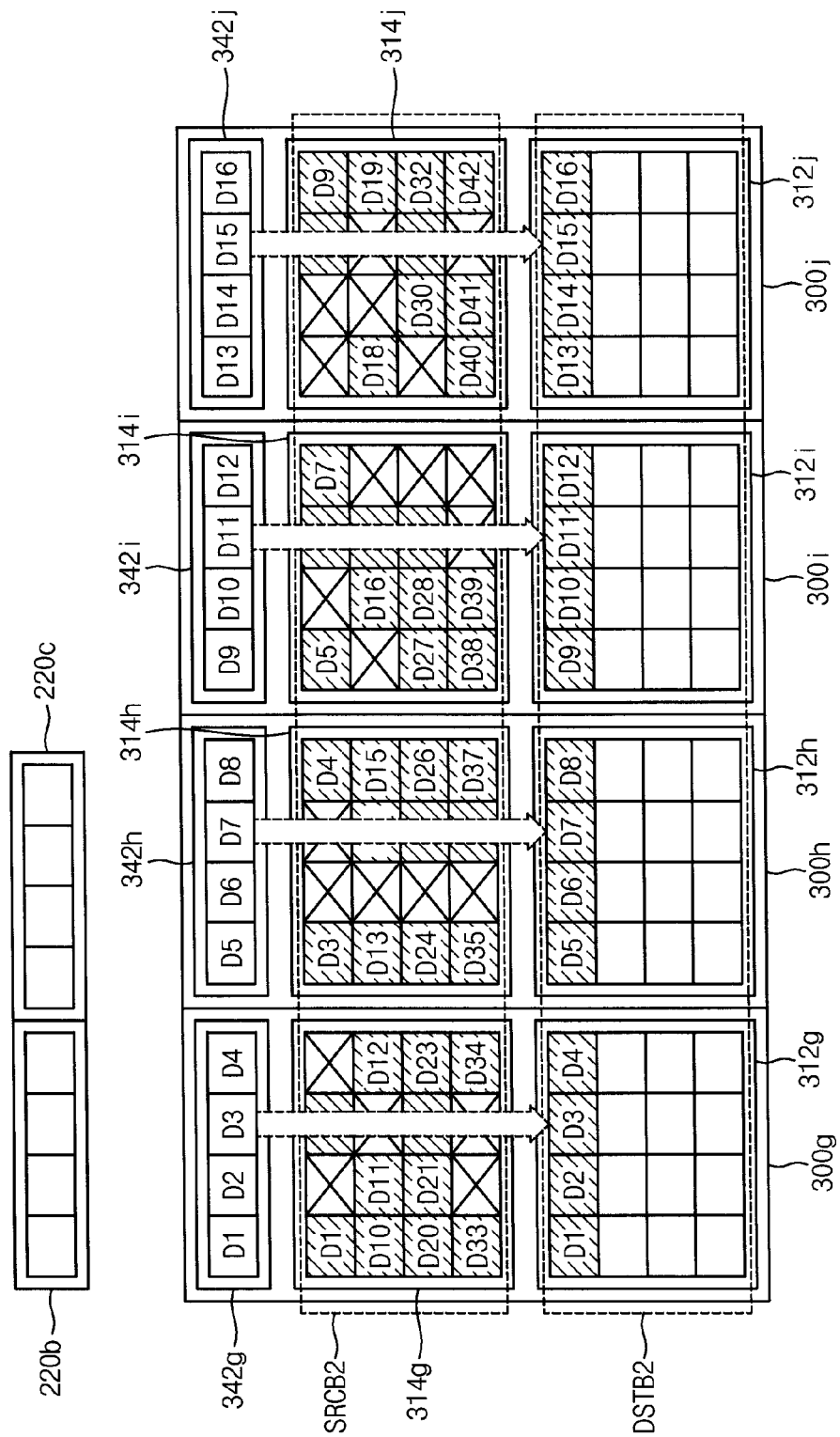
FIG. 13D is another diagram for describing the example of the method of FIG. 12.

Referring to FIG. 13D, first data D1, D2, D3 and D4 in first latch unit 342g, second data D5, D6, D7 and D8 in second latch unit 342h, the third data D9, D10, D11 and D12 in third latch unit 342i and the fourth data D13, D14, D15 and D16 in fourth latch unit 342j may be stored in second block DSTB2. As described above with reference to FIG. 11D, a first program operation for first data D1, D2, D3 and D4, a second program operation for second data D5, D6, D7 and D8, a third program operation for the third data D9, D10, D11 and D12, and a fourth program operation for the fourth data D13, D14, D15 and D16 may be performed based on the interleaving scheme. Finally, all valid pages VP in first block SRCB2 are copied into second block DSTB2.

Although not illustrated in FIGS. 11A through 11D and 13A through 13D, each of first, second, third and fourth nonvolatile memory devices 300g, 300h, 300i and 300j may further comprise at least one latch unit different from the first, second, third and fourth latch units 342g, 342h, 342i and 342j. In this case, all valid pages VP in first block SRCB2 are copied into second block DSTB2 based on operations similar to the examples illustrated in FIGS. 7A through 7F.

Although not illustrated in FIGS. 11A through 11D and 13A through 13D, an erase operation may be further performed on first block SRCB2, and all valid pages VP in second block DSTB2 may be further copied into a third block (e.g., a target block), based on operations similar to the examples described above with reference to FIGS. 9A through 9D.

In certain methods described above, it is assumed that a storage device comprises one volatile memory device and two nonvolatile memory devices (See, e.g., FIGS. 6A through 6H, 7A through 7F and 9A through 9D), and in other the storage device including one volatile memory device and four nonvolatile memory devices (e.g., FIGS. 11A through 11D), and the storage device including two volatile memory devices and four nonvolatile memory devices (e.g., FIGS. 13A through 13D). However, the inventive concept is not limited thereto, and may be applied, for example, to a storage device comprising the same number of volatile memory devices as the number of nonvolatile memory devices. For example, the method of operating the storage device according to an embodiment of the inventive concept may be applied for a storage device including one volatile memory device and three, five or seven nonvolatile memory devices, a storage device including one, two or three volatile memory devices and six nonvolatile memory devices, a storage device including one, two or four volatile memory devices and eight nonvolatile memory devices, etc. According to some embodiments, the number of valid pages that are copied into a latch unit and/or a block may be changed.

Figure 14:
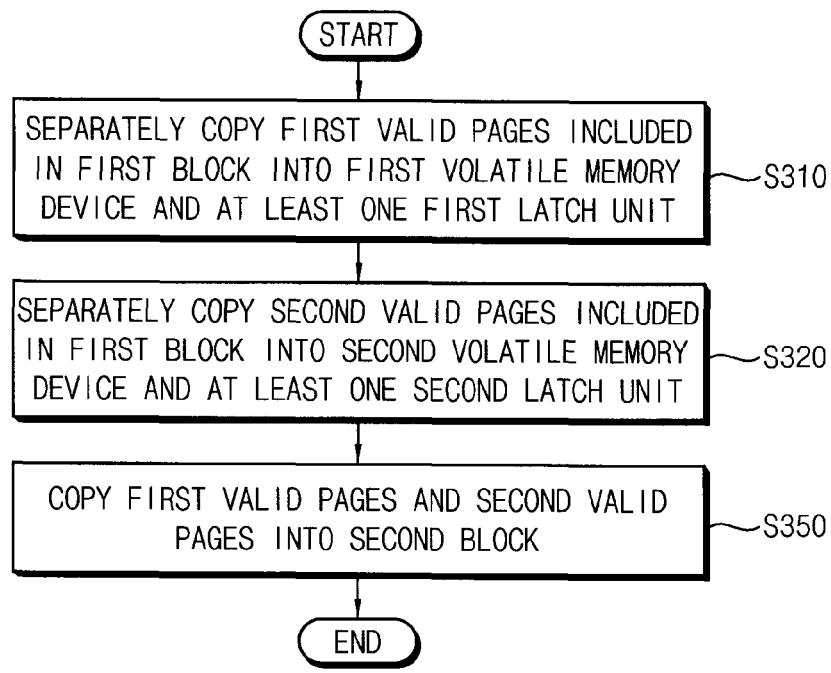
FIG. 14 is a flowchart illustrating a method of operating a storage device according to an embodiment of the inventive concept.

FIG. 14 is a flowchart illustrating a method of operating a storage device according to an embodiment of the inventive concept. The method of FIG. 14 may be used, for example, to operate a storage device comprising multiple volatile memory devices and multiple nonvolatile memory devices. The storage device may perform the garbage collection operation based on the method of FIG. 14.

Referring to FIG. 14, in the illustrated method, first valid pages in a first block are separately copied into a first volatile memory device and at least one first latch unit (S310). Second valid pages in the first block are separately copied into a second volatile memory device and at least one second latch unit (S320). The first valid pages separated in the first volatile memory device and the at least one first latch unit and the second valid pages separated in the second volatile memory device and the at least one second latch unit are copied into a second block (S350). The second block is different from the first block, and each of the first block and the second block is set on multiple nonvolatile memory devices. For example, the first block may be a source block for the garbage collection operation, and the second block may be a destination block for the garbage collection operation.

As will be described below with reference to FIG. 16, each of the nonvolatile memory devices may comprise at least one latch unit. In some embodiments, the at least one first and second latch units may be in different nonvolatile memory devices. For example, the at least one first latch unit may be in a first nonvolatile memory device among the nonvolatile memory devices, and the at least one second latch unit may be in a second nonvolatile memory device among the nonvolatile memory devices.

In addition, as will be described below with reference to FIGS. 16 and 17, each of the nonvolatile memory devices may be a vertical memory device having a stacked structure. Each of the nonvolatile memory devices may include a memory cell array, and the memory cell array may include MLCs. In this case, each of the nonvolatile memory devices may perform a high speed programming (HSP) scheme, in which bits of multi-bit data are separately stored in the latch units and then the multi-bit data are stored in the MLCs based on the bits that are separately stored in the latch units.

As will be described below with reference to FIGS. 19A through 19E, steps S310 and S320 may be substantially simultaneously or concurrently performed, and the step S350 may be performed after steps S310 and S320 are finished.

In certain methods described above, a storage device comprises multiple volatile memory devices and multiple nonvolatile memory devices, and garbage collection is performed based on the same number of volatile memory devices as the number of nonvolatile memory devices. For example, multiple valid pages in a source block are not separately copied to the great number of volatile memory devices as the number of nonvolatile memory devices. Alternatively, the valid pages in the source block may be separately copied (e.g., separately stored in units of bit) into multiple internal latch units and the same number of volatile memory devices as the number of nonvolatile memory devices, and then the valid pages are copied into a destination block based on the separated valid pages. Accordingly, in the storage device according to an embodiment of the inventive concept, a capacity and a size of the volatile memory device may be reduced, and thus the storage device may have a relatively small size and a relatively improved performance.

Figure 15:
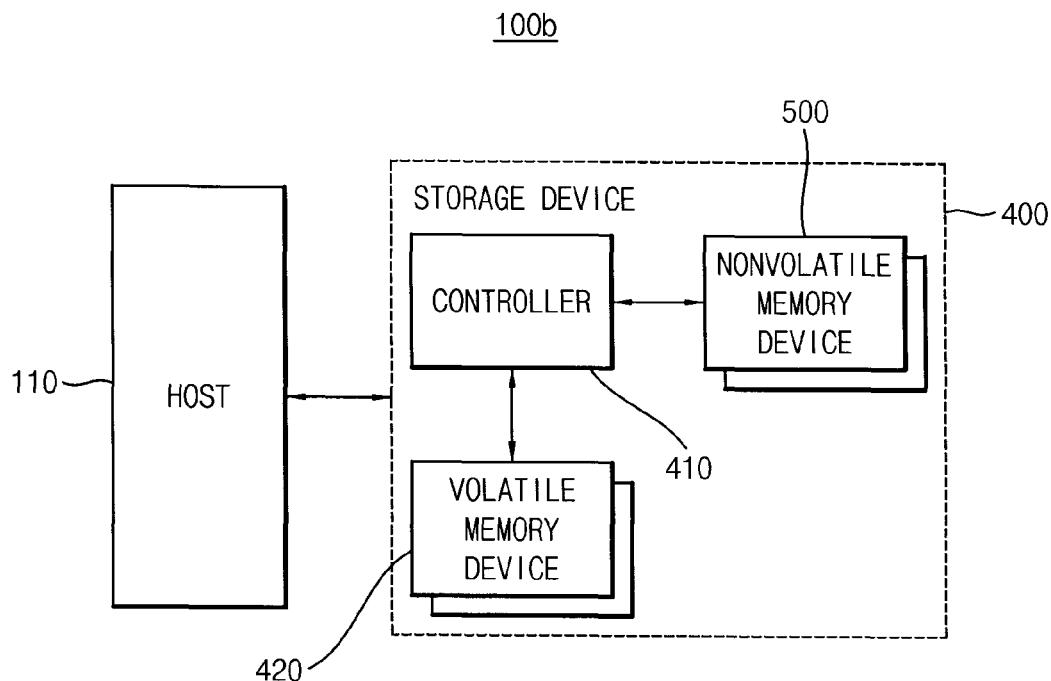
FIG. 15 is a block diagram illustrating another example of a system comprising the storage device according to an embodiment of the inventive concept.

FIG. 15 is a block diagram illustrating another example of a system including the storage device according to an embodiment of the inventive concept.

Referring to FIG. 15, a system 100b comprises a host 110 and a storage device 400.

Host 110 may perform various computing functions and may execute an operating system (OS) and/or applications. Host 110 in FIG. 15 may be substantially the same as host 110 in FIG. 2. Storage device 400 may include a controller 410, multiple volatile memory devices 420 and multiple nonvolatile memory devices 500.

Controller 410 may receive a command from host 110, may control an operation of storage device 400 based on the command, and may perform the garbage collection operation for storage device 400 without any command received from host 110. Volatile memory devices 420 may serve as a write buffer temporarily storing write data provided from host 110 and/or as a read cache temporarily storing read data retrieved from nonvolatile memory devices 500. Nonvolatile memory devices 500 may be used to store write data provided from host 110, and may be subsequently used to provide requested read data. Controller 410, volatile memory devices 420 and nonvolatile memory devices 500 in FIG. 15 may be similar to controller 210, the at least one volatile memory device 220 and nonvolatile memory devices 300 in FIG. 2, respectively.

Figure 16:
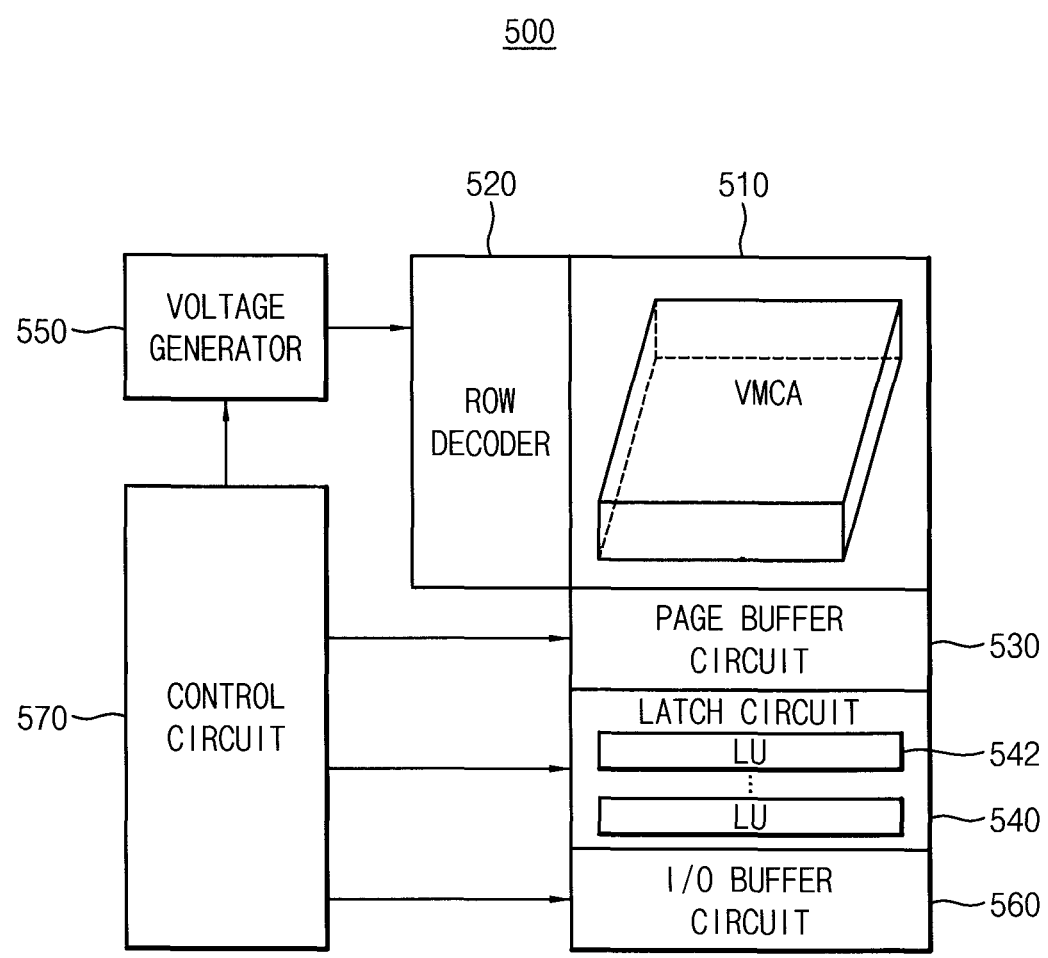
FIG. 16 is a block diagram illustrating a nonvolatile memory device in the storage device of FIG. 15.

FIG. 16 is a block diagram illustrating a nonvolatile memory device in the storage device of FIG. 15.

Referring to FIG. 16, a nonvolatile memory device 500 comprises a memory cell array 510, a row decoder 520, a page buffer circuit 530, a latch circuit 540, a voltage generator 550, an I/O buffer circuit 560, and a control circuit 570.

Memory cell array 510 comprises multiple memory cells that store data, and each of the memory cells is connected to a corresponding one of multiple wordlines and a corresponding one of multiple bitlines. As will be described below with reference to FIG. 17, the memory cells may be the NAND flash memory cells and may be arranged in a 3-D vertical array structure (e.g., a vertical memory device having a stacked structure).

In some embodiments, memory cell array 510 comprises MLCs. Write data is programmed into memory cell array 510 in nonvolatile memory device 500 based on the HSP scheme. Although not illustrated in FIG. 16, memory cell array 510 may further comprise SLCs, and write data may be programmed into memory cell array 510 based on a shadow programming scheme, a reprogramming scheme or an on-chip buffered programming scheme.

Latch circuit 540 comprises multiple latch units 542. In some embodiments, during the garbage collection operation, a portion of data (e.g., a first bit or a second bit of multi-bit data) stored in valid pages may be temporarily stored in at least a part of latch units 542. Page buffer circuit 530 stores write data to be programmed into memory cell array 510 or read data that are sensed from memory cell array 510.

I/O buffer circuit 560 receives the write data from an external memory controller (e.g., element 410 in FIG. 15), and it transmits the read data to the external memory controller. Row decoder 520 selects at least one of the wordlines in response to a row address. Voltage generator 550 generates wordline voltages according to a control of control circuit 570. Control circuit 570 controls row decoder 520, page buffer circuit 530, latch circuit 540, voltage generator 550 and I/O buffer circuit 560. Row decoder 520, page buffer circuit 530, latch circuit 540, voltage generator 550, I/O buffer circuit 560 and control circuit 570 in FIG. 15 may be similar to row decoder 320, page buffer circuit 330, latch circuit 340, voltage generator 350, I/O buffer circuit 360 and control circuit 370 in FIG. 2, respectively.

FIG. 17 is a diagram illustrating a memory cell array in the nonvolatile memory device of FIG. 16.

Referring to FIG. 17, a memory cell array 510 comprises multiple strings 511 having a vertical structure. Strings 511 are formed in a second direction D2 such that a string row is formed. Multiple string rows are formed in a third direction D3 such that a string array may be formed. Each of strings 511 comprise ground selection transistors GSTV, memory cells MCV and string selection transistors SSTV which are disposed in series in a first direction D1 between bitlines BL(1), . . . , BL(m) and a common source line CSL.

Ground selection transistors GSTV are connected to ground selection lines GSL11, GSL12, . . . , GSLi1, GSLi2, respectively, and string selection transistors SSTV is connected to string selection lines SSL11, SSL12, . . . , SSLi1, SSLi2, respectively. Memory cells MCV arranged on the same layer are connected in common to one of wordlines WL(1), WL(2), . . . , WL(n−1), WL(n). Ground selection lines GSL11, . . . , GSLi2 and string selection lines SSL11, . . . , SSLi2 may extend in the second direction D2 and may be formed along third direction D3. Wordlines WL(1), . . . , WL(n) extend in second direction D2 and are formed along first and third directions D1 and D3. Bitlines BL(1), . . . , BL(m) extend in third direction D3 and are formed along second direction D2. Memory cells MCV are controlled according to a level of a voltage applied to wordlines WL(1), . . . , WL(n).

A vertical nonvolatile memory device comprising memory cell array 510 is a vertical NAND flash memory device. Because the vertical NAND flash memory device comprises NAND flash memory cells, such as the NAND flash memory device, the vertical NAND flash memory device performs the program and read operations in units of page and the erase a operation in units of block.

In some embodiments, two string selection transistors in one string 511 are connected to one string selection line, and two ground selection transistors in one string are connected to one ground selection line. In other embodiments, one string comprises one string selection transistor and one ground selection transistor.

Figure 18A:
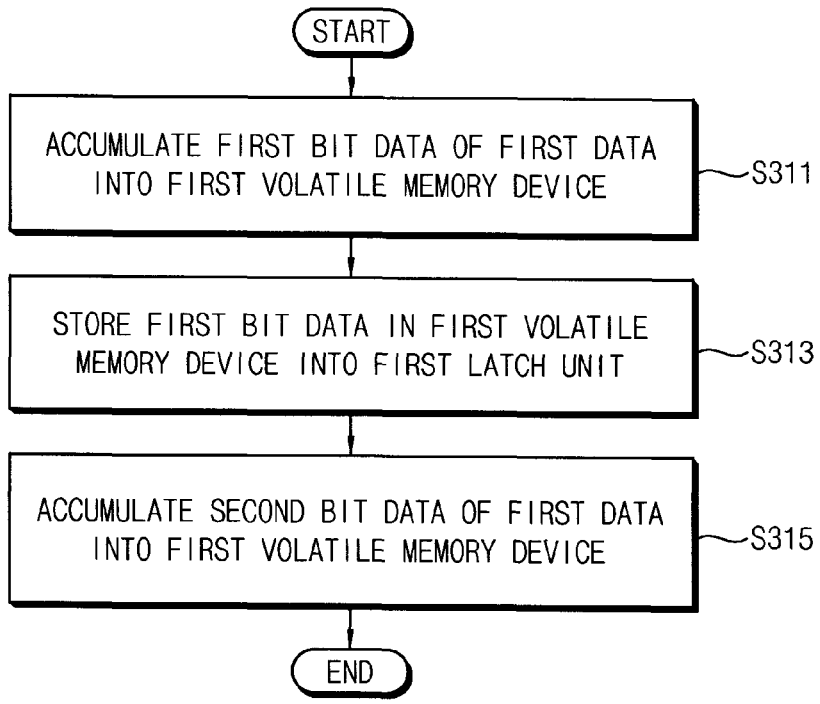
FIG. 18A is a flowchart illustrating an example of a first step in the method of FIG. 14, according to an embodiment of the inventive concept.
Figure 18B:
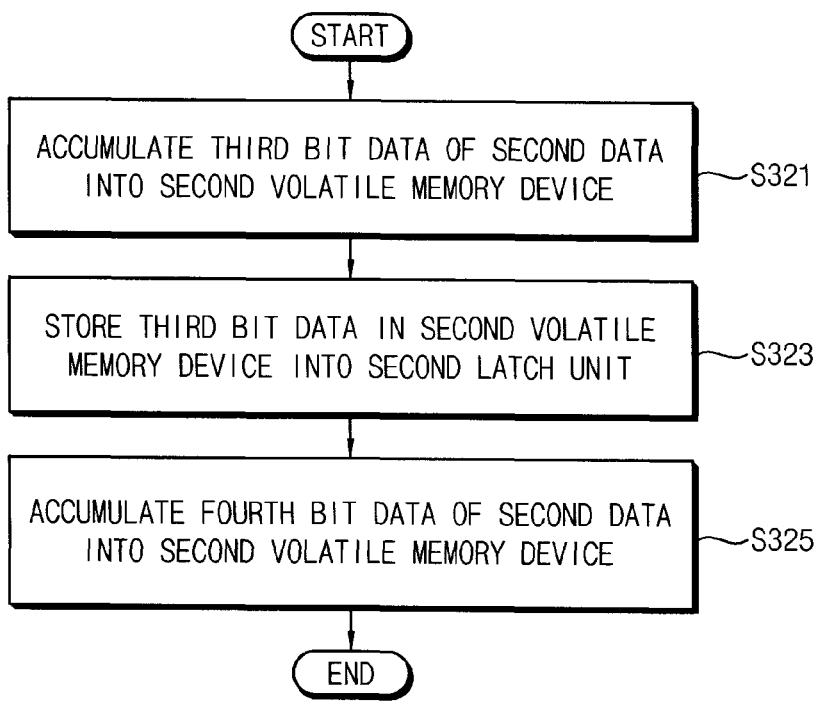
FIG. 18B is a flowchart illustrating an example of a second step in the method of FIG. 14, according to an embodiment of the inventive concept.
Figure 18C:
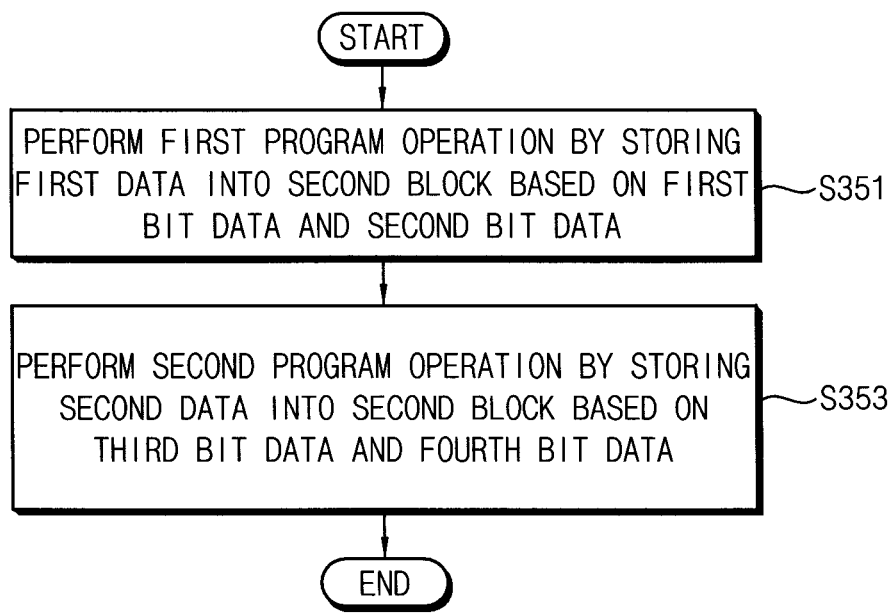
FIG. 18C is a flowchart illustrating an example of a third step in the method of FIG. 14, according to an embodiment of the inventive concept.

FIGS. 18A, 18B and 18C are flowcharts illustrating examples of steps in the method of FIG. 14. FIG. 18A illustrates an example of step S310 in FIG. 14. FIG. 18B illustrates an example of the step S320 in FIG. 14. FIG. 18C illustrates an example of the step S350 in FIG. 14. In examples of FIGS. 18A, 18B and 18C, each of first data stored in the first valid pages and second data stored in the second valid pages may be two-bit data.

Referring to FIGS. 14 and 18A, in step S310, first bit data is accumulated in the first volatile memory device (S311). The first bit data corresponds to first bits of first data stored in the first valid pages. The first bit data in the first volatile memory device is stored in the first latch unit (S313). Second bit data is accumulated in the first volatile memory device (S315). The second bit data corresponds to second bits of the first data stored in the first valid pages.

Referring to FIGS. 14 and 18B, in the step S320, third bit data is accumulated in the second volatile memory device (S321). The third bit data corresponds to first bits of second data stored in the second valid pages. The third bit data in the second volatile memory device may be stored in the second latch unit (S323). Fourth bit data is accumulated in the second volatile memory device (S325). The fourth bit data may correspond to second bits of the second data stored in the second valid pages.

Referring to FIGS. 14 and 18C, in step S350, a first program operation is performed to store the first data into the second block based on the first bit data and the second bit data (S351). A second program operation is performed to store the second data into the second block based on the third bit data and the fourth bit data (S353). The second program operation is initiated before the first program operation is finished.

FIGS. 19A, 19B, 19C, 19D and 19E are diagrams for describing an example of the method of FIG. 14.

Referring to FIG. 19A, a storage device comprises a first volatile memory device 420a, a second volatile memory device 420b, a first nonvolatile memory device 500a, and a second nonvolatile memory device 500b. First nonvolatile memory device 500a comprises a first memory cell array 510a and a first latch unit 542a. Second nonvolatile memory device 300b comprises a second memory cell array 510b and a second latch unit 542b. Each of first and second memory cell arrays 510a and 510b comprises MLCs, and has a vertical structure, as described above with reference to FIG. 17. A first block SRCB3 (e.g., a source block) for the garbage collection operation may be set on a part of the first and second memory cell arrays 510a and 510b. A second block DSTB3 (e.g., a destination block) for the garbage collection operation may be set on another part of the first and second memory cell arrays 510a and 510b. For convenience of illustration, other features (e.g., a row decoder, a page buffer circuit, an I/O buffer circuit, etc.) in nonvolatile memory devices 500a and 500b may be omitted in FIG. 19A.

First block SRCB3 may include valid pages VP and invalid pages IP, and second block DSTB3 may include free pages FP. Two-bit data D1, D2, D3, D4, D5, D6, D7, D8, D9, D10, D11, D12, D13, D14, D15, D16, D17, D18, D19, D20, D21 and D22 may be stored in valid pages VP.

Figure 19B:
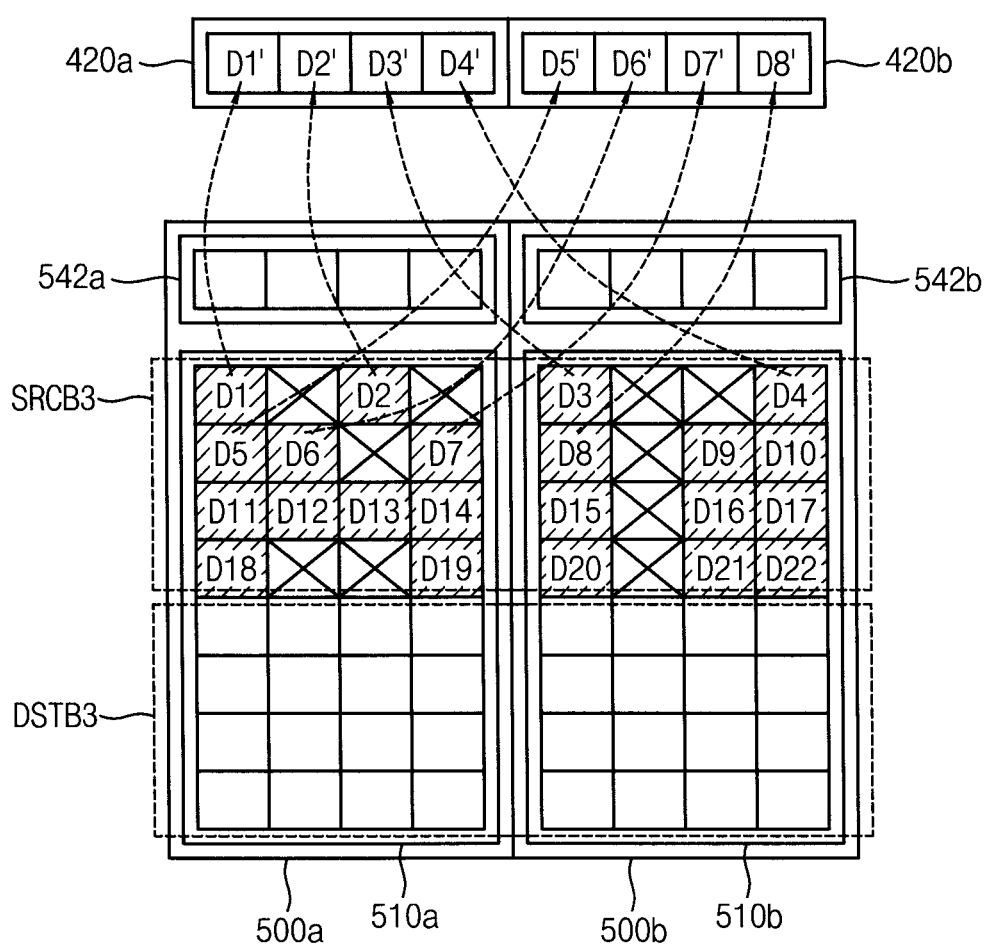
FIG. 19B is another diagram for describing the example of the method of FIG. 14.

Referring to FIG. 19B, first bit data D1', D2', D3' and D4' is accumulated in first volatile memory device 420a. Concurrently, third bit data D5', D6', D7' and D8' is accumulated in the second volatile memory device 420b. The first bit data D1', D2', D3' and D4' may correspond to first bits of first data D1, D2, D3 and D4 stored in first valid pages among valid pages VP in the first block SRCB3. Third bit data D5', D6', D7' and D8' may correspond to first bits of second data D5, D6, D7 and D8 stored in second valid pages among valid pages VP in the first block SRCB3. For example, the first bit data D1', D2', D3' and D4' may correspond to least significant bits (LSBs) of first data D1, D2, D3 and D4. The third bit data D5', D6', D7' and D8' may correspond to LSBs of second data D5, D6, D7 and D8.

Figure 19C:
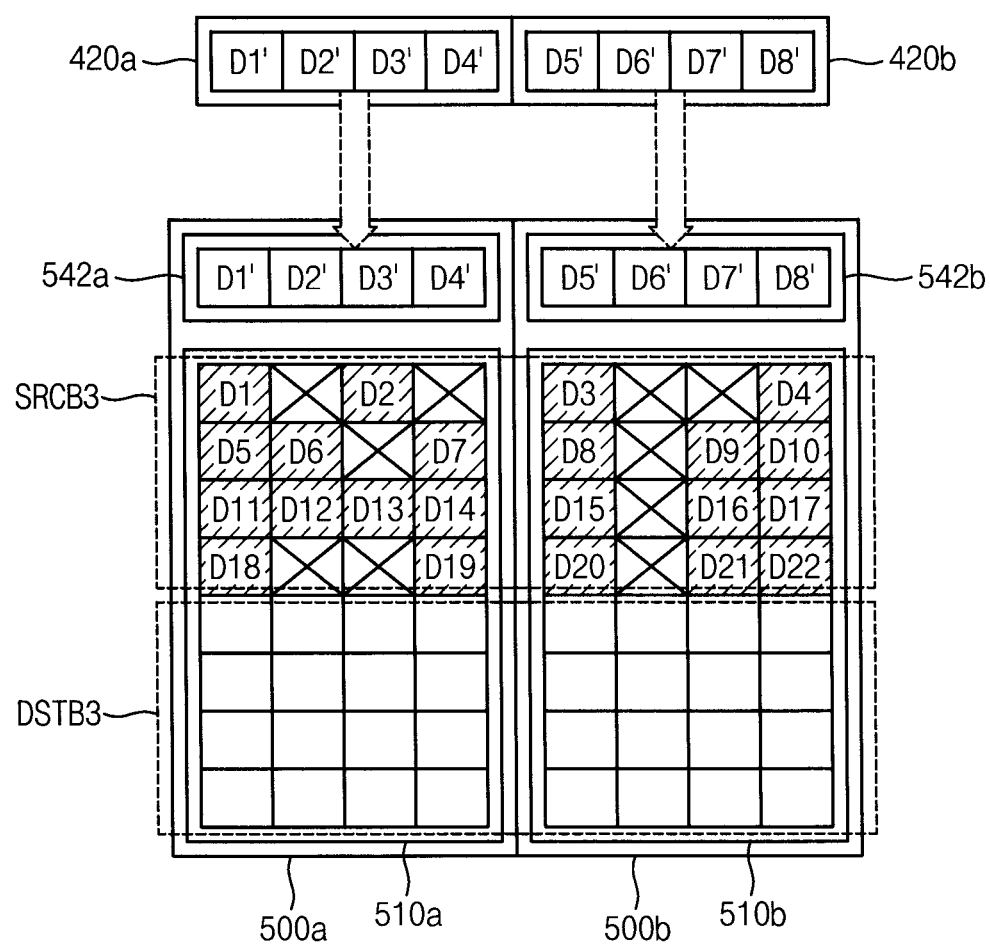
FIG. 19C is another diagram for describing the example of the method of FIG. 14.

Referring to FIG. 19C, the first bit data D1', D2', D3' and D4' in the first volatile memory device 420a may be stored in first latch unit 542a. Concurrently, the third bit data D5', D6', D7' and D8' in the second volatile memory device 420b may be stored in second latch unit 542b. Although not illustrated in FIG. 19C, after the first bit data D1', D2', D3' and D4' and the third bit data D5', D6', D7' and D8' are stored in the first and second latch unit 542a and 542b, the first bit data D1', D2', D3' and D4' in the first volatile memory device 420a and the third bit data D5', D6', D7' and D8' in the second volatile memory device 420b may be erased.

Figure 19D:
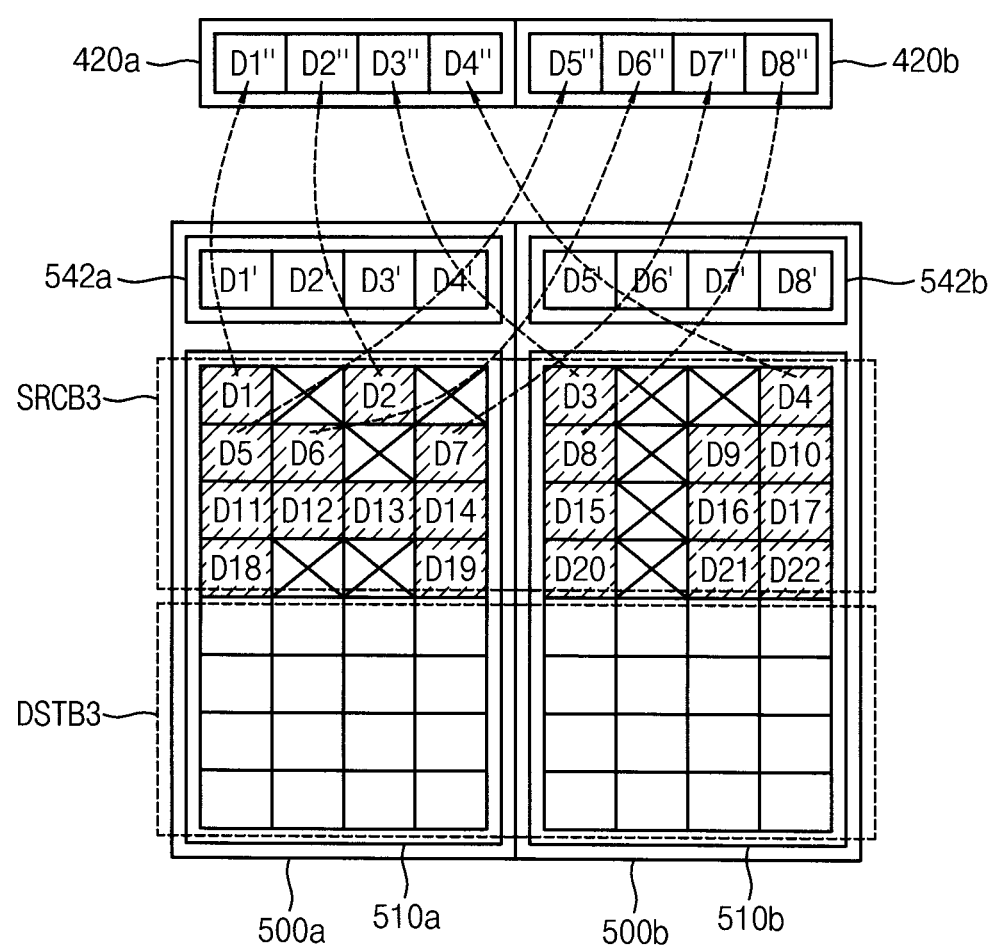
FIG. 19D is another diagram for describing the example of the method of FIG. 14.

Referring to FIG. 19D, second bit data D1", D2", D3" and D4" is accumulated in the first volatile memory device 420a. Concurrently, fourth bit data D5", D6", D7" and D8" is accumulated in second volatile memory device 420b. Second bit data D1", D2", D3" and D4" may correspond to second bits of first data D1, D2, D3 and D4 stored in the first valid pages. Fourth bit data D5", D6", D7" and D8" may correspond to second bits of second data D5, D6, D7 and D8 stored in the second valid pages. For example, the second bit data D1", D2", D3" and D4" may correspond to most significant bits (MSBs) of first data D1, D2, D3 and D4. The fourth bit data D5", D6", D7" and D8" may correspond to MSBs of second data D5, D6, D7 and D8.

Figure 19E:
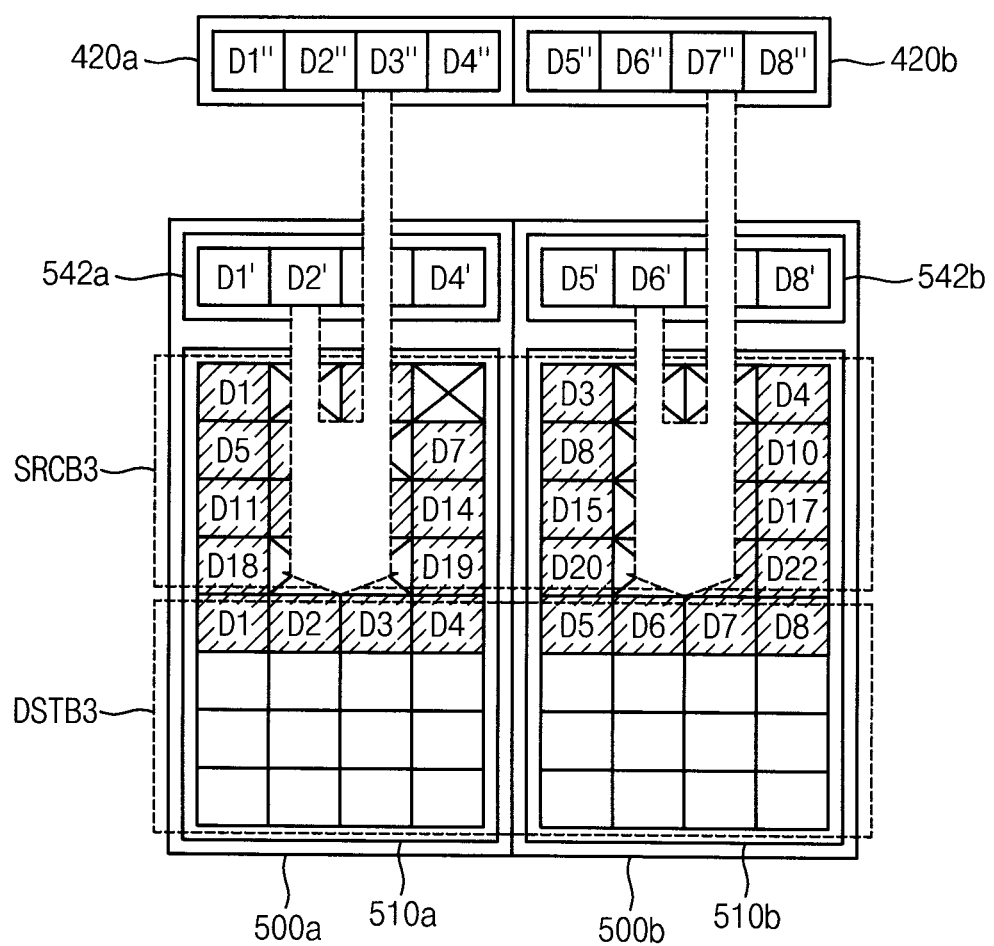
FIG. 19E is another diagram for describing the example of the method of FIG. 14.

Referring to FIG. 19E, first data D1, D2, D3 and D4 and second data D5, D6, D7 and D8 are stored in second block DSTB3. For example, first data D1, D2, D3 and D4 may be stored in second block DSTB3 by performing the HSP scheme based on the first bit data D1', D2', D3' and D4' and the second bit data D1', D2", D3" and D4". Second data D5, D6, D7 and D8 may be stored in second block DSTB3 by performing the HSP scheme based on the third bit data D5', D6', D7' and D8' and the fourth bit data D5", D6", D7" and D8". A first program operation for first data D1, D2, D3 and D4 and a second program operation for second data D5, D6, D7 and D8 may be performed based on the interleaving scheme. In other words, the second program operation is initiated before the first program operation is finished.

Operations similar to the examples described above with reference to FIGS. 19B through 19E will be performed for the other valid pages among valid pages VP in the first block SRCB3. Finally, all valid pages VP in the first block SRCB3 are copied into second block DSTB3, and the data D1~D22 stored in valid pages VP in the first block SRCB3 may be sequentially stored in the free pages FP in second block DSTB3.

Figure 20A:
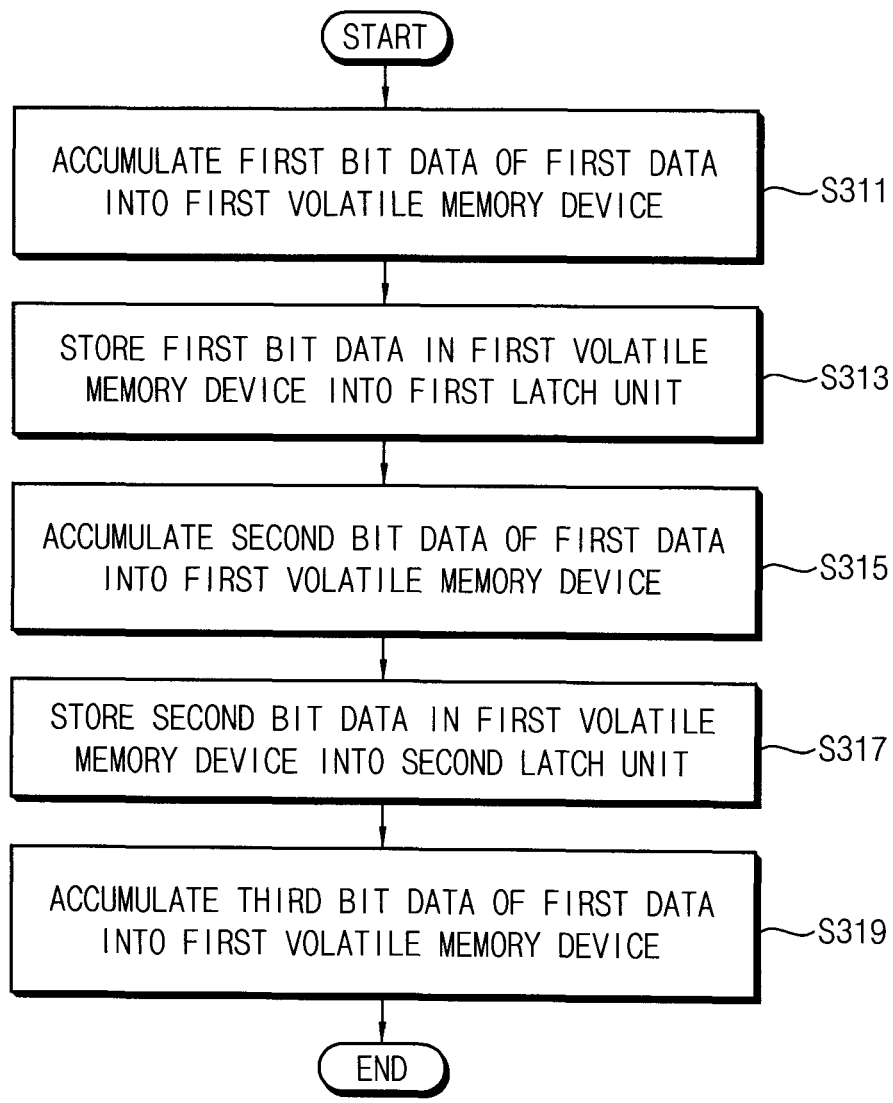
FIG. 20A is a flowchart illustrating an example of a first step in the method of FIG. 14, according to an embodiment of the inventive concept.
Figure 20B:
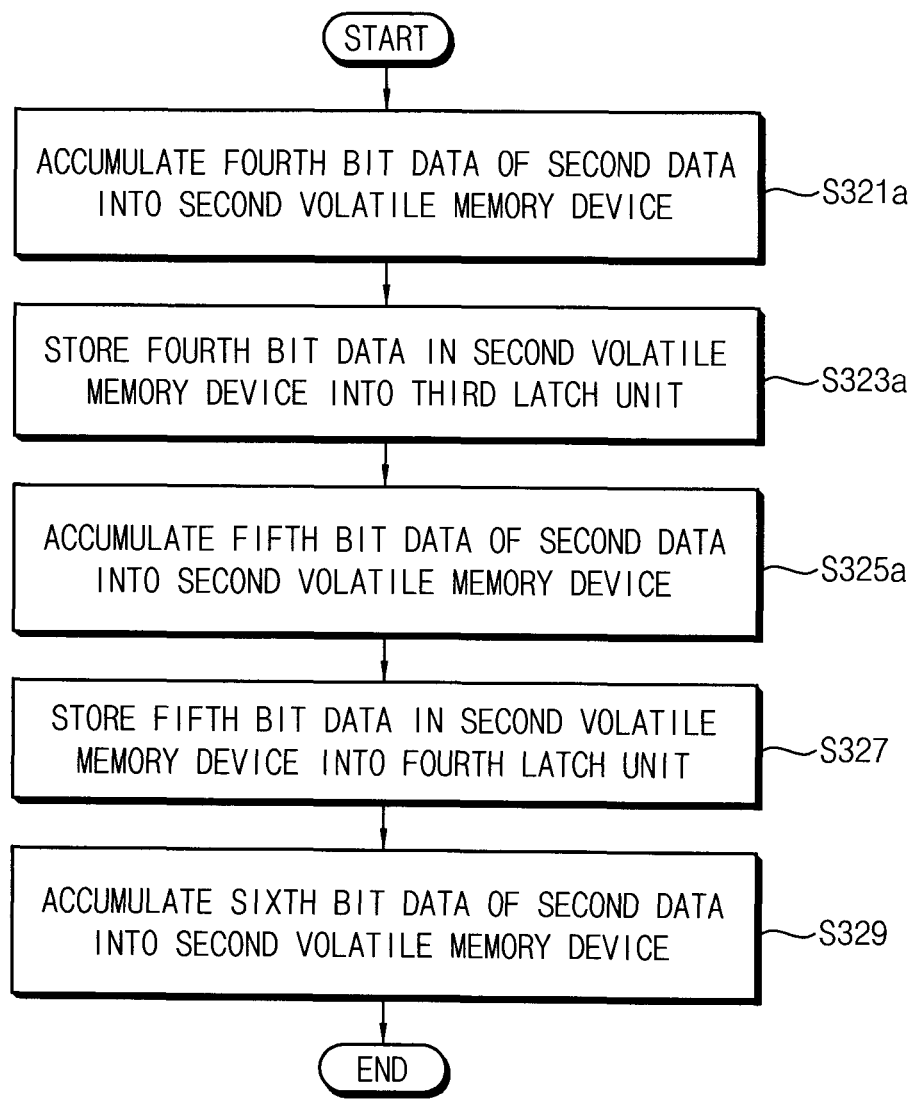
FIG. 20B is a flowchart illustrating an example of a second step in the method of FIG. 14, according to an embodiment of the inventive concept.
Figure 20C:
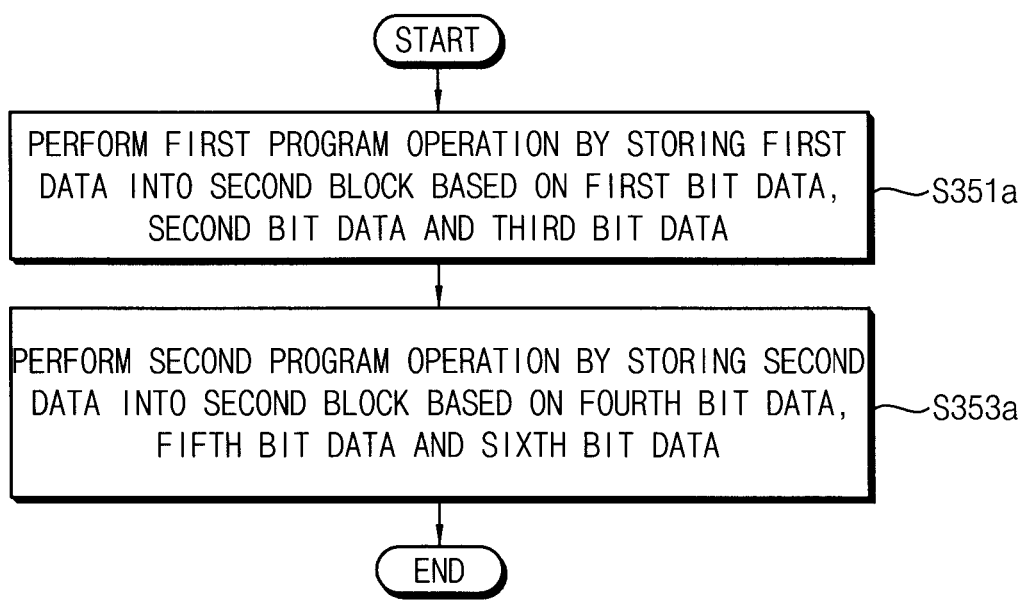
FIG. 20C is a flowchart illustrating an example of a third step in the method of FIG. 14, according to an embodiment of the inventive concept.

FIGS. 20A, 20B and 20C are flowcharts illustrating other examples of the steps in the method of FIG. 14. FIG. 20A illustrates another example of step S310 in FIG. 14. FIG. 20B illustrates another example of the step S320 in FIG. 14. FIG. 20C illustrates another example of the step S350 in FIG. 14. In examples of FIGS. 20A, 20B and 20C, each of first data stored in the first valid pages and second data stored in the second valid pages may be three-bit data.

Referring to FIGS. 14 and 20A, in step S310, first bit data is accumulated in the first volatile memory device (S311). The first bit data may correspond to first bits of first data stored in the first valid pages. The first bit data in the first volatile memory device may be stored in the first latch unit (S313). Second bit data is accumulated in the first volatile memory device (S315). The second bit data may correspond to second bits of the first data stored in the first valid pages. The second bit data in the first volatile memory device may be stored in the second latch unit (S317). Third bit data is accumulated in the first volatile memory device (S319). The third bit data may correspond to third bits of the first data stored in the first valid pages.

Referring to FIGS. 14 and 20B, in the step S320, fourth bit data is accumulated in the second volatile memory device (S321a). The fourth bit data may correspond to first bits of second data stored in the second valid pages. The fourth bit data in the second volatile memory device may be stored in the third latch unit (S323a). Fifth bit data is accumulated in the second volatile memory device (S325a). The fifth bit data may correspond to second bits of the second data stored in the second valid pages. The fifth bit data in the second volatile memory device may be stored in the fourth latch unit (S327). Sixth bit data is accumulated in the second volatile memory device (S329). The sixth bit data may correspond to third bits of the second data stored in the second valid pages.

Referring to FIGS. 14 and 20C, in the step S350, a first program operation may be performed to store the first data in the second block based on the first bit data, the second bit data and the third bit data (S351a). A second program operation may be performed to store the second data in the second block based on the fourth bit data, the fifth bit data and the sixth bit data (S353a). The second program operation is initiated before the first program operation is finished.

FIGS. 21A, 21B, 21C, 21D and 21E are diagrams for describing another example of the method of FIG. 14.

Figure 21A:
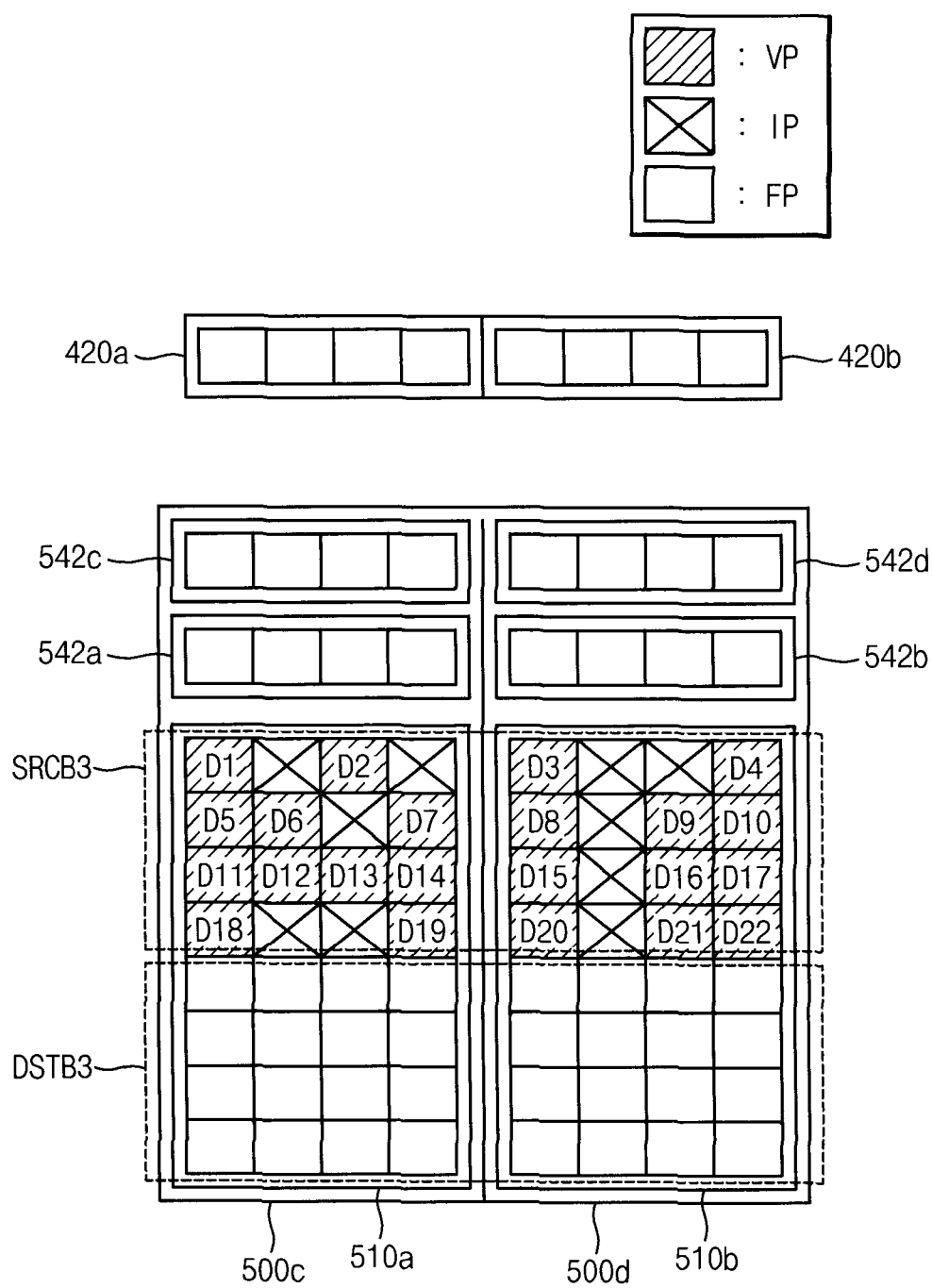
FIG. 21A is a diagram for describing an additional example of the method of FIG. 14, according to an embodiment of the inventive concept.

Referring to FIG. 21A, a storage device may include a first volatile memory device 420a, a second volatile memory device 420b, a first nonvolatile memory device 500c and a second nonvolatile memory device 500d. The first and second volatile memory devices 420a and 420b in FIG. 21A may be substantially the same as the first and second volatile memory devices 420a and 420b in FIG. 19A, respectively. First nonvolatile memory device 500c in FIG. 21A may be substantially the same as first nonvolatile memory device 500a in FIG. 19A, except that first nonvolatile memory device 500c in FIG. 21A further includes a latch unit 542c. Second nonvolatile memory device 500d in FIG. 21A may be substantially the same as second nonvolatile memory device 500b in FIG. 19A, except that second nonvolatile memory device 500d in FIG. 21A further includes a latch unit 542d.

Figure 21B:
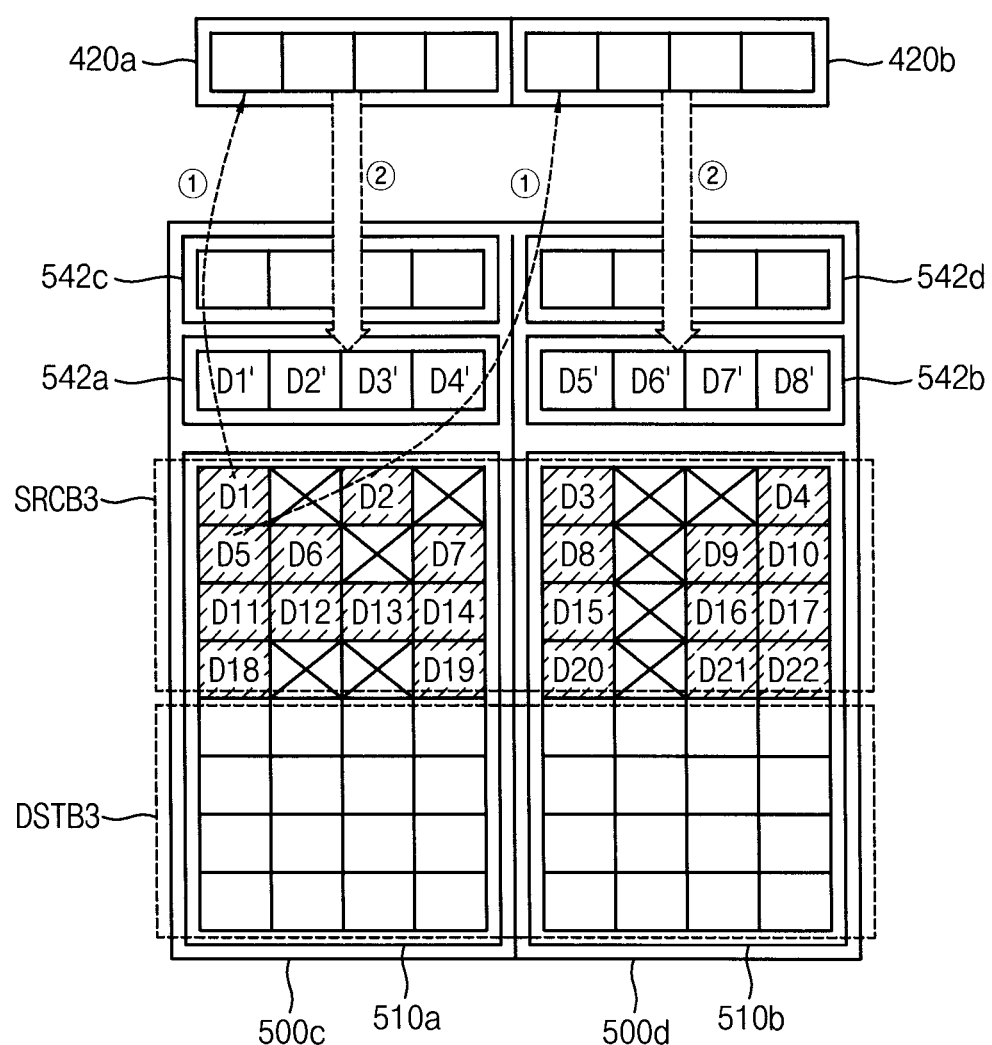
FIG. 21B is another diagram for describing the additional example of the method of FIG. 14.

Referring to FIG. 21B, first bit data D1', D2', D3' and D4' is accumulated in the first volatile memory device 420a, and Concurrently, fourth bit data D5', D6', D7' and D8' is accumulated in the second volatile memory device 420b, as illustrated by (1) in FIG. 21B. The first bit data D1', D2', D3' and D4' may correspond to first bits of first data D1, D2, D3 and D4 stored in first valid pages among valid pages VP in the first block SRCB3. The fourth bit data D5', D6', D7' and D8' may correspond to first bits of second data D5, D6, D7 and D8 stored in second valid pages among valid pages VP in the first block SRCB3. For example, the first bit data D1', D2', D3' and D4' may correspond to LSBs of first data D1, D2, D3 and D4. The fourth bit data D5', D6', D7' and D8' may correspond to LSBs of second data D5, D6, D7 and D8.

In addition, the first bit data D1', D2', D3' and D4' in the first volatile memory device 420a may be stored in first latch unit 542a, and Concurrently, the fourth bit data D5', D6', D7' and D8' in the second volatile memory device 420b may be stored in second latch unit 542b, as illustrated by (2) in FIG. 21B.

Figure 21C:
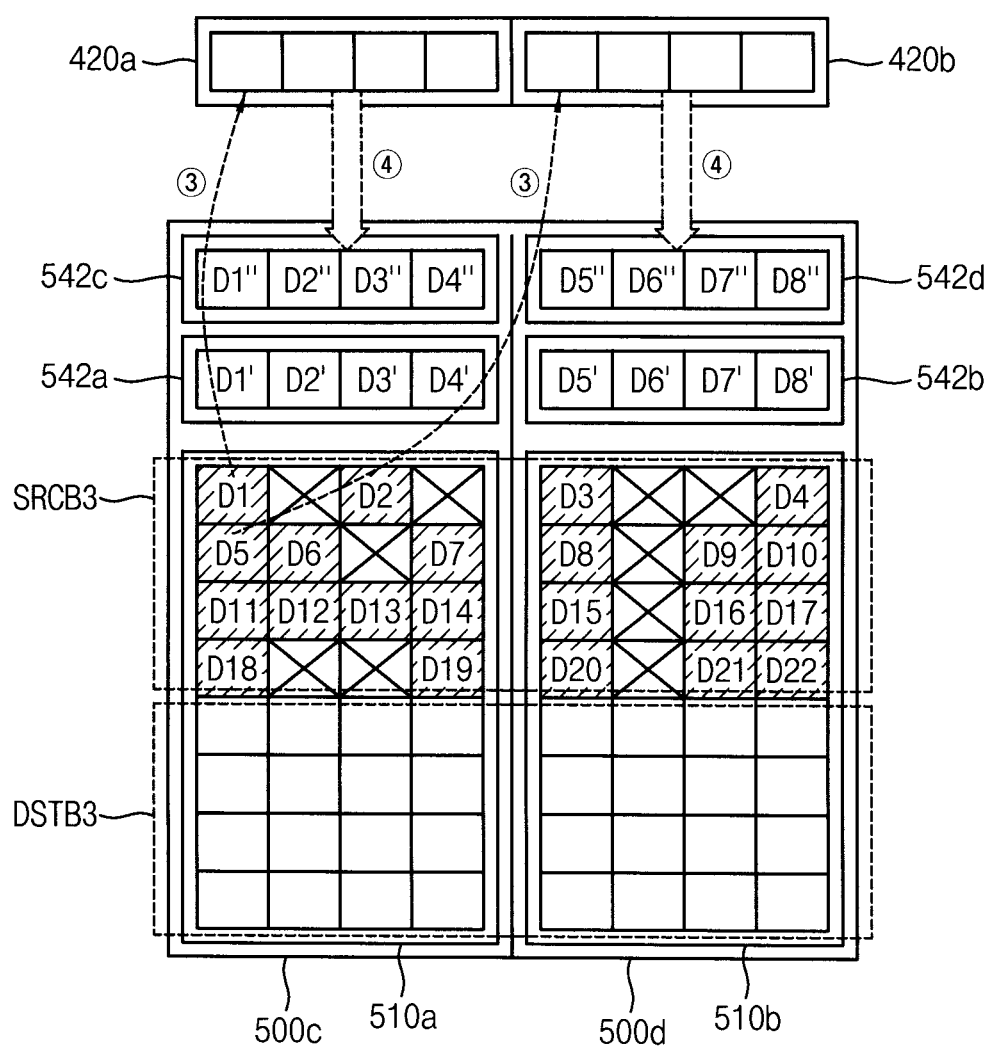
FIG. 21C is another diagram for describing the additional example of the method of FIG. 14.

Referring to FIG. 21C, second bit data D1", D2", D3" and D4" is accumulated in the first volatile memory device 420a, and concurrently, fifth bit data D5", D6", D7" and D8" is accumulated in the second volatile memory device 420b, as illustrated by (3) in FIG. 21C. The second bit data D1", D2", D3" and D4" may correspond to second bits of first data D1, D2, D3 and D4 stored in the first valid pages. The fifth bit data D5", D6", D7" and D8" may correspond to second bits of second data D5, D6, D7 and D8 stored in the second valid pages. For example, the second bit data D1", D2", D3" and D4" may correspond to central significant bits (CSBs) of first data D1, D2, D3 and D4. The fifth bit data D5", D6", D7" and D8" may correspond to CSBs of second data D5, D6, D7 and D8.

In addition, the second bit data D1", D2", D3" and D4" in the first volatile memory device 420a may be stored in third latch unit 542c, and Concurrently, the fifth bit data D5", D6", D7" and D8" in the second volatile memory device 420b may be stored in fourth latch unit 542d, as illustrated by (4) in FIG. 21C.

Figure 21D:
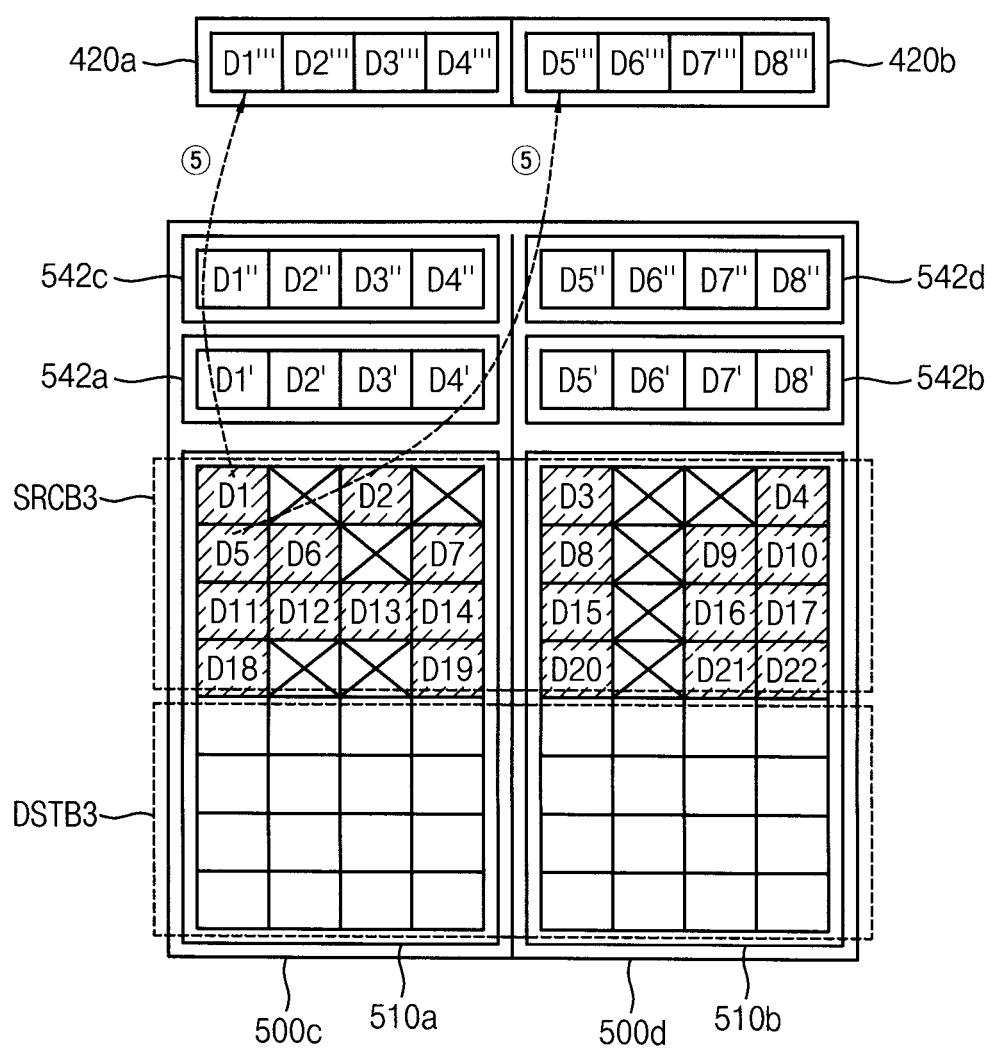
FIG. 21D is another diagram for describing the additional example of the method of FIG. 14.

Referring to FIG. 21D, third bit data D1''', D2''', D3''' and D4''' is accumulated in the first volatile memory device 420a, and concurrently, sixth bit data D5''', D6''', D7''' and D8''' is accumulated in the second volatile memory device 420b, as illustrated by (5) in FIG. 21D. Third bit data D1''', D2''', D3''' and D4''' may correspond to third bits of first data D1, D2, D3 and D4 stored in the first valid pages. Sixth bit data D5''', D6''', D7''' and D8''' may correspond to third bits of second data D5, D6, D7 and D8 stored in the second valid pages. For example, third bit data D1''', D2''', D3''' and D4''' may correspond to MSBs of first data D1, D2, D3 and D4. Sixth bit data D5''', D6''', D7''' and D8''' may correspond to MSBs of second data D5, D6, D7 and D8.

Figure 21E:
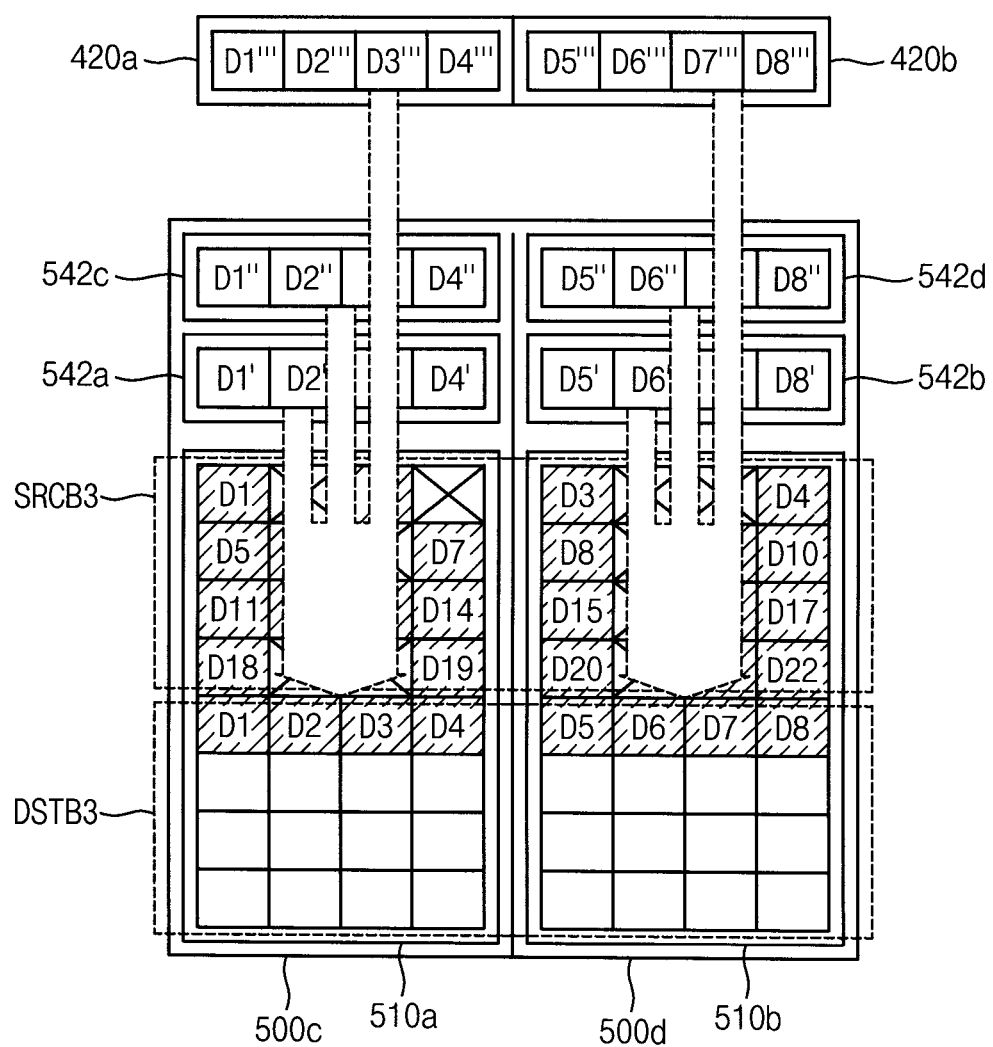
FIG. 21E is another diagram for describing the additional example of the method of FIG. 14.

Referring to FIG. 21E, first data D1, D2, D3 and D4 and second data D5, D6, D7 and D8 may be stored in second block DSTB3. For example, first data D1, D2, D3 and D4 may be stored in second block DSTB3 by performing the HSP scheme based on the first bit data D1', D2', D3' and D4', second bit data D1", D2", D3" and D4" and third bit data D1''', D2''', D3''' and D4'''. Second data D5, D6, D7 and D8 may be stored in second block DSTB3 by performing the HSP scheme based on the fourth bit data D5', D6', D7' and D8', fifth bit data D5", D6", D7" and D8" and sixth bit data D5''', D6''', D7''' and D8'''. A first program operation for first data D1, D2, D3 and D4 and a second program operation for second data D5, D6, D7 and D8 may be performed based on the interleaving scheme.

Operations similar to the examples described above with reference to FIGS. 21B through 21E will be performed for the other valid pages among valid pages VP in first block SRCB3. Finally, all valid pages VP in the first block SRCB3 are copied into second block DSTB3.

Various methods are described above with reference to a storage device storing two-bit data (See, e.g., FIGS. 19A through 19E) or three-bit data (See, e.g., FIGS. 21A through 21E). However, the inventive concept is not limited thereto, and may be applied for the storage device storing any multi-bit data. In addition, various methods are described with reference to a storage device comprising two volatile memory device and two nonvolatile memory devices (e.g., FIGS. 19A through 19E and 21A through 21E). However, the inventive concept is not limited thereto, and may be applied for the storage device including the same number of volatile memory devices as the number of nonvolatile memory devices, for example. According to some embodiments, the number of valid pages that are copied into a latch unit and/or a block may be changed.

FIG. 22 is a flowchart illustrating a method of operating a nonvolatile memory device according to an embodiment of the inventive concept. The method of FIG. 22 may be used, for instance, to drive a nonvolatile memory device that operates in association with at least one external volatile memory device. The nonvolatile memory device may be in any storage device, such as a memory card, a SSD, etc., and the garbage collection operation may be performed based on the method of FIG. 22.

Referring to FIG. 22, in the illustrated method, first valid pages in a first block are copied into a first internal latch unit based on an external volatile memory device. For example, the first valid pages in the first block are copied to the external volatile memory device (S410), and the first valid pages in the external volatile memory device are copied to the first internal latch unit (S420). In addition, second valid pages in the first block are copied into a second internal latch unit based on the external volatile memory device. For example, the second valid pages in the first block are copied to the external volatile memory device (S430), and the second valid pages in the external volatile memory device are copied to the second internal latch unit (S440). The first valid pages in the first internal latch unit and the second valid pages in the second internal latch unit are copied into a second block (S450). Each of the first block and the second block is set on a memory cell array in the nonvolatile memory device.

In some embodiments, the memory cell array may comprise multiple MLCs and multiple SLCs. The nonvolatile memory device may perform the on-chip buffered programming scheme. The first block may include the MLCs, and the second block may include the SLCs.

According to some embodiments, in the method of FIG. 22, an erase operation may be further performed on the first block, and first valid pages in the second block and the second valid pages in the second block may be further copied into a third block.

Figure 23:
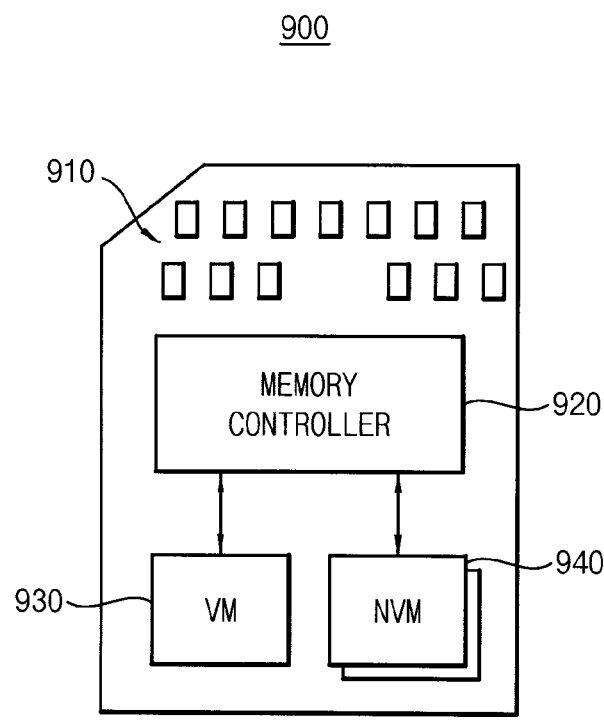
FIG. 23 is a diagram illustrating a memory card according to an embodiment of the inventive concept.

FIG. 23 is a diagram illustrating a memory card according to an embodiment of the inventive concept.

Referring to FIG. 23, a memory card 900 may include multiple connecting pins 910, a memory controller 920, at least one volatile memory device 930 and multiple nonvolatile memory devices 940.

Connecting pins 910 may be coupled to a host (not illustrated) to transfer signals between the host and memory card 900. Connecting pins 910 may include a clock pin, a command pin, a data pin and/or a reset pin.

Memory controller 920 may receive data from the host, and may store the received data in nonvolatile memory devices 940. The at least one volatile memory device 930 may temporarily store data transferred between the host and nonvolatile memory devices 940. In addition, memory controller 920 may perform the garbage collection operation on nonvolatile memory devices 940 based on the at least one volatile memory device 930.

Memory card 900 may operate based on the method of operating the storage device described above with reference to FIGS. 1 through 22. For example, where nonvolatile memory devices 940 perform the on-chip buffered programming scheme, memory card 900 may perform the garbage collection operation based on latch units in nonvolatile memory devices 940 and the small number of volatile memory devices 930 as the number of nonvolatile memory devices 940.

Where nonvolatile memory devices 940 are vertical memory devices and perform the HSP scheme, memory card 900 may perform the garbage collection operation based on the latch units in nonvolatile memory devices 940 and the same number of volatile memory devices 930 as the number of nonvolatile memory devices 940. Accordingly, memory card 900 may have a relatively small size and a relatively improved performance.

For example, memory card 900 may include a multimedia card (MMC), an embedded multimedia card (eMMC), a hybrid embedded multimedia card (hybrid eMMC), a secure digital (SD) card, a micro-SD card, a memory stick, an ID card, a personal computer memory card international association (PCMCIA) card, a chip card, a universal serial bus (USB) card, a smart card, a compact flash (CF) card, etc.

In some embodiments, memory card 900 may be attachable to the host, such as a desktop computer, a laptop computer, a tablet computer, a mobile phone, a smart phone, a music player, a personal digital assistants (PDA), a portable multimedia player (PMP), a digital television, a digital camera, a portable game console, etc.

Figure 24:
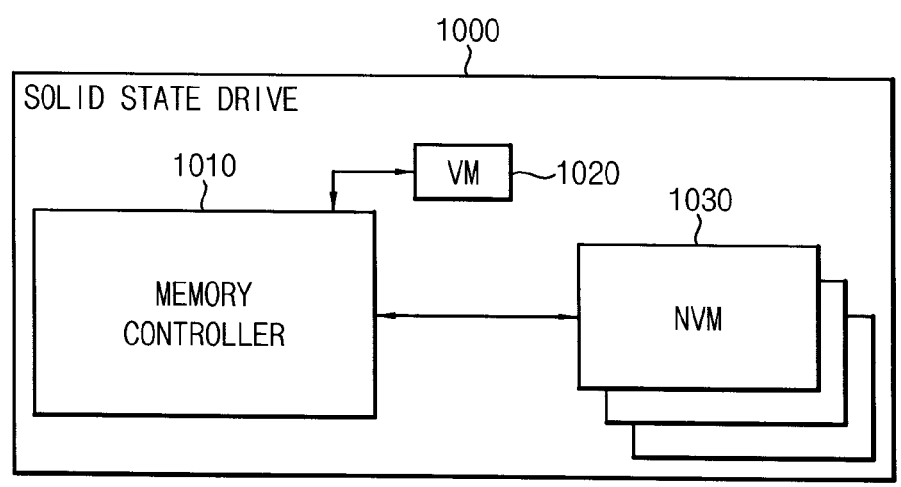
FIG. 24 is a diagram illustrating a solid state drive (SSD) according to an embodiment of the inventive concept.

FIG. 24 is a diagram illustrating a solid state drive (SSD) according to an embodiment of the inventive concept.

Referring to FIG. 24, a SSD 1000 comprises a memory controller 1010, at least one volatile memory device 1020 and multiple nonvolatile memory devices 1030.

Memory controller 1010 may receive data from a host (not illustrated). Memory controller 1010 may store the received data in nonvolatile memory devices 1030. The at least one volatile memory device 1020 may temporarily store data transferred between the host and nonvolatile memory devices 1030.

SSD 1000 may operate based on the method of operating the storage device described above with reference to FIGS. 1 through 22. For example, where nonvolatile memory devices 1030 perform the on-chip buffered programming scheme, SSD 1000 may perform the garbage collection operation based on latch units in nonvolatile memory devices 1030 and the small number of volatile memory devices 1020 as the number of nonvolatile memory devices 1030. Where nonvolatile memory devices 1030 are vertical memory devices and perform the HSP scheme, SSD 1000 may perform the garbage collection operation based on the latch units in nonvolatile memory devices 1030 and the same number of volatile memory devices 1020 as the number of nonvolatile memory devices 1030. Accordingly, SSD 1000 may have a relatively small size and a relatively improved performance.

In some embodiments, SSD 1000 may be coupled to the host, such as a mobile device, a mobile phone, a smart phone, a PDA, a PMP, a digital camera, a portable game console, a music player, a desktop computer, a notebook computer, a tablet computer, a speaker, a video, a digital television, etc.

Figure 25:
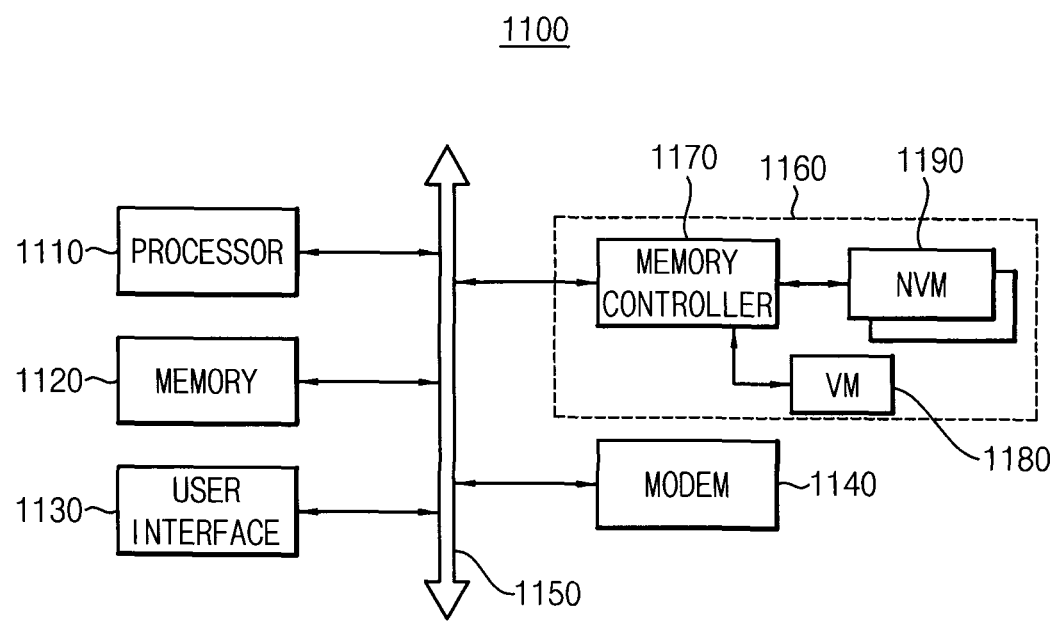
FIG. 25 is a diagram illustrating a system according to an embodiment of the inventive concept.

FIG. 25 is a diagram illustrating a system according to an embodiment of the inventive concept.

Referring to FIG. 25, a system 1100 comprises a processor 1110, a memory device 1120, a user interface 1130, a bus 1150 and a storage device 1160. In some embodiments, system 1100 may further include a modem 1140, such as a baseband chipset.

Processor 1110 may perform specific calculations or tasks. For example, processor 1110 may be a microprocessor, a central processing unit (CPU), a digital signal processor, or the like. Processor 1110 may be coupled to memory device 1120 via a bus 1150, such as an address bus, a control bus and/or a data bus. For example, memory device 1120 may be implemented by a DRAM, a mobile DRAM, a SRAM, a PRAM, a FRAM, a RRAM, a MRAM and/or a flash memory. Further, processor 1110 may be coupled to an extension bus, such as a peripheral component interconnect (PCI) bus, and may control user interface 1130 including at least one input device, such as a keyboard, a mouse, a touch screen, etc., and at least one output device, a printer, a display device, etc. Modem 1140 may perform wired or wireless communication with an external device.

A volatile memory device 1180 and nonvolatile memory devices 1190 in storage device 1160 may be controlled by a memory controller 1170 to store data processed by processor 1110 or data received via modem 1140. Storage device 1160 may operate based on the method of operating the storage device described above with reference to FIGS. 1 through 22. Accordingly, storage device 1160 SSD 1000 may have a relatively small size and a relatively improved performance.

In some embodiments, system 1100 may further include a power supply, an application chipset, a camera image processor (CIS), etc.

The above described embodiments may be applied to any storage device and an electronic system including the storage device. For example, the above described embodiments may be applied to various electronic systems, e.g., a memory card, a SSD, an eMMC, a universal flash storage, a hybrid universal flash storage, a computer, a digital camera, a 3D camera, a cellular phone, a PDA, a scanner, a navigation system, etc.

The foregoing is illustrative of embodiments and is not to be construed as limiting thereof. Although a few embodiments have been described, those skilled in the art will readily appreciate that many modifications are possible in the embodiments without materially departing from the scope of the inventive concept. Accordingly, all such modifications are intended to be included within the scope of the inventive concept as defined in the claims.

What is claimed is:

1. A method of operating a storage device, the method comprising:
   copying first valid pages from a first block, which comprises pages from each of multiple nonvolatile memory devices, to a first volatile memory device;
   copying the first valid pages from the first volatile memory device to a first latch of the nonvolatile memory devices;
   copying second valid pages from the first block to the first volatile memory device;
   copying the second valid pages from the first volatile memory device to a second latch of the nonvolatile memory devices;

performing a first program operation to write the first valid pages from the first latch unit into a second block that comprises pages from each of the nonvolatile memory devices; and performing a second program operation to write the second valid pages from the second latch unit into the second block, wherein:

the first block differs from the second block, and the second program operation is initiated before the first program operation is finished.

2. The method of claim 1, wherein copying the first valid pages from the first block of the nonvolatile memory devices to the first volatile memory device comprises copying the first valid pages from the first block to a third latch unit of the nonvolatile memory devices and subsequently copying the first valid pages from the third latch unit to the first volatile memory device.

3. The method of claim 1, wherein copying the second valid pages from the first block of the nonvolatile memory devices to the first volatile memory device comprises copying the second valid pages from the first block to a third latch unit of the nonvolatile memory devices and subsequently copying the second valid pages from the third latch unit to the first volatile memory device.

4. The method of claim 1, wherein:

the first latch unit is provided by a first nonvolatile memory device among the nonvolatile memory devices, and the second latch unit is provided by a second nonvolatile memory device among the nonvolatile memory devices, the second nonvolatile memory device differing from the first nonvolatile memory device.

5. The method of claim 1, wherein the first block comprises multi-level memory cells (MLCs), and the second block comprises single-level memory cells (SLCs).

6. The method of claim 1, further comprising:

performing an erase operation on the first block; and copying the first valid pages written in the second block and the second valid pages written in the second block into a third block, the third block comprising pages from each of the nonvolatile memory devices and being different from the first block and the second block.

7. The method of claim 1, further comprising:

copying third valid pages from the first block to the first volatile memory device;

copying the third valid pages from the first volatile memory device to a third latch of the nonvolatile memory devices;

copying fourth valid pages from the first block to the first volatile memory device;

copying the fourth valid pages from the first volatile memory device to a fourth latch of the nonvolatile memory devices;

copying the third valid pages from the third latch unit to the second block; and copying the fourth valid pages from the fourth latch unit to the second block.

8. The method of claim 1, further comprising:

copying third valid pages from the first block to a second volatile memory device;

copying the third valid pages from the second volatile memory device to a third latch of the nonvolatile memory devices;

copying fourth valid pages from the first block to the second volatile memory device;

copying the fourth valid pages from the second volatile memory device to a fourth latch of the nonvolatile memory devices;

copying the third valid pages from the third latch unit to the second block; and copying the fourth valid pages from the fourth latch unit to the second block.

9. A method of operating a storage device, the method comprising:

copying first valid pages from a first block, which comprises pages from each of multiple nonvolatile memory devices, to a first volatile memory device;

copying the first valid pages from the first volatile memory device to a first latch of the nonvolatile memory devices;

copying second valid pages from the first block to a second volatile memory device;

copying the second valid pages from the second volatile memory device to a second latch of the nonvolatile memory devices;

performing a first program operation to write the first valid pages from the first latch unit into a second block that comprises pages from each of the nonvolatile memory devices; and performing a second program operation to write the second valid pages from the second latch unit into the second block, wherein:

the first block differs from the second block, and the second program operation is initiated before the first program operation is finished.

10. The method of claim 9, wherein each of the nonvolatile memory devices is a vertical memory device having a stacked structure; and each of the first block and the second block comprises multi-level memory cells (MLCs).

11. A storage device; comprising:

a volatile memory device;

multiple nonvolatile memory devices; and a controller that:

copies first valid pages from a first block, which comprises pages from each of the nonvolatile memory devices, to the volatile memory device;

copies the first valid pages from the volatile memory device to a first latch of the nonvolatile memory devices;

copies second valid pages from the first block to the volatile memory device;

copies the second valid pages from the volatile memory device to a second latch of the nonvolatile memory devices;

performs a first program operation to write the first valid pages from the first latch unit into a second block that comprises pages from each of the nonvolatile memory devices; and performs a second program operation to write the second valid pages from the second latch unit into the second block, wherein:

the first block differs from the second block, and the second program operation is initiated before the first program operation is finished.

12. The storage device of claim 11, wherein copying the first valid pages from the first block of the nonvolatile memory devices to the volatile memory device comprises copying the first valid pages from the first block to a third latch unit of the nonvolatile memory devices and subsequently copying the first valid pages from the third latch unit to the first volatile memory device.

13. The storage device of claim 11, wherein the first block comprises multi-level memory cells (MLCs) and the second block comprises single-level memory cells (SLCs).

\* \* \* \* \*